United States Patent
Miles et al.

(10) Patent No.: US 6,665,495 B1
(45) Date of Patent: Dec. 16, 2003

(54) NON-BLOCKING, SCALABLE OPTICAL ROUTER ARCHITECTURE AND METHOD FOR ROUTING OPTICAL TRAFFIC

(75) Inventors: Larry L. Miles, Garland, TX (US); Lakshman S. Tamil, Plano, TX (US); Scott A. Rothrock, Plano, TX (US); Nolan J. Posey, Jr., Allen, TX (US); Gregory H. Aicklen, Richardson, TX (US)

(73) Assignee: Yotta Networks, Inc., Plano, TX (US)

( * ) Notice: Subject to any disclaimer, the term of this patent is extended or adjusted under 35 U.S.C. 154(b) by 570 days.

(21) Appl. No.: 09/698,666

(22) Filed: Oct. 27, 2000

(51) Int. Cl.[7] .................................................. H04J 14/00
(52) U.S. Cl. .............................. 398/54; 398/45; 398/49; 370/351; 370/352; 370/389
(58) Field of Search ............................... 398/49, 45, 51, 398/54, 55; 370/352, 389, 351, 355–356

(56) References Cited

U.S. PATENT DOCUMENTS

| | | | |
|---|---|---|---|
| 5,303,078 A | * 4/1994 | Brackett et al. ............... | 398/51 |
| 5,416,769 A | 5/1995 | Karol ........................... | 370/60 |
| 5,469,284 A | 11/1995 | Haas ........................... | 359/139 |
| 5,486,943 A | 1/1996 | Sasayama et al. ........... | 359/123 |
| 5,734,486 A | 3/1998 | Guillemot et al. ........... | 359/139 |
| 5,737,106 A | 4/1998 | Sansonetti et al. .......... | 359/140 |
| 5,978,359 A | 11/1999 | Caldera et al. .............. | 370/326 |
| 2003/0063348 A1 | * 4/2003 | Posey, Jr. ..................... | 359/139 |
| 2003/0067653 A1 | * 4/2003 | Aicklen et al. .............. | 359/139 |

FOREIGN PATENT DOCUMENTS

| | | |
|---|---|---|
| EP | 0 849 916 A2 | 6/1998 |
| WO | WO 95/30318 A2 | 11/1995 |
| WO | WO 00/42811 A1 | 7/2000 |

OTHER PUBLICATIONS

International Search Report for PCT/US01/51237, Mailed Mar. 20, 2003.

(List continued on next page.)

*Primary Examiner*—Kinfe-Michael Negash
(74) *Attorney, Agent, or Firm*—Gray Cary Ware & Freidenrich, LLP

(57) ABSTRACT

A system and method for providing non-blocking routing of optical data through a telecommunications router that allows full utilization of available capacity. The router includes a number of data links that carry optical data packets to and from an optical router. The optical router includes a number of ingress edge units coupled to an optical switch core coupled further to a number of egress edge units. The ingress edge units receive the optical data packets from the data links and aggregate the optical data packets into "super packets" where each super packet is to be routed to a particular destination egress edge unit. The super packets are sent from the ingress edge units to an optical switch fabric within the optical switch core that routes each super packet through the optical switch fabric to the super packet's particular destination egress edge unit in a non-blocking manner (i.e., without contention or data loss through the optical switch fabric). This routing is managed by a core controller that monitors flow information at each ingress edge unit to control the super packet generation and transmission to the optical switch fabric and schedules each super packet to exit the optical switch fabric so as to avoid contention among the plurality of super packets in the transmission between the optical switch fabric and the egress edge units. The egress edge units receive the super packets, de-aggregate the super packets into the original optical data packets, and transmit the optical data packets to the data lines.

73 Claims, 22 Drawing Sheets

OTHER PUBLICATIONS

Kannan, et al. "*A High Bandwidth Space–Time–Wavelength Multiplexed Optical Switching Network*" Proceedings of the IEEE INFOCOM '97, Los Alamitos, CA, Apr. 7–12, 1997.

McKeown, et al. "*Tiny Tera: A Packet Swith Core*" IEEE Micro, IEEE Inc, New York, vol. 17, No. 1, pp. 26–33, Jan. 1997.

G. Depovere, et. al., Philips Research Laboratories, "*A Flexible Cross–Connect Network Using Multiple Object Carriers*," Date Unknown, All Pages.

John M. Senior, et al., SPIE—The International Society for Optical Engineering, "*All–Optical Networking 1999: Architecture, Control, and Management Issues*" vol. 3843, pp. 111–119, dated Sep. 19–21, 1999.

Jonathan S. Turner, Journal of High Speed Networks 8 (1999) 3–16 IOS Press, "*Terabit Burst Switching*", pp. 3–16.

Ken–ichi Sato, IEEE Journal on Selected Areas in Communications, vol. 12, No. 1, Jan., 1994 "*Network Performance and Integrity Enhancement with Optical Path Layer Technologies*", pp. 159–170.

F. Callegati, et al., Optical Fiber Technology 4, 1998 "*Architecture and Performance of a Broadcast and Select Photonic Switch\**", pp. 266–284.

Soeren Lykke Danielsen, et al., "*WDM Packet Switch Architectures and Analysis of the Influence of Tuneable Wavelength Converters on the Performance*".

Soeren L. Danielsen, et al., IEEE Photonics Technology Letters, vol. 10, No. 6, Jun. 1998 "*Optical Packet Switched Network Layer Without Optical Buffers*".

John M. Senior, et al., SPIE—The International Society of Optical Engineering, *All–Optical Networking: Architecture, Control and Management Issues* dated Nov. 3–5, 1998, vol. 3531, pp. 455–464.

M.C. Chia, et al., Part of SPIE Conference on All–Optical Networking: Architecture, Control and Management Issues, Nov. 1998, "*Performance of Feedback and Feedforward Arrayed—Waveguide Gratings–Based Optical Packet Switches with WDM Inputs/Outputs*".

\* cited by examiner

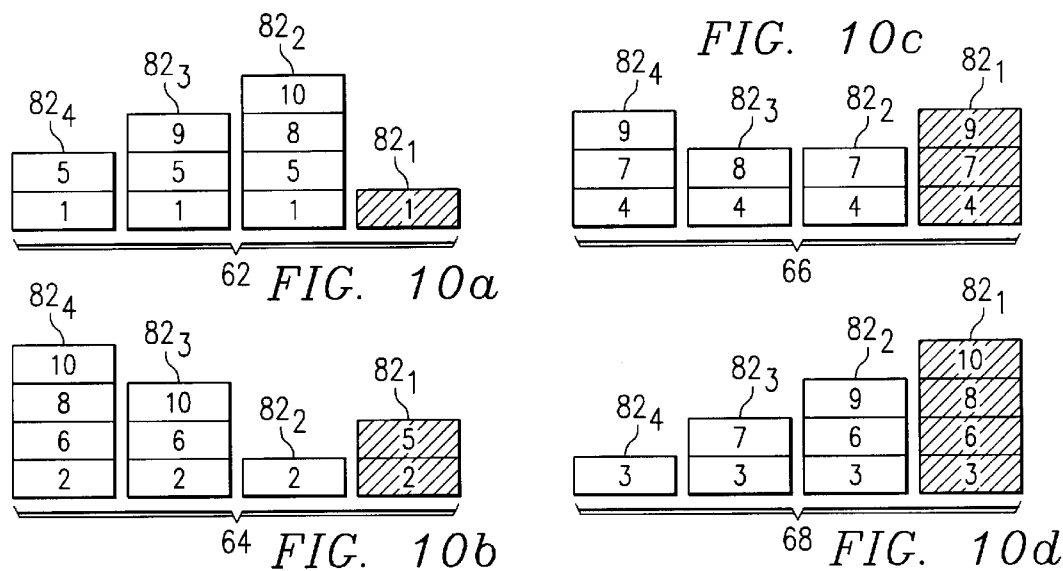
FIG. 10a
FIG. 10b
FIG. 10c
FIG. 10d
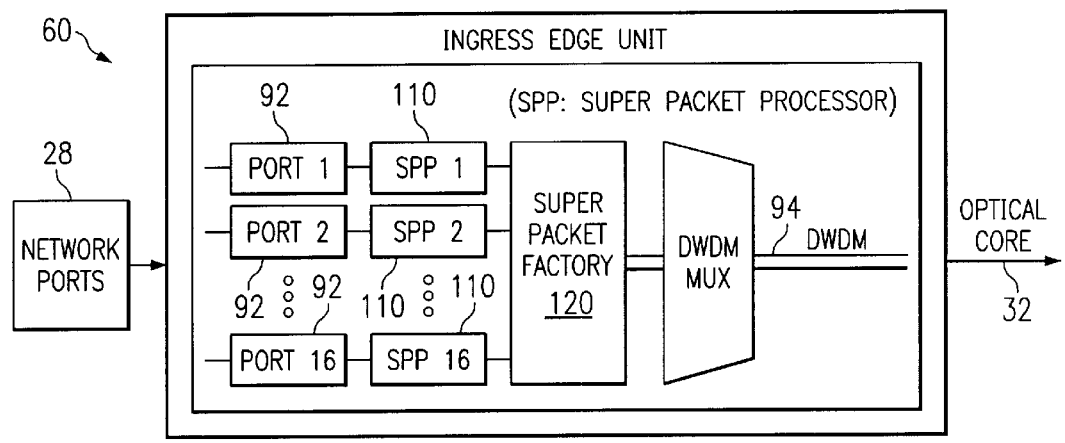
FIG. 12a
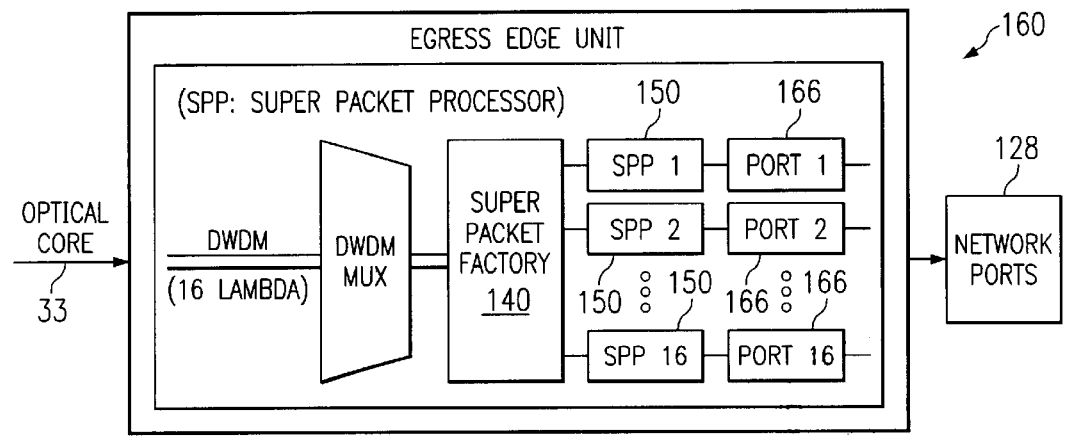
FIG. 12b

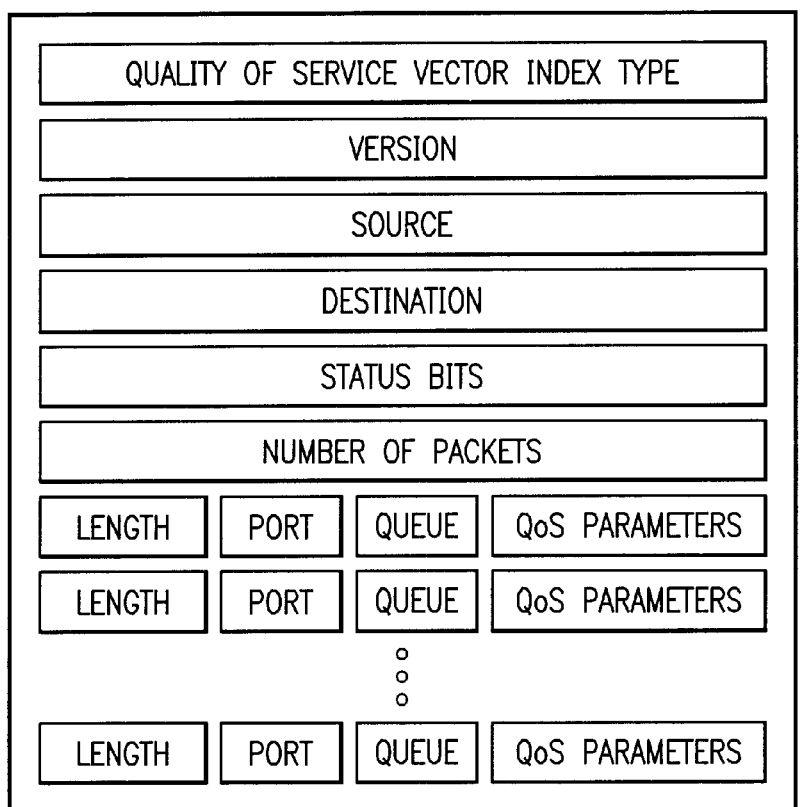
FIG. 26    290
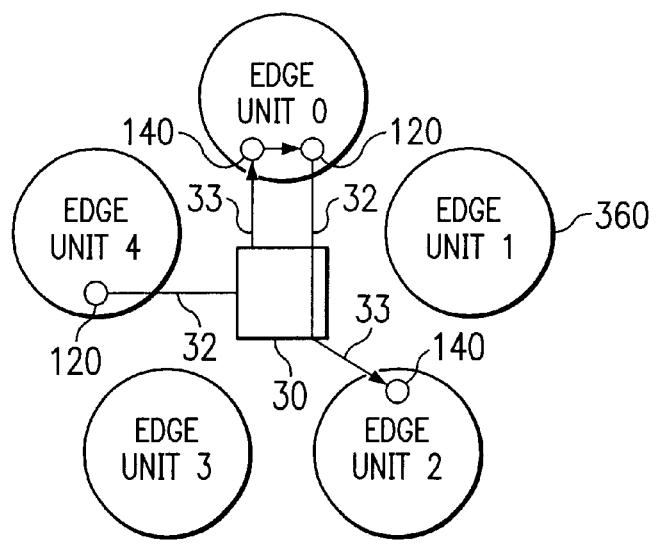
FIG. 27

NON-BLOCKING, SCALABLE OPTICAL ROUTER ARCHITECTURE AND METHOD FOR ROUTING OPTICAL TRAFFIC

TECHNICAL FIELD OF THE INVENTION

The present invention relates generally to telecommunications systems and methods, and more particularly, a non-blocking, scalable optical router having an architecture that optimizes bandwidth management to allow for non-blocking switching and routing of optical data packets.

BACKGROUND OF THE INVENTION

The emergence of the Internet and the reliance by business and consumers on the transfer of data in all daily activities requires telecommunications networks and components that can deliver ever increasing amounts of data at faster speeds with higher quality levels. Current telecommunications networks fail to meet these requirements.

Existing electrical and electro-optical switching routers are limited in the switching speeds that are attained and the data capacity that can be processed between switches in a non-blocking manner. Current electrical switching architectures are generally limited to a switching speed of 40–100 Gigabits. In an attempt to overcome this limitation, current electrical and optical routers use aggregation of slower switches to increase the overall switching speed of the router. For example, a system may combine a hundred one (1) Gigabit routers to increase the switching speed of the system. However, while the overall speed and capacity will exceed one Gigabit, this aggregation will not result in full 100 Gigabit per second speed and capacity, resulting in a decreased efficiency (less than full realization of switching capability). Furthermore, aggregation increases costs due to the increased number of routers and increases complexity due to interconnect and routing issues. In addition to the issues surrounding data routing speed, electronic telecommunication routing systems all face difficult transference issues when interfacing with optical data packets. Another technique used in electrical telecommunication routing systems to increase data routing speed is parallel processing. However, this technique has its own limitations including control complexity (it is difficult to control the multiple routers operating in parallel). In any of these techniques involving multiple routers to increase the processing speed, a single control machine must arbitrate among the many multiple machines which increases control complexity, cost and ultimately uses an electronic control machine that is limited by electronic processing speeds.

FIGS. 1 and 2 will illustrate the limitations of these prior art systems. FIG. 1 shows a typical prior art local network cluster 10 that uses an interconnect structure with multiple routers and switches to provide the local geographic area with a bandwidth capability greater than that possible with any one switch in the router 10. Network 10 includes four routers 12, which will be assumed to be 300 Gigabit per second routers, each of which serves a separate area of 150 Gbps of local traffic. Thus, the 300 Gigabit capacity is divided by assigning 150 Gigabits per second (Gbps) to the incoming traffic on local traffic links 16 and assigning 50 Gbps to each of three links 14. Thus, each link 14 connects the router 12 to every other router in the network 10, thereby consuming the other 150 gigabit capacity of the router 12. This interconnectivity is in the form of a "mesh" that allows each router 12 to communicate directly with every other router 12 in the network 10.

This configuration has a number of limitations. While the four local geographic area produce a total of 600 Gbps of capacity, the network 10 requires four routers 12 of 300 Gbps each, or 1200 Gbps of total router capacity, to provide the interconnectivity required to allow direct communication between all routers 12. Additionally, even though fully connected, each router 12 does not have access to all of the capacity from any other router 12. Thus, only one third of the local traffic (i.e., only 50 Gbps of the total potential 150 Gbps) can be switched directly from any one router 12 to another router 12, and the total potential traffic demand is 600 Gigabits per second. In order to carry more traffic over a link 14, a larger capacity would be required at each router 12 (for example, to carry all 150 Gbps over a link 14 between routers, each link 14 would need to be a 150 Gbps link and each router 12 would have to have an additional 300 Gbps capacity). Thus, to get full connectivity and full capacity, a non-blocking cluster network 10 having a mesh configuration would require routers with 600 Gbps capacity each which equates to 2400 Gbps total router capacity (or four times the combined traffic capacity of the local geographic areas).

FIG. 2 shows another prior art cluster router network 18 that aggregates sixteen data lines 20 that each can carry up to one hundred sixty gigabit per second of data that appears to have the potential capacity of 2.5 Terabits (16 lines carrying 160 Gbps each). Each of the data lines 20 is routed through an edge router 22 to an interconnected edge network 24 (e.g., a ring, mesh, ADM backbone or, other known interconnection method) via carrying lines 26. However, due to inefficiencies in this network configuration (as described above), the full potential of 2.5 Terabits cannot be achieved without a tremendous increase in the size of the edge routers 22. For example, if the edge routers are each 320 Gbps routers, then 160 Gbps is used to take incoming data from incoming data line 20 and only 160 Gbps of access remains to send data to each of the other fifteen routers 22 in the cluster 18 (i.e., approximately 10 Gbps can be allotted to each of the other fifteen routers, resulting in greater than 90% blockage of data between routers). Furthermore, the capacity of the routers is already underutilized as the overall router capacity of the network cluster 18 is 5 terabits per second (Tbps), while the data capacity actually being serviced is 2.5 Tbps. Even with the router capacity underutilized, the network 18 has over 90% blockage between interconnected routers through the edge network 24. To increase the capacity between routers in a non-blocking manner, the individual routers would need to be increased in capacity tremendously, which increases cost and further exacerbates the underutilization problems already existing in the network.

Therefore, a need exists for an optical telecommunications network and switching architecture that will provide full, non-blocking routing between service areas that allow full capacity utilization without requiring over-sized routers that result in extreme underutilization of the router capacity and tremendous increase in router costs over the network.

SUMMARY OF THE INVENTION

The present invention provides a non-blocking optical routing system and method that substantially eliminates or reduces disadvantages and problems associated with previously developed optical-routing systems and methods.

More specifically, the present invention provides a system and method for providing non-blocking routing of optical data through a telecommunications network that allows full utilization of available capacity. The network includes a number of data links that carry optical data packets to and from an optical router. The optical router includes a number of ingress edge units coupled to an optical switch core coupled further to a number of egress edge units. The ingress edge units receive the optical data packets from the data links and aggregate the optical data packets into "super packets" where each super packet is to be routed to a particular destination egress edge unit or port. The super packets are sent from the ingress edge units to an optical switch fabric within the optical switch core that routes each super packet through the optical switch fabric to the super packet's particular destination egress edge unit in a non-blocking manner (i.e., without contention or data loss through the optical switch fabric). This routing is managed by a core controller that monitors the flow of incoming optical data packets into each ingress edge unit, controls the generation of super packets from the incoming optical data packets and transmission of super packets to the optical switch fabric, and schedules each super packet to exit the optical switch fabric so as to avoid contention among the plurality of super packets in the transmission between the optical switch fabric and the egress edge units. The core controller monitors traffic characteristics such as incoming traffic demand at each ingress edge unit, traffic routing demand to each egress edge unit, quality of service requirements, and other data to compute a scheduling pattern for sending super packets to the optical switch fabric. The core controller then schedules super packets based on the scheduling pattern (which is updated as the data traffic characteristics change). The egress edge units receive the super packets, de-aggregate (i.e., disassemble) the super packets into the optical data packets, and transmit the optical data packets to the data lines. These de-aggregated optical data packets contain the same payload as the original incoming data packets, but can potentially have different overhead data due to routing through the router.

The present invention also provides the capability of transporting super packets from the ingress edge to the optical switch core and from the optical switch core to the egress edge of the router on multiple wavelengths with each wavelength carrying a fraction of the super packet simultaneously.

The present invention provides an important technical advantage with respect to previous optical routing systems and methods by optimizing bandwidth management to provide maximum data throughput with no (or greatly reduced) data loss due to congestion or contention within or collisions between optical data packets in an optical switching core of the optical routing system.

The present invention provides another important technical advantage by providing non-blocking data processing (switching and routing) without increasing the individual router/switch capacity beyond the capacity being serviced.

The present invention provides a technical advantage by establishing a switching pattern to route data packets based on traffic requirements at any single point in the network to avoid congestion or blocking of data packets while maximizing utilization.

The present invention provides yet another technical advantage by providing an optical crossbar switch fabric that includes a unique switch path from each ingress (input) port to each egress (output) port to ensure that no blocking or congestion will occur in the switch fabric itself.

The present invention provides yet another technical advantage by aggregating the received incoming optical data packets into super packets for transport through the optical switch/router in order to optimize throughput through the switch/router. The aggregation can be an aggregation of data packets (based, for example, on destination and quality of service requirements) into all optical super packets, into all electrical super packets or perhaps even a combination of both.

The present invention is an optical telecommunications network that includes all of the technical advantages inherent in optical systems (e.g., increased speed, the ability to send multiple packets simultaneously over a single fiber, etc.).

The present invention provides another technical advantage by performing packet classification one time at the ingress edge and carrying that classification information in a classification index to the egress edge of the router. This packet classification enhances performance of a router by (i) reducing packet processing complexity at the egress edge and (ii) eliminating the classification computational requirements at the egress edge.

The present invention provides yet another technical advantage by transporting super packets between ingress and egress edge units on multiple wavelengths so that each wavelength carries a fraction of the super packet simultaneously. This advantage enhances throughput and reduces the complexity of the switch fabric of the present invention.

BRIEF DESCRIPTION OF THE DRAWINGS

For a more complete understanding of the present invention and the advantages thereof, reference is now made to the following description taken in conjunction with the accompanying drawings in which like reference numerals indicate like features and wherein:

FIGS. 10 and 11 are diagrams illustrating a scheduling algorithm for a four edge unit system over a time interval that allows the building of ten super packets that produces scheduling patterns that provide non-blocking, full utilization packet switching;

FIG. 12a is an embodiment of an ingress edge unit according to the present invention;

FIG. 12b is an embodiment of an egress edge unit according to the present invention;

FIG. 26 shows an embodiment of a classification index according to the present invention;

FIG. 27 shows an embodiment of the present invention the incorporates deflection routing.

DETAILED DESCRIPTION OF THE INVENTION

Preferred embodiments of the present invention are illustrated in the FIGUREs, like numerals being used to refer to like and corresponding parts of the various drawings.

The present invention provides an optical network and switch architecture that provides full, non-blocking interconnectivity without increasing the router/switch capacity beyond that required to service the data capacity coming into the router/switch from the communities being serviced. The present invention provides routing for fixed and variable length optical data packets of varying types (including Internet Protocol (IP), data, voice, TDM, ATM, voice over data, etc.) at speeds from sub-Terabit per second (Tbps) to significantly in excess of Petabit per second (Pbps). The present invention utilizes unique, non-blocking optical switching and, routing techniques and an optical architecture to obtain these benefits in speed and interconnected capacity in the network.

Figure 3:
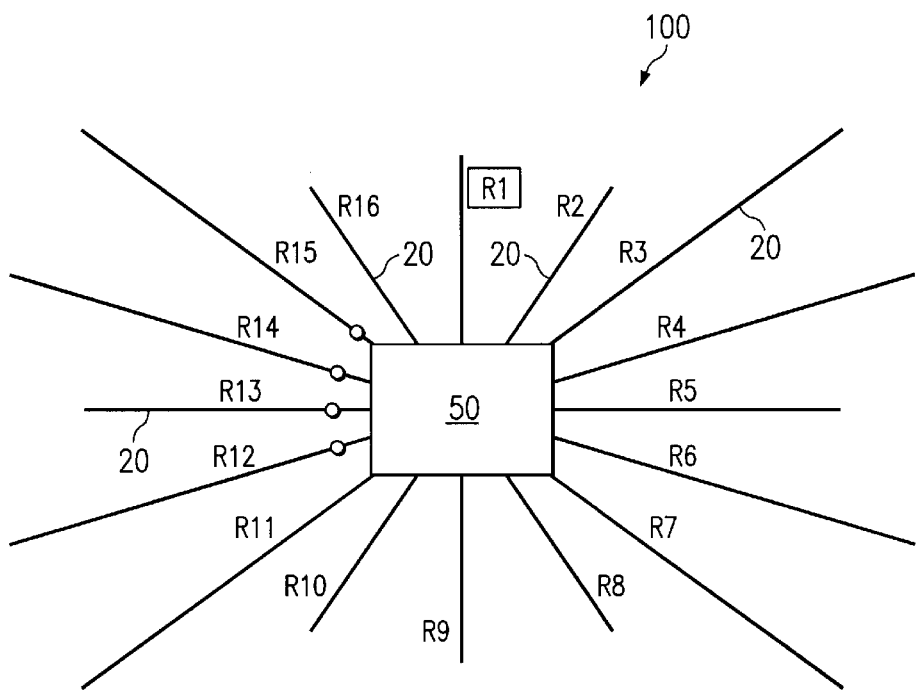
FIG. 3 is a diagram representing one embodiment of an optical telecommunications network according to the present invention.
Figure 2:
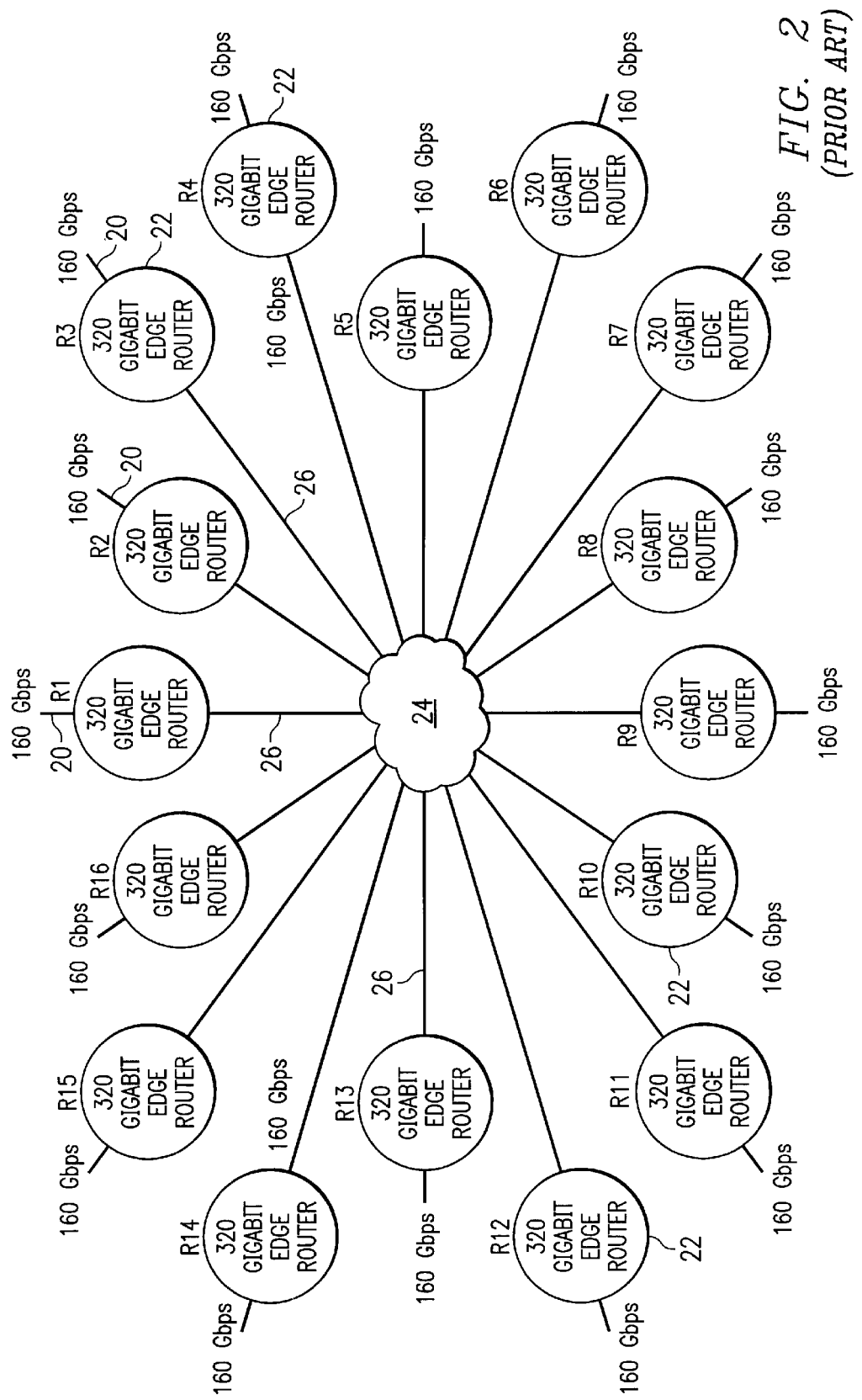
FIG. 2 shows another prior art telecommunications router configuration.

FIG. 3 shows an optical network 100 of the present invention including a number of data links 20 (or "data lines 20") carrying optical data directly to a central optical router 50. The data links 20 can be optical links comprising fiber optic cable operable to carry optical data packets. The network 100 embodiment shown in FIG. 3 includes sixteen data links 20 where each data link has a data capacity of 160 Gigabits per second (Gbps). Therefore, the network 100 of FIG. 3 has the same potential data capacity of the network of FIG. 2 (approximately 2.5 Tbps). However, unlike FIG. 2, the optical network 100 of FIG. 3 has replaced the sixteen individual routers 12 and the interconnected edge network 24 with a single optical router 50 according to the present invention. Each of the data links 20 transmits optical data packets directly to optical router 50 for further processing. The optical router 50 can route any amount of data received from any single data line 20 to any other data line 20 in a non-blocking manner, thus providing full interconnectivity between data lines 20 in the network 100, thereby providing the potential for full capacity utilization. The optical router 50 optimizes bandwidth management to maximize throughput from ingress ports to egress ports in the router 50 with little or no data loss due to data packet congestion or conflict. As compared to the prior art of FIG. 2, the present invention has eliminated the intermediate routers (and their associated underutilized capacity) and the interconnected edge network with a single optical router 50.

Figure 1:
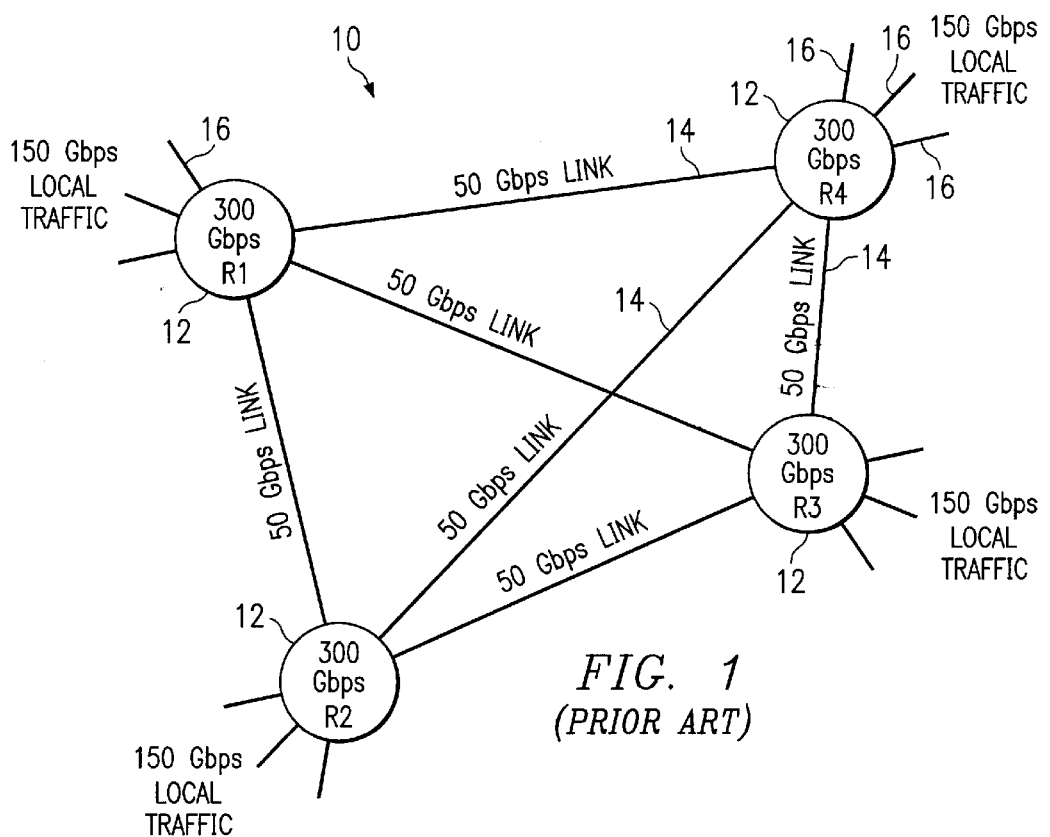
FIG. 1 shows a prior art telecommunications router network.

It should be understood that while many of the specific embodiments shown in the FIGUREs will describe a 2.5 Tbps network architecture with a sixteen link, 160 Gbps per link and a 2.5 Tbps optical router, the present invention is fully scalable to comprise different numbers of links, different link I/O formats, different data capacities per links, different sized optical routers and other different formats/capacities. Thus, the present invention is fully; applicable to networks with total data transport capacities much less than 1 Tbps and significantly in excess of 1 Pbps and the general architectures described are not in any way limited to this specific 2.5 Tbps embodiment which is provided by way of example only. It should be further understood that the "optical router 50" of the present invention includes the functions of switching and routing and is not limited to traditional "routing" functions, but includes the ability to do both switching and,routing. For example, the optical router 50 can replace constant bandwidth switches that are used in public switched transport network that exists today that carries constant bandwidth voice or video data (e.g., TDM data). Additionally, the optical router 50 of the present invention can be deployed in both a single system (non-distributed) and in a distributed version of the system. While the FIGUREs generally illustrate a single, co-located system architecture, the present invention is equally applicable to a distributed network that uses an optical router of the present invention to replace traditional routers such as those described in FIGS. 1 and 2.

Figure 4:
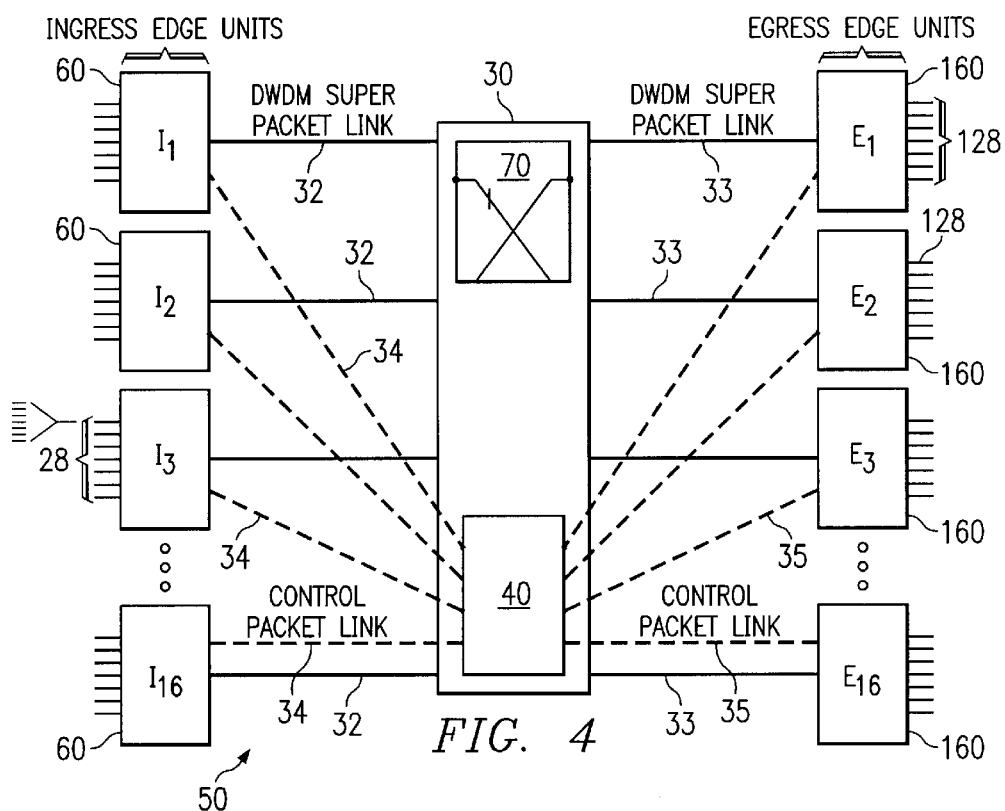
FIG. 4 shows one embodiment of the optical router of the present invention.

FIG. 4 shows an embodiment of the optical core node or optical router 50 of the present invention (specifically, the 2.5 Tbps embodiment of FIG. 3). The optical router 50 includes an optical switch core 30, that comprises an optical switch fabric 70 and a core controller 40 that manages the routing through the optical switch fabric 70, a plurality of ingress edge units 60 linked to the optical switch fabric 70 via a plurality of ingress super packet links 32 and linked to the core controller 40 via a plurality of ingress control packet links 34, and a plurality of egress edge units 160 linked to the optical switch fabric 70 via a plurality of egress super packet links 33 and linked to the core controller 40 via a plurality of egress control packet links 35. It should be understood that the super packet links 32 and the control packet links can both comprise WDM fibers or ribbon. It should be further understood that the control packet links and super packet links can either comprise separate physical fibers/links or can combine a single physical fiber/link for both the control and data paths. Thus, the optical switch core 30 is interconnected to a plurality of edge units 60 and 160 that interface between the data links 20 and the optical switch core 30.

Combined edge units can be built as a single. physical edge unit that includes both an ingress unit 60 and an egress unit 160 and that can perform both ingress (input) and egress (output) functions. Each ingress edge unit 60 and each egress edge unit 160 can contain many ingress and egress ports (of different types), respectively, that can connect to a range of other optical network elements, such as smaller switches, routers, cross-connects, and/or transmission equipment that may require consolidation of large amounts of optical data. Similarly, switch core 30 can comprise a single switch core, or alternatively, can comprise a stack of switch cores or a multiple plane switch core.

In operation, the ingress edge unit 60 will receive the optical data packets and will convert the optical data packets to electrical data packets. Each ingress edge unit 60 aggregates data packets (in electrical form) into egress addressable super packets for transmission over the ingress super packet links 32, through the optical switch core 30, and over egress super packet links 33 to an egress edge unit 160. Thus, ingress edge units 60 receive data from data links 20, aggregates the data into super packets where each super packet contains data intended for the same egress edge unit 160 (as will be described more fully below), forwards the data in super packet form over ingress super packet links 32 to the optical switch fabric 70 in optical switch core 30. At the optical switch core 30, the switching/routing operations occur (as will be described more fully below) and then the data flows in super packet form over egress super packet links 33 to the appropriate egress edge unit(s) 160 and output to data link(s) 20. A "super packet" as used herein is an aggregated optical data packet that includes the data from converted data packets arriving at ingress edge units 60 that are intended for the same egress destination. Each ingress edge unit 60 also connects to the core controller 40 via ingress control packet links 34 that carry control data packets to and from the core controller 40 to provide control data from each of the ingress edge units 60 that is used by the core controller 40 to perform the switch and routing management functions of the optical router 50.

Each ingress edge unit 60 is shown in FIG. 4 receiving data from input/output lines 28 that interface between the ingress edge unit 60 and the data links 20 (through any number of smaller switches, routers, cross connects and/or transmission equipment). The input/output lines 28 can be, for example, standard network interface port cards (e.g., OC-48 packet-over-Sonet port cards, OC-192 packet-over-Sonet port cards, Gigabit Ethernet port cards, etc.), DWDM interface port cards for aggregating multiple signals or other equally functional input/output units. Thus, the port itself could process multiple signal types aggregated into one or more input lines. The input/output lines 28 need simply have the capacity to receive and send the amount of data provided over data links 20.

FIG. 4 shows a specific embodiment of the present invention, however, it should be understood that the numerical values, ratios, etc. are exemplary only and that the present invention can be utilized with any number of ingress edge units and egress edge units and any capacity of super packet links, as long as the number of wavelengths times the capacity matches or exceeds the incoming capacity. In the embodiment shown in FIG. 4, there are sixteen ingress edge units 60 (labeled I1, I2, I3, . . . I16) and sixteen corresponding egress edge units 160 (labeled E1, E2, E3. . . E16), that each has the capacity to send and receive 160 Gbps of optical data. In the FIG. 4 embodiment, each ingress edge unit 60 and each egress edge unit 160 has sixteen input/output lines (items 28 and 128, respectively) where each of the sixteen input/output line group connects to one of the sixteen data links 20 and must be able to send/receive 160 Gbps of data from and to the data links 20. Each ingress edge unit 60 is connected to the optical switch core 30 through the single optical fiber ingress super packet link 32 that carries sixteen wavelengths ($\lambda$) where each wavelength carries 10 Gbps each (to give a total carrying capacity across super packet link 26 of 160 Gbps). The total of sixteen 160 Gbps ingress super packet links 32 (and the corresponding sixteen 160 Gbps egress super packet links 33) provide the 2.5 Tbps capacity of the optical router 50.

The optical router 50 of FIG. 4 will allow all of the data, or any fraction thereof, to be transferred from the ingress to egress edges in a non-blocking manner (e.g., all of the data from ingress edge unit I1 can go to egress edge unit E16, while at the same time all of the data from ingress I2 goes to egress E2). Thus, every data packet arriving at an ingress edge unit 60 will be routed to an egress edge unit 160 without contention with any other data packet so long as the capacity of each of the individual ingress super packet links 32 and egress super packet links 33 are not exceeded. In other words, the egress super packet link 33 capacity to the egress edge unit 160 cannot be exceeded (e.g., in this embodiment 160 Gbps). The core controller 40 manages this control feature to ensure that this egress super packet link 33 capacity is not exceeded. In this manner, any portion of the input data at any ingress unit 60 can be routed simultaneous to any egress edge unit 160, as long as the above control feature is followed.

Figure 5:
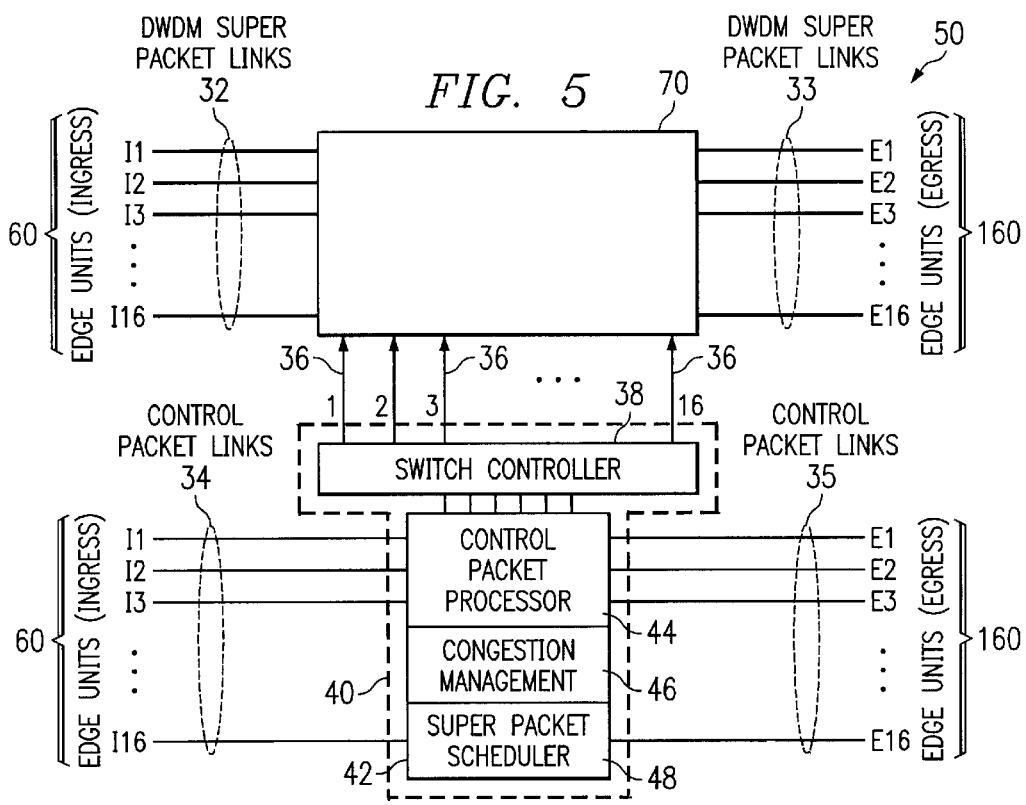
FIG. 5 is a more detailed view of an optical switch fabric and an optical core controller for the optical router of FIG. 4.

FIG. 5 shows a non-blocking embodiment of the optical switch core 30 of FIG. 4 in further detail. As previously described, the optical switch core 30 includes optical switch fabric 70 connected to edge units 60 via super packet links, and core controller 40 connected to edge units via control packet links. As shown in FIG. 5, core controller 40 can comprise a super packet scheduler 42 (which is the portion of the core controller 40 that communicates with the ingress edge units 60 through the ingress control packet links 34 and with the egress edge units 160 through the egress control packet links 35), and a switch controller 38 that is in communication between the packet scheduler 42 and the optical switch fabric 70 to coordinate the actual switching within the optical switch fabric 70 based on the information processed from the ingress edge units 60. The super packet scheduler 42 can be a single unit that performs the super packet scheduling and control, or can comprise multiple modules. In an alternative embodiment, the super packet scheduler can further comprise separate modules including a control packet processor module 44, a congestion management module 46 and a scheduler module 48. In the context of the present invention, the congestion management performed by the congestion management module 46 can include monitoring, reserving and allocating a path through the router 50 to avoid congestion. The switch controller 38 may be an electrical control device. The switch controller 38 communicates with the optical switch fabric 70 through one or more switch links 36 through which the core controller 40 applies the pattern (i.e., schedule) to the optical switch fabric 70.

The optical router 50 allows the non-blocking feature of the present invention by utilization of the optical switch fabric 70 non-blocking paths from each ingress edge unit 60 to each egress edge unit 160 to allow the flow of super packets without contention within the optical switch fabric 70. In order to assure the transmission to the given egress edge unit 160 is accomplished without collision or data loss, the switch core controller 40 communicates with each ingress edge unit 60 over ingress control packet links 34 in order to determine the incoming data destination requirements and schedule transmission of the aggregated super packets between ingress and egress edge interface functions to avoid collision or congestion.

The core controller 40 can perform at least three distinct control functions within the optical router 50: (i) overall synchronization of data flow in the optical router 50 for both ingress edge units 60 and egress edge units 160; (ii) establishing patterns for delivery of super packets from the ingress edge units 60 to the optical switch fabric 70 and (iii) examination of the super packet data arriving at the egress edge units 160 to determine that the super packet data arrives at each of the egress edge units 160 at the scheduled time. The core controller 40 monitors both the ingress edge units 60 via ingress control packet links 34 and the egress edge units 160 via egress control packet links 35 to monitor and control the overall router 50 synchronization. The core controller 40 monitors ingress edge units 60 via ingress control packet links 34 to obtain management information (potentially including bandwidth, delay and quality of service information) to schedule the transmission of super packets from the ingress edge units 60. The core controller 40 monitors the egress edge units 160 via egress control packet links 35 to ensure the proper super packets arrive at each egress edge unit 160 at the proper time.

On the ingress edge unit 60 side, the packet scheduler 42 receives and processes control packet data from the ingress edge units 60 over the ingress control packet links 34 (e.g., using control packet processor 44). This information can be used by the congestion management module 46 to manage congestion along both the ingress super packet links 32 and along the egress super packet links 33. Based on the congestion management, the super packet scheduler 42 (e.g., using scheduler module 48) will schedule the super packets to be switched through the optical switch fabric 70 to be sent out of the optical switch fabric 70 onto the appropriate egress super packet link 33 destined for a particular egress edge unit 160. Based on the control data information received from the ingress edge units 60 regarding the amount of and destinations for the super packets being built, the super packet scheduler 42 will develop a "pattern" that is delivered to the switch controller 38 for use by the switch controller 38 to open and close paths through the optical switch 70. The pattern is established so as to avoid congestion and/or overload of the egress super packet links 33 between the optical switch 70 and the egress edge units 160. The pattern can be established using any number of data characteristic, including delay and other types of quality of service requirements, type of data and other data characteristics.

On the egress edge unit 160 side, the core controller 42 can transmit and receive a variety of control data information from the egress edge units 160. The core controller 40 can monitor the egress edge units 160 to determine the amount of data arriving at each of the egress edge units 160. In this manner, the core controller 40 can establish or modify the super packet transmission pattern so that no egress edge unit 160 receives an amount of data that will exceed the buffering capacity of the egress edge unit 160.

It should be understood that while the present invention has primarily been described as a data transport product in which data packets are carried in various forms, the present invention can support circuit switched (TDM) data (as well as other forms of data), and could be used to replace large SONET based transmission or switching equipment. In order to facilitate circuit switched data and guarantee bandwidth, delay, and delay variation, rigid timing requirements can be imposed on the router of the present invention. The patterned super packet transmission and switching scheme in the core optical fabric facilitates these rigid timing requirements, while simplifying the multitude of real-time hardware tasks that must be scheduled at wire speed throughout the router.

The router can include redundant central control units (not shown) that can distributed the system time base to the ingress and egress edge units by way of the redundant control packet (fiber) links 34 connecting the switch core to each of these edge units (e.g., to each DWDM multiplexer and demultiplexer element). The router time-base can be derived from a variety of redundant, external sources. In one embodiment, the time-base or basic clock signal is 51.84 Mhz, the fundamental frequency of SONET transmission. At this frequency, SONET signals and tributaries can be recovered, as well as ordinary 64 Kbps DS0 voice transmission that is based on 8 Khz.

In this embodiment, the optical switch core can utilize the system time-base (51.84 Mhz) for all super packet and control packet transmissions to each edge unit. All of the super packet data between edge units and the optical switch core can be self-clocking and self-synchronizing. The edge unit will recover data, clock, and synchronization from the super packet data within the DWDM subsystems and together with the control packet link from the optical switch core generates a local master clock (51.84 Mhz) for all edge unit operations, including transmission of super packet data to the optical switch core.

The optical switch core further utilizes the control packet links for communication with each edge unit for JIT scheduling and verification of synchronization. The return path of this link from the edge unit back to the optical switch core is also based on the system time-base as recovered by the edge unit. It is from this path back to the optical switch core that the router extracts the edge unit time-base and determines that all the edge units are remaining in synchronization with the system time-base. These control packet links are duplicated between the optical switch core and all edge units, and therefore no single point of failure can cause a system time-base failure that would interrupt proper transmission and switching of super packet data throughout the system.

Figure 6:
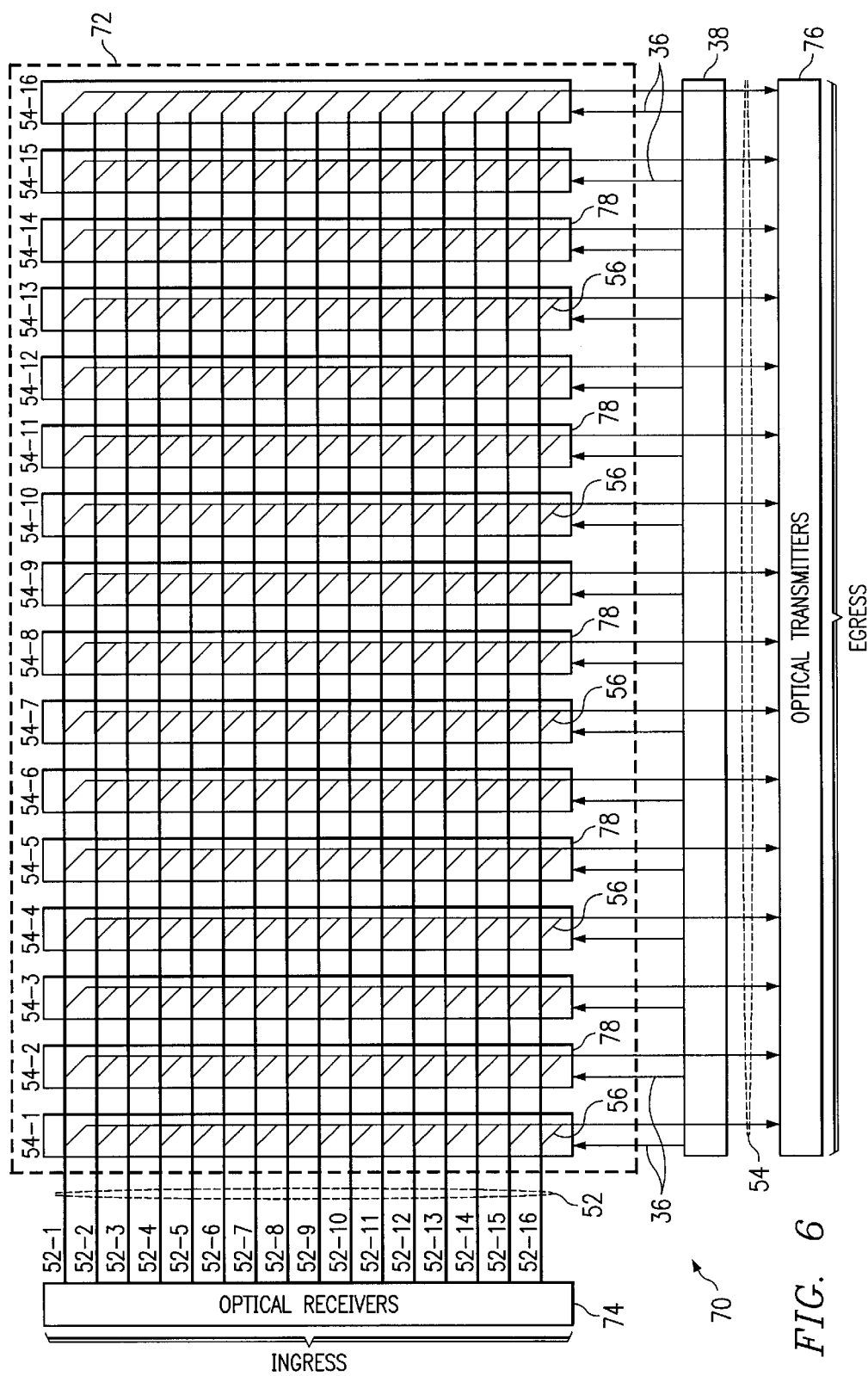
FIG. 6 shows an optical cross-bar switch embodiment of the optical switch fabric of FIG. 5.

FIG. 6 shows an embodiment of the optical switch fabric 70 that includes an optical cross-bar switch 72, one or more optional optical receivers 74 at the input of the switch 70 and one or more optional optical transmitters 76 at the output of the switch 70. In the FIG. 6 embodiment, the switch controller 38 is an integral part of the optical switch fabric 70 (rather than a part of the core controller 40). Again, switch links 36 connect from the switch controller 38 to the optical cross-bar switch 72. While the optical receiver(s) 74 and optical transmitter(s) 76 are optional, these devices can be used to filter and/or amplify the signals in the optical super packets upon receipt at the optical switch fabric 70 (i.e., at the optical receiver(s) 74) and just prior to exiting the optical switch fabric 70 (i.e., at the optical transmitter(s) 76) as necessary depending on the noise in the signals and the distance the signals must travel.

Optical cross-bar switch 72 includes an N×M switching matrix, where "N" can be the number of input data links and "M" can be the number of output data links serviced by the optical router 50. The embodiment of FIG. 6 shows a 16×16 matrix of switching elements 78 in the optical cross-bar switch 72 for the sixteen data link 20, 2.5 Tbps optical router 50 configuration. While the switching elements 78 can be semiconductor (silicon) optical amplifiers (SOAs), it should be understood that other switching elements that are capable of transporting the data through the optical switch fabric 70 can be used. In the FIG. 6 embodiment, the switching elements 78 are shown as sixteen input, one output SOAs (16×1 SOAs) that are capable of routing any of sixteen inputs to its single output. Thus, the optical cross-bar switch 72 comprises a set of sixteen switching elements 78 or SOAs 78, each of which is connected to sixteen switch input lines 52 (labeled 52-1, 52-2 . . . 52-16) and a single switch output line 54 (labeled 54-1, 54-2 . . . 54-16). Each of the sixteen SOAs 78 comprises sixteen path switches 56 where one path switch 56 is located at each intersection of an input line 52 and an output line 54 within each SOA 78. Closing an individual path switch 56 will allow super packets to flow through that path switch 56 (i.e., in from the input line 52 and out the output line 54 at that path switch 56 intersection), while opening a particular path switch 56 will prevent super packets from traveling down the output line 54 intersecting that particular path switch 56. This "cross-bar" configuration of the optical switch 70 allows for any a super packet to travel from any input 52 to any output 54 of the optical switch 70 along a unique path. Thus, in a 16×16 switch matrix, using sixteen 16 to 1 switching elements 78, there are two hundred fifty six unique paths. As the ability to send a greater number of wavelengths across a single optical fiber increases, the architecture of the optical switch core 30, incorporating an optical cross-bar switch 72, will process this increases number of wavelengths equally efficiently without changing the optical switch core base architecture.

It should be understood that the embodiment of the optical switch fabric 70 shown in FIG. 6 comprising an optical cross-bar switch 72 is only one example of a switch fabric 70 that can be used in conjunction with the present invention. Other non-blocking (and even blocking) switch architectures can be used to accomplish the increased switching capabilities of the present invention (e.g., multi-stage switches, switches with optical buffering, etc.). Furthermore, even the embodiment of the optical cross-bar switch 72 of FIG. 6 incorporating sixteen 16×1 SOAs is merely exemplary as other switching element configurations that can pass any input to any output of the optical switch 70, in preferably a non-blocking manner, are equally applicable to the present invention. For example, the optical switch 70 could comprise two hundred fifty six individual switching elements (or SOAs) to form a similar cross-connected optical switch 70 with paths from any input pin to any output pin. Furthermore, it should be understood that the optical cross-bar switch 72 provides a configuration that facilitates broadcasting and multicasting of data packets. Due to the cross-bar nature of the switch 70, any data packet input to the optical cross-bar switch 72 at a particular input 52 can be sent out any single output 54, all outputs 54 simultaneously, or to some selection of the total number of outputs 54 (e.g., a data packet arriving at from switch input line 52-1 can be replicated sixteen times and sent through each of switch output lines 54-1 through 54-16 simultaneously for a broadcast message). The optical cross-bar switch 72 provided in FIG. 6 provides the additional advantage of being single-stage switch that is non-blocking without using buffering in the optical switch.

Generally, in operation the optical super packets are received at the optical receiver(s) 74 on the ingress side, amplified and/or filtered as necessary, and transmitted through the optical cross-bar switch 72 to the optical transmitter(s) 76 on the egress side of the optical switch 70. In the FIG. 6 embodiment, switch controller 38 communicates with the optical cross-bar switch 72 through one of sixteen switch links 36 as shown. Each of the sixteen switch links 36 connects to one of the SOAs 78 to open or close, as appropriate, the sixteen path switches 56 within the SOA 78. For example, if a super packet needed to be sent from ingress edge unit I1 to egress edge unit E1, switch controller 38 would close path switch 56 at the intersection of 52-1 and 54-1 which would send the super packet from the optical receiver 74 to the optical cross-bar switch 72 along input line 52-1 to output line 54-1 and to optical transmitter 76 out of optical cross-bar switch 72. During operation, for any particular N×1 SOA 78, only one switch 56 will be closed at any one time, and subsequently only one path is available through any one SOA 78 at any given time.

When the super packets are received from the ingress edge units 60, these super packets can be routed through the optical switch fabric 70 in a manner that avoids contention. The FIG. 6 embodiment of the optical switch fabric 70 accomplishes this contention-free routing using the optical cross-bar switch 72. The optical cross-bar switch 72 provides a unique path through the optical switch fabric 70 between every ingress edge unit 60 and each egress interface edge unit 160. Thus, the flow path for a super packet runs from one ingress edge,unit 60 through the ingress super packet link 32 associated with that ingress edge unit 60 to the optical cross-bar switch 72, through the unique path within the optical cross-bar switch 70 to one egress edge unit 160 over its associated egress super packet link 33. In this manner, data packets from ingress edge unit I1 that are intended for egress edge unit E2 travel a distinct route through the optical cross-bar switch 72 (versus, for example, data packets from ingress I16 that are also intended for egress E2), so that contention physically cannot occur in the optical cross bar switch 72 between different ingress edge units 60 sending data to the same egress edge unit 160.

The switch controller 38 can operate on two different time scales: one for the data path control and one for the control path control. For the data path, the switch controller 38 will apply a dynamic set of commands to the optical cross-bar switch 72 to operate the switching elements 78 within the optical switch 70 at wire speeds (i.e., switching the incoming super packets from input 52 to output 54 at the rate at which the super packets are arriving at the optical cross-bar switch 72) in order to open and close the unique paths that need to be traveled the super packets to get the super packets from an ingress edge unit 60 to an egress edge unit 160. For the control path, the switch controller 38 will apply a continually changing "pattern" to the optical cross-bar switch 72 to schedule the super packets transmission from the ingress edge units 60 over the ingress super packet links 32 through the optical switch fabric 70 and over the egress super packet links 33 to the egress edge units 160 in a manner that avoids contention. These scheduling patterns are determined by the super packet scheduler 42 over time and provided to the switch controller 38. Thus, the pattern applied by the switch controller 38 to the optical cross-bar switch 72 can change over time as determined by the super packet scheduler 42 in response to control data received from the ingress edge units 60.

In one embodiment, the super packets may be one microsecond in duration (including a guard band gap between each super packet) so that the optical switch fabric 70 must be able to switch every input 52 to every output 54 in the optical cross-bar switch 72 between the one microsecond boundaries. During the guard band gap, the optical switch fabric 70 must switch all of the switching elements 78 to change the entire optical switch fabric 70 configuration. In contrast, the super packet scheduler 42 may be determining and applying updated super packet scheduling patterns (based on different data flow detected at the ingress edge units) for time periods on the order of, for example, 1–10 milliseconds. Thus, the super packet scheduler 42 may be providing to the ingress edge units 60 a new "pattern" every 1–10 milliseconds, while providing the switch controller 38 a switching signal based on the active patter that causes the switch controller 38 to update the optical cross-bar 72 configuration every 1 microsecond.

Figure 7:
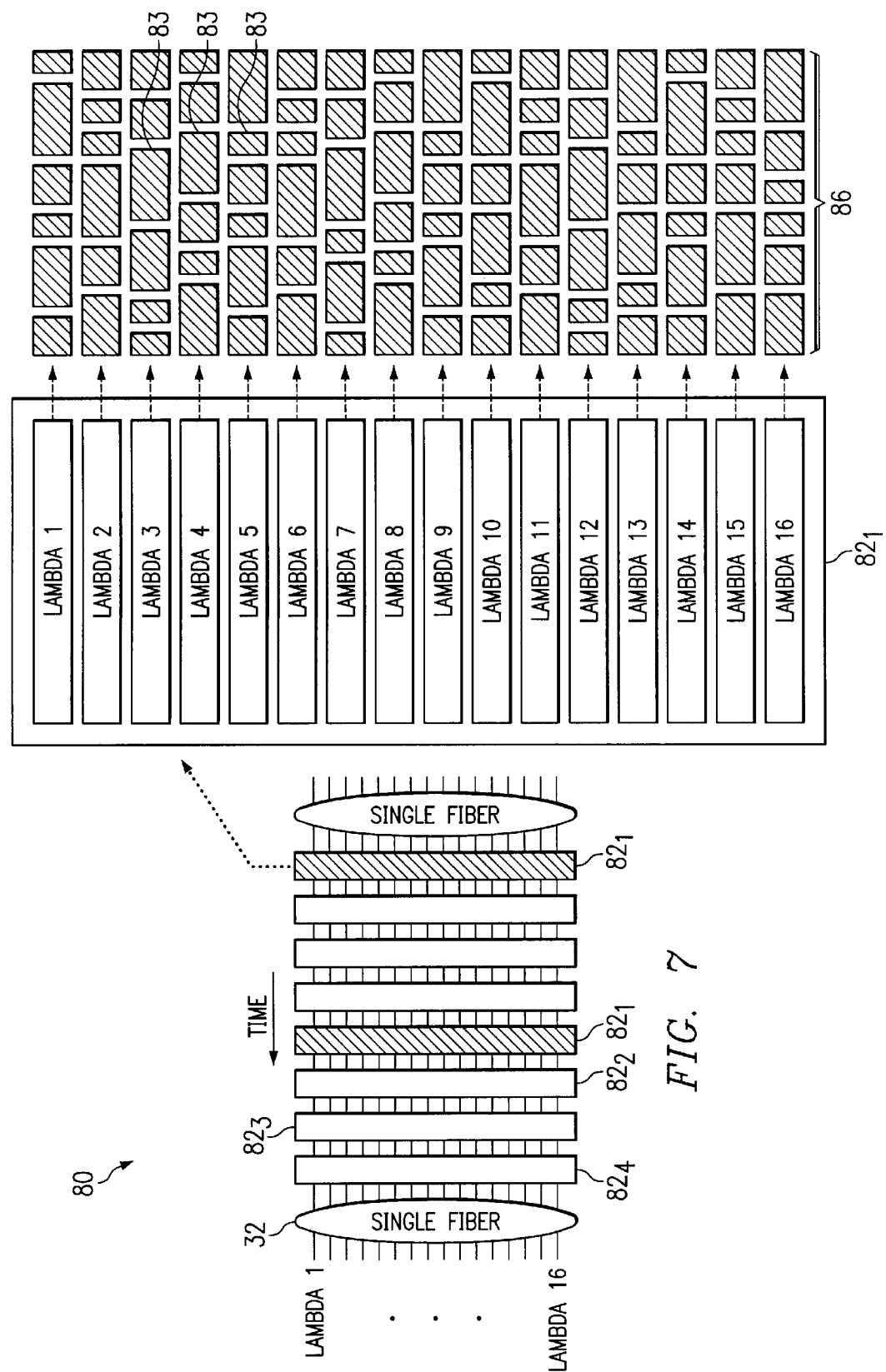
FIG. 7 shows a diagram representing one embodiment of optical packet aggregation according to the present invention.

FIG. 7 shows an illustration of an optical burst packet aggregation scheme 80 that can be used in accordance with the present invention to aggregate optical data intended for the same egress edge unit destination into an aggregated "super packet." The optical burst packet aggregation scheme 80 shown in FIG. 7 is shown for four edge unit embodiment of the optical router 50 for ease of illustration, and it should be understood that the optical burst packet aggregation scheme 80 shown is equally applicable to optical routers 50 having any number of edge units. FIG. 7 shows schematically a set of optical bursts 82 from each of the four ingress edge units 60 (repeating over time) contained on a single ingress super packet link 32 that will be sent to one of the switch input lines 52 at the optical switch fabric 70. FIG. 7 shows the ingress super packet link 32 transporting data over sixteen lambdas (i.e., individual wavelengths or different colors of light upon which optical data can travel) at a point where the optical burst 82 are leaving an ingress edge unit 60 destined for the optical switch core 30. For illustration purposes only, FIG. 7 shows a single ingress edge unit 60 placing four equally sized data packets on the ingress super packet link 32, where each data packet is intended for one of the four egress edge units 160 in successive time intervals in a repeating pattern. As shown in FIG. 7, the first ingress edge unit 60 places data packet $82_1$ on the ingress super packet link 32, then places data packet $82_2$ on the ingress super packet link 32, then places data packet $82_3$ on the ingress super packet link 32, and finally places data packet $82_4$ on the ingress super packet link 32 (and then the cycle repeats). It should be understood that the notation $82_1$ for a data packet simply indicates that the packet 82 came from ingress edge unit number 1 (and not that each $82_1$ have identical data, which they do not). Thus, for illustration purposes, FIG. 7 shows the optical burst aggregation 80 for the case where there is an equally distributed amount of data going from a single ingress edge unit 60 is sent to each of the four egress edge units 160 (i.e., a static flow of data). The data is time multiplexed so that every fourth burst goes to a particular egress edge unit. It should be understood that in operation the data flow will change over time and that FIG. 7 is only one illustration of the potential data flows.

FIG. 7 also shows an enlarged view of the individual data packet $82_1$ that is intended for the first egress edge unit 160. Data packet $82_1$ can be one microsecond in duration and can comprise sixteen lambdas, wherein within each lambda contains a number of variable length packets 83, or fractions thereof. The number of lambdas can be increased to any number so long as the individual packets are not lost due to interference or noise between the lambdas while traversing from ingress edge unit 60 to egress edge unit 160. The variable length packets 83 shown in FIG. 7 are illustrated as six variable length packets contained in each lambda, though the packets can wrap around to overlap more than one lambda. Thus, as shown in FIG. 7, the data packet. $82_1$ is a super packet containing 96 individual variable length packets 83, all destined for the same egress edge unit 160 (i.e., the "first" egress edge unit). It should be understood that the super packet could comprise a single data packet or any other number of data packets that filled up all or a portion of the space available in the sixteen lamdbas (i.e., there are no limitations on the number of individual packets contained within a super packet). FIG. 7 illustrates that the present invention can aggregate data at each ingress edge unit 60 into super packets prior to forwarding the data to the egress edge unit 160 for which the data is intended. Thus, prior to when the super packet $82_1$ reaches the optical switch fabric 70, the core controller 40 will uniquely close one path in the switch to the first egress edge unit 160 (at a time that will prevent blocking or congestion with other packets intended for the first edge unit 160 coming from any of the other three ingress edge units 60) to allow the super packet $82_1$ to be transmitted to the first egress edge unit 160.

Figure 8:
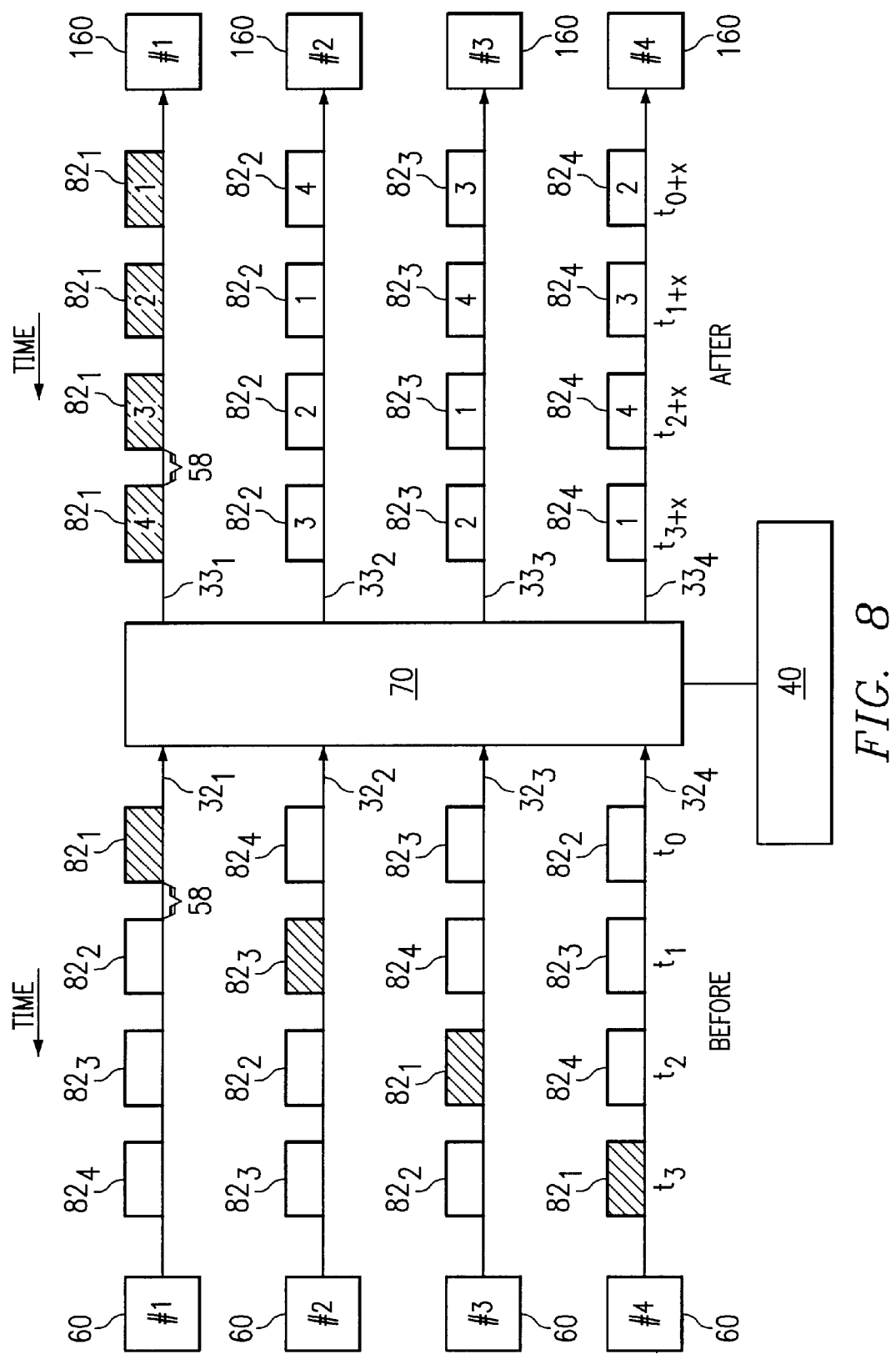
FIG. 8 shows an example of optical switching and patterning according to the present invention for an even data distribution that results in non-blocking, full utilization packet processing.
Figure 9:
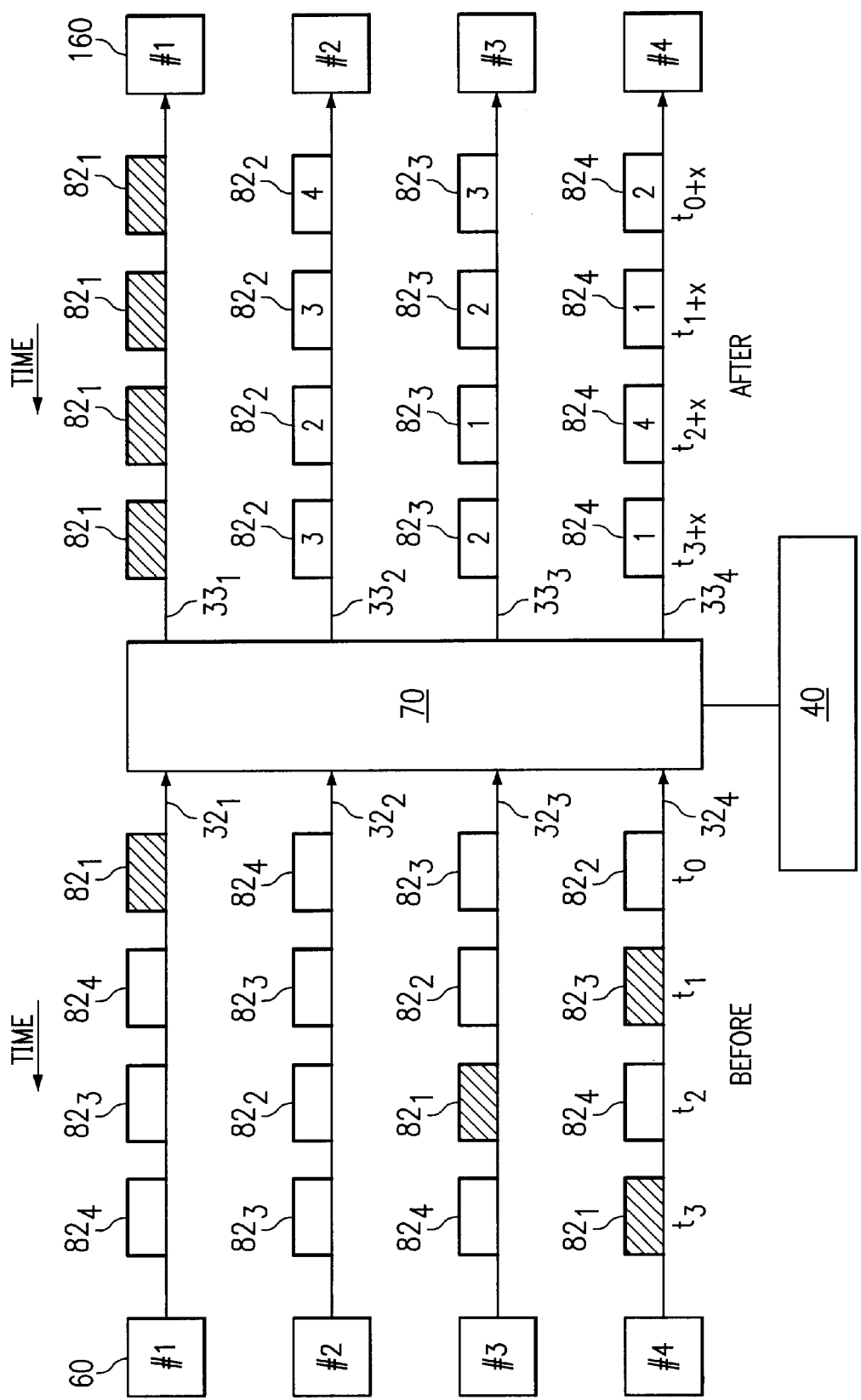
FIG. 9 shows an example of optical switching and patterning according to the present invention for an uneven data distribution that results in non-blocking, full utilization packet processing.
Figure 11A:
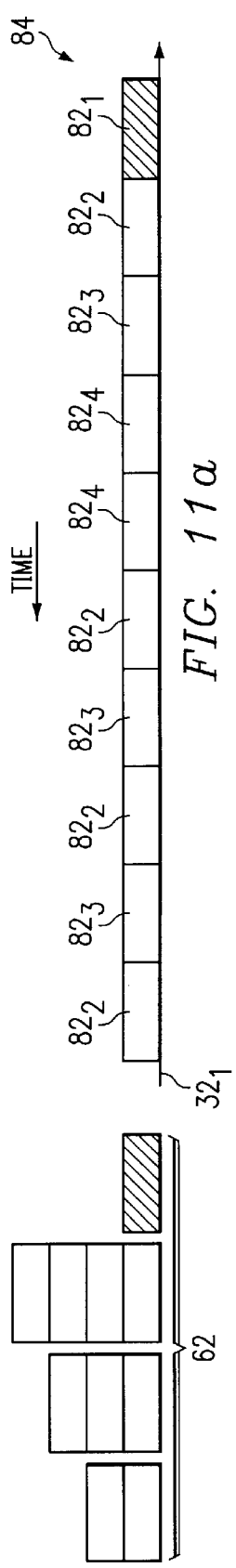
Figure 11B:
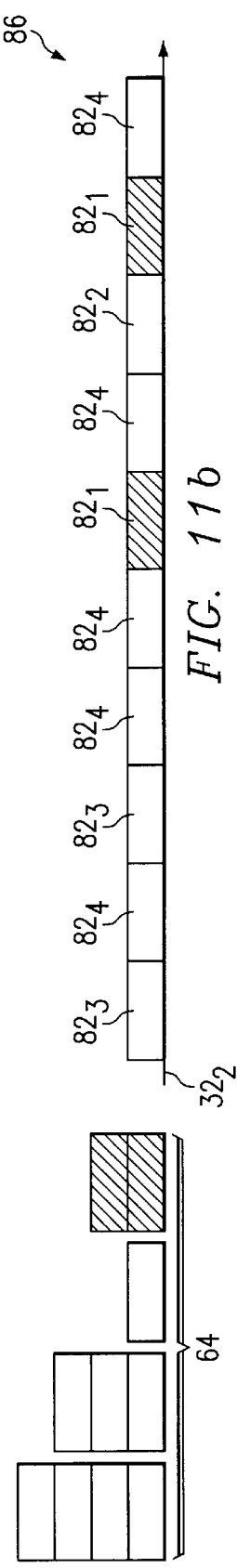
Figure 11C:
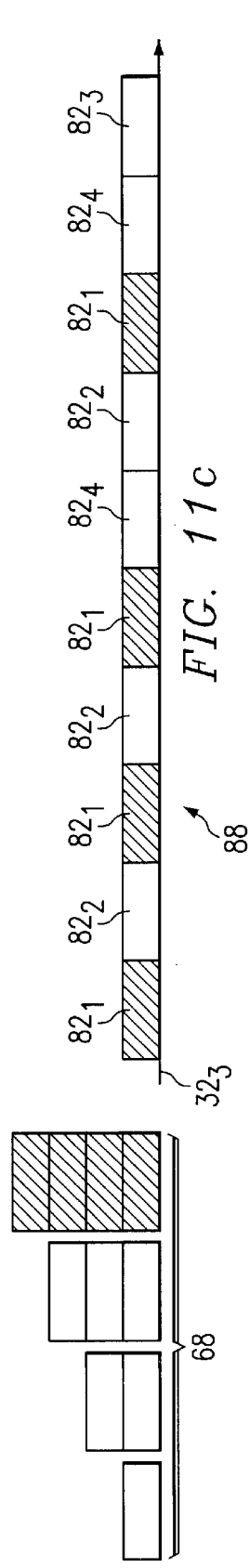
Figure 11D:
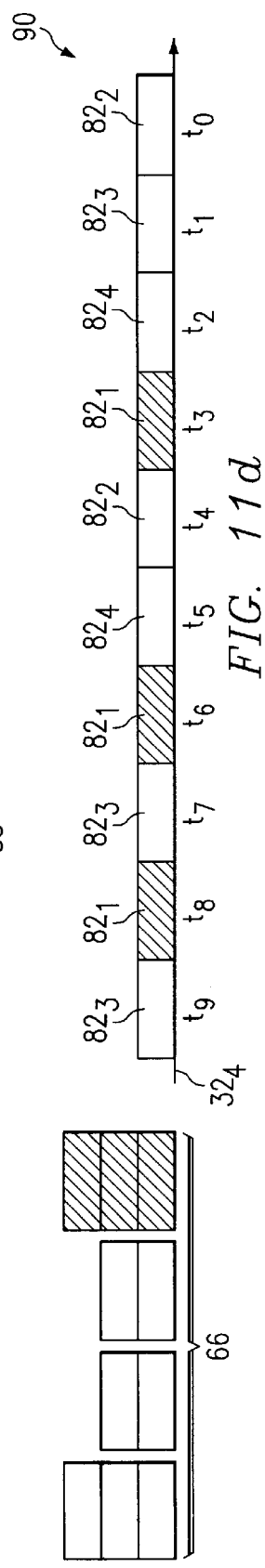

FIGS. 8–11 illustrate several examples of "slot routing" of super packets according to the present invention. FIGS. 8–9 show super packet aggregation and switching for the four ingress/four egress edge unit configuration of FIG. 7 with equal egress distribution (i.e., one fourth of the received optical data at each ingress edge unit 60 is intended for each of the four egress edge units 160). FIG. 8 specifically illustrates the situation where the initial bandwidth allocation is an even distribution (i.e., the super packets arriving on each ingress super packet link 32 from each ingress edge unit 60 arrive in an evenly distributed pattern). The super packets 82 to the left of the optical switch fabric 70 illustrate a snapshot of time that shows sixteen super packets having been placed on the ingress super packet links 32 at four different times ($t_0, t_1, t_2$ and $t_3$). The super packets 82 to the right of the optical switch fabric 70 illustrate the same sixteen super packets a time period "x" later after the sixteen super packets routed through the optical switch fabric and have been placed on the egress super packet links 33.

As shown in FIG. 8, the first ingress edge unit 60 places super packet $82_1$ on ingress super packet link $32_1$ at time $t_0$, then places super packet $82_2$ on ingress super packet link $32_1$ at time $t_1$, then places super packet $82_3$ on ingress super packet link $32_1$ at time $t_2$, and finally places super packet $82_4$ on ingress super packet link $32_1$ at time $t_3$. The second ingress edge unit 160 places the four super packets on ingress super packet link $32_2$ in the same order, but with each super packet delayed by one time unit (e.g., the second ingress edge unit 60 places super packet $82_4$ on ingress super packet link $32_2$ at time $t_0$, then places super packet $82_1$ on ingress super packet link $32_2$ at time $t_1$, then places super packet $82_2$ on ingress super packet link $32_2$ at time $t_2$, and finally places super packet $82_3$ on ingress super packet link $32_2$ at time $t_3$.). The third and fourth ingress edge units place the super packets on ingress super packet links $32_3$ and $32_4$ in a similar pattern (each one more time unit delayed).

Thus, as the super packets 82 arrive at the optical switch fabric 70, at any given moment in time, the optical switch 70 is always receiving four super packets, where each super packet is intended for a different egress edge unit 160. For example, at time $t_0$, super packet $82_1$ arrives on ingress super packet link $32_1$, super packet $82_4$ arrives on ingress super packet link $32_2$, super packet $82_3$ arrives on ingress super packet link $32_3$, and super packet $82_4$ arrives on ingress super packet link $32_4$. The optical switch fabric 70, in concert with optical core controller 40, closes the switch connecting ingress super packet link $32_1$ to egress super packet link $33_1$ to place super packet $82_1$ onto egress super packet link $33_1$ destined for the first egress edge unit 160. Similarly, the optical switch fabric 70 switches super packet $82_4$ to egress super packet link $33_2$ destined for the second egress edge unit 160, super packet $82_3$ to egress super packet link $33_3$ destined for the third egress edge unit 160 and super packet $82_4$ to egress super packet link $33_4$ destined for the fourth egress edge unit 160. The switching within optical switch fabric 70 can occur as described earlier.

In this even distribution scenario, since only one super packet 82 destined for any particular output address arrives at any particular time, the switching in the optical switch fabric 70 can occur without induced delay and without contention. This is illustrated in FIG. 8 by the column of super packets 82 shown on the egress super packet links 33 at time $t_0+x$, where x is an amount of time great enough to process the super packets through the optical switch fabric 70. The numerals shown in each of the super packets 82 indicate the egress edge units 160 to which the super packet is destined (e.g., the subscript numeral "1" in super packet $82_1$ on egress super packet link $33_1$ at time to+x indicates that the super packet is destined for the first egress edge unit 160). Each of the super packets 82 is processed similarly so that at a time "x" later, each super packet 82 has been routed to the appropriate egress super packet link 33 connected to the egress edge unit 160 for which the super packet is destined. Thus, each of the super packets $82_1$ gets routed to the first egress edge unit 160 via egress super packet link $33_1$. FIG. 8 illustrates a switching and routing system and method where there is no loss of super packet link capacity or loss of data, even under a one hundred percent utilization scenario. A one hundred percent utilization scenario is one in which there are no "gaps" in data out of the optical switch fabric 70 to the egress edge units 160, other than the switching time gap 58 which is necessary under current switching technology (e.g., SOA technology and/or other switching/control technology) to prevent distortion of the super packets 82 during switching. Currently, for super packets of approximately one microsecond in duration, the switching gap required can be on the order of approximately 5–10 nanoseconds. The architecture of the present invention can use and take advantage of faster switching technologies that provide smaller switching gaps 58.

As shown in FIG. 8, at each time interval a super packet 82 from each ingress edge unit 60 is traveling to each of the four egress edge units 160 (i.e., each of the ingress and edge units is operating at one erlang). Thus, in the FIG. 8 embodiment, at each time period, the optical switch fabric 70 is closing four switch paths simultaneously (to place each of the incoming super packets on a different egress super packet link 33) without congestion because of the non-blocking nature of the optical switch fabric 70.

FIG. 9 shows the system of FIG. 8 operating under an uneven distribution data scenario while still obtaining one hundred percent utilization, provided that at each time interval each super packet that arrives at the optical switch 70 is destined for a different egress edge unit 160. The uneven distribution of FIG. 9 results in no super packet $82_2$ destined for the second egress edge unit over time periods $t_0$, $t_1$, $t_2$ and $t_3$ originating from the first ingress edge unit 60 (shown on super packet link $32_1$). Similarly, there is an uneven data distribution from each ingress edge unit 60 to the optical switch fabric 70. However, at each time interval, each super packet arriving at the optical switch fabric 70 is intended for a different egress destination. Thus, the switching within the optical switch fabric 70 can occur as described in FIG. 8 to allow simultaneous switching of each of the arriving super packets onto a different egress super packet link 33. Thus, as in FIG. 8, the present invention achieves one hundred percent utilization with no loss of data or contention between data packets.

In the uneven data distribution case of FIG. 9, the one hundred percent utilization is accomplished by aggregating super packets at the ingress edge units 60 and sending them to the optical switch fabric 70 so that, at any time interval, one and only one super packet arrives for each of the egress edge units 160. This is accomplished by analyzing the incoming data arriving at each of the ingress edge units and developing patterns of super packet delivery (based on destination egress edge unit) from each ingress edge unit 60 to the optical switch fabric 70. This process of analysis and pattern development is accomplished by the core controller 40 based on input from all of the ingress edge units 60. Based on this input, the core controller 40 instructs each ingress edge unit 60 how to arrange the incoming data into super packets, and at what order to send the super packets to the optical switch fabric 70 based on the egress destination for each super packet. This results in a "pattern" for each ingress edge unit 60 that defines when each ingress edge unit 60 will send super packets to the optical switch fabric 70. For example, in FIG. 9 at time to super packets arrive from the four ingress edge units 60 at the optical switch fabric as follows: super packet $82_1$ arrives from ingress edge unit number 1, super packet $82_4$ arrives from ingress edge unit number 2, super packet $82_3$ arrives from ingress edge unit number 3, and super packet $82_2$ arrives from ingress edge unit number 4 (all arriving over ingress super packet link $32_1$); at time $t_1$ super packet $82_4$ arrives from ingress edge unit number 1, super packet $82_3$ arrives from ingress edge unit number 2, super packet $82_2$ arrives from ingress edge unit number 3, and super packet $82_1$ arrives from ingress edge unit number 4 (all arriving over ingress super packet link $32_2$); at time $t_2$ super packet $82_3$ arrives from ingress edge unit number 1, super packet $82_2$ arrives from ingress edge unit number 2, super packet $82_4$ arrives from ingress edge unit number 3, and super packet $82_4$ arrives from ingress edge unit number 4 (all arriving over ingress super packet link $32_3$); and at time $t_3$ super packet $82_4$ arrives from ingress edge unit number 1, super packet $82_3$ arrives from ingress edge unit number 2, super packet $82_2$ arrives from ingress edge unit number 3, and super packet $82_1$ arrives from ingress edge unit number 4 (all arriving over ingress super packet link $32_4$). This "pattern" of sending super packets intended for particular destinations at particular time intervals from each ingress edge unit 60 will result in all the super packets arriving at the optical switch fabric 70 at a particular time being intended for different egress edge units 160. This, in turn, allows the non-blocking switch fabric 70 to switch each of the arriving super packets to the appropriate output egress edge unit 160 at approximately the same time and provides full utilization of the data transport capacity. Delivery of super packets to the optical switch fabric 70 according to this "pattern" prevents collisions by ensuring that two super packets intended for the same egress edge unit 160 do not arrive at the optical switch fabric 70 at the same time. Further, as shown in FIG. 9, the core controller 40 can impose a pattern that fully utilizes capacity (i.e., no gaps between super packets on the egress super packet links 33). Thus, the present invention can avoid collisions and loss of data, while maximizing utilization through pattern development using the core controller 40 in conjunction with a non-blocking optical switch fabric 70 and a super packet building capacity at the ingress edge units 60.

This provides an advantage over previously developed optical switching and routing systems which simply minimize the number of collisions of data. In contrast, the present invention can avoid collisions altogether based on scheduling incoming data through a non-blocking optical switch 70 based on the data destinations (not just limiting collisions to statistical occurrences).

As discussed, the pattern developed by the core controller 40 is dependent upon the destination of incoming packets at the ingress edge units 60 (and can be dependent on many other packet flow characteristics such as quality of service requirements and other characteristics). Thus, the pattern developed must avoid the arrival of two super packets intended for the same egress edge unit 160 at the same time. Any pattern that avoids this issue is acceptable for processing super packets from ingress to egress edge units. The pattern can be further optimized by examining other packet flow characteristics. The pattern can be updated in a regular time interval or any other metric (e.g., under-utilization of an egress super packet link 33 of a particular magnitude, etc . . . ). The period of time a pattern can remain in place can depend upon the rate of change in incoming data destination distribution across each of the ingress edge units 60 (i.e., the more consistent the data destination at each ingress edge unit 60, the longer a particular pattern can remain in effect). Furthermore, the building of super packets at the ingress edge units 60 based on destination provides the ability to maximize utilization of the data processing capacity, even when the destination distribution of incoming data at each ingress edge unit 60 is uneven. In other words, the switch core controller 40 monitors all the ingress edge units 60 to allow the data from any ingress unit 60 to be switched to any egress edge unit 160 without contention in the optical switch core fabric 70 using a "just in time" scheduling algorithm practiced by the core controller 40.

FIGS. 10 and 11 shows graphically a more complex incoming data distribution at each of four ingress edge unit 60 and a scheduling algorithm that will result in no contention and one hundred percent utilization. Each ingress edge unit 60 receives enough incoming data to create and/or fill ten super packets, with an uneven distribution across the destinations of the super packets. In FIG. 10, the data distribution diagram 62 for ingress edge unit #1 shows that the incoming data at ingress edge unit #1 will create per time unit (t) one super packet $82_1$ intended for egress edge unit number 1, four super packets $82_2$ intended for egress edge unit number 2, three super packets $82_3$ intended for egress edge unit number 3, and two super packets $82_4$ intended for egress edge unit number 4. Similarly, the data distribution diagram 64 shows that the data distribution for ingress edge unit #2 is two super packets $82_1$ intended for egress edge unit number 1, one super packet $82_2$ intended for egress edge unit number 2, three super packets $82_3$ intended for egress edge unit number 3, and four super packets $82_4$ intended for egress edge unit number 4. Data distribution diagram 66 for ingress edge unit #3 shows three super packets $82_1$ intended for egress edge unit number 1, two super packets $82_2$ intended for egress edge unit number 2, two super packets $82_3$ intended for egress edge unit number 3, and three super packets $82_4$ intended for egress edge unit number 4. Finally, data distribution diagram 68 for ingress edge unit #4 shows four super packets $82_1$ intended for egress edge unit number. 1, three super packets $82_2$ intended for egress edge unit number 2, two super packets $82_3$ intended for egress edge unit number 3, and one super packet $82_4$ intended for egress edge unit number 4.

Each ingress edge unit 60 can be built to have an identical amount of bandwidth per unit of time used to transport data to the optical switch core 30. In such a case, each ingress edge unit 60 can only produce a fixed number of super packets per unit of time because of the fixed available bandwidth. In the case of FIG. 10, each ingress edge unit 60 produces ten super packets for the defined time interval. It should be understood that while each edge unit could not produce a greater number of super packets than the allocated bandwidth, each could produce fewer than the maximum number (though this would not represent a fully congested situation) and each could produce an unequal number of super packets.

FIG. 11 shows data scheduling patterns for each of the four ingress edge units 60 based on the uneven distribution described in FIG. 10 that result from a scheduling algorithm that allows for non-blocking scheduling with full utilization in a fully congested data flow scenario. In other words, the resulting scheduling patterns 84, 86, 88 and 90 will provide super packet data to the optical switch fabric 70 so that no two super packets intended for the same egress edge unit 160 arrive at the same time and there are no data gaps (i.e., full capacity utilization) between super packets from the optical switch 70 to the egress edge units 160. Thus, if the incoming data destinations over the defined time interval continues to approximate those shown in FIG. 10, the scheduling patterns of FIG. 11 can be repeated to allow non-blocking, fully utilized super packet data switching and delivery.

As shown in FIG. 11, the scheduling pattern 84 for ingress edge unit #1 shows the outputting of super packets from ingress edge unit #1 onto ingress super packet link $32_1$ in the following order: one super packet $82_1$, one super packet $82_2$, one super packet $82_3$, two super packets $82_4$, one super packet $82_2$, one super packet $82_3$, one super packet $82_2$, one super packet $82_3$ and finally one super packet $82_2$ (where the subscript indicates the destination edge unit). The scheduling pattern 86 for ingress edge unit #2 is as follows: one super packet $82_4$, one super packet $82_1$, one super packet $82_2$, one super packets $82_3$, one super packet $82_1$, two super packets $82_4$, one super packet $82_3$, one super packet $82_4$ and finally one super packet $82_3$. The scheduling pattern 88 for ingress edge unit #3 and the scheduling pattern 90 for ingress edge unit #4 are as indicated in FIG. 11. It can easily be seen that for any selected time, these four scheduling pattern result in four super packets that are destined for a different egress edge unit 160. Thus, the four scheduling patterns 84, 86, 88 and 90 will cause super packets to be sent from the four ingress edge units in a manner that will avoid having two super packets destined for the same egress edge unit arriving at the optical switch fabric 70 at the same time. Furthermore, the core controller 40 can utilize this algorithm to establish one hundred percent utilization (no data gaps between the optical switch fabric 70 and the egress edge units on any egress super packet link 33). Thus, FIG. 11 illustrates another technical advantage of the present invention in that the present invention can run in a congested mode (i.e., full utilization) at all times with no packet collision or loss of data. This full utilization maximizes the throughput of data over the available capacity.

FIG. 12*a* shows in more detail a block diagram of one embodiment of an ingress edge unit 60 of the present invention. While the specific embodiment of the ingress edge unit 60 of FIG. 12*a* is a 160 Gigabit ingress edge unit 60, it should be understood that the ingress edge unit 60 is scalable to accommodate any data rate. The input to the ingress edge unit 60 comes from a series of ingress network ports 28, where each ingress network port 28 connects to one of multiple ingress edge interface port cards 92, each ingress port card 92 connects to one of multiple ingress super packet processors 110, and each ingress super packet processor 110 connects to a single ingress super packet factory 120. In the example architecture, the ingress network ports 28 comprise sixteen 10 Gbps ports, where each ingress network port 28 connects to one of sixteen ingress edge interface port cards 92. Data flows into ingress edge unit 60 through an ingress network port 28 to a particular ingress port card 92 that classifies the data based on destination. The classified data from each of the ingress port cards 92 is sent to the associated ingress super packet processors 110 for queuing based on the data type contained in the incoming data packets (to create "partial" super packets that contain data that is destined for a particular egress edge unit 160.), and from the super packet processors 110 is then sent to the ingress super packet factory 120 where the super packets are queued and constructed, based on the destination port of the incoming data, for delivery to the appropriate egress edge unit 160. It should be understood that the packet classification, partial super packet construction and super packet aggregation functions can be performed by different physical units (e.g., the packet classification can be accomplished on the port card 92).

The super packets are delivered from the ingress super packet factory 120 over an edge unit DWDM optical fiber 94 across multiple lambda (e.g., sixteen lambda). It should be understood that as the number of wavelengths that can be processed over each DWDM optical fiber 94 increases, the overall capacity of the ingress edge unit 60 can be increased proportionally (e.g., if the number of wavelengths that can be accommodated over the DWDM optical fiber increases from sixteen to thirty-two, the overall capacity of the edge unit can be increased to 320 Gbps by increasing the number of ingress port cards 92 and ingress super packet processors 110 to thirty-two each (and receiving incoming data from thirty-two network ports 28 at 10 Gbps each).

FIG. 12b shows in more detail a block diagram of one embodiment of an egress edge unit 160 of the present invention. While the specific embodiment of the egress edge unit 160 of FIG. 12b is a 160 Gigabit egress edge unit 160, it should be understood that the egress edge unit 160 is scalable to accommodate any data rate. The input to the egress edge unit 160 is a super packet link 33 from the optical switch 70 that delivers super packets destined for that particular egress edge unit 160 to the egress super packet factory 140. The super packets are de-aggregated (i.e., de-constructed or disassembled) into egress partial super packets (i.e., containing data intended for a particular egress destination port 128) and delivered from the egress super packet factory 140 to the egress super packet processor 150. The egress super packet processor 150 processes the partial super packets to an egress edge unit 166, further to egress network ports 128.

Figure 13:
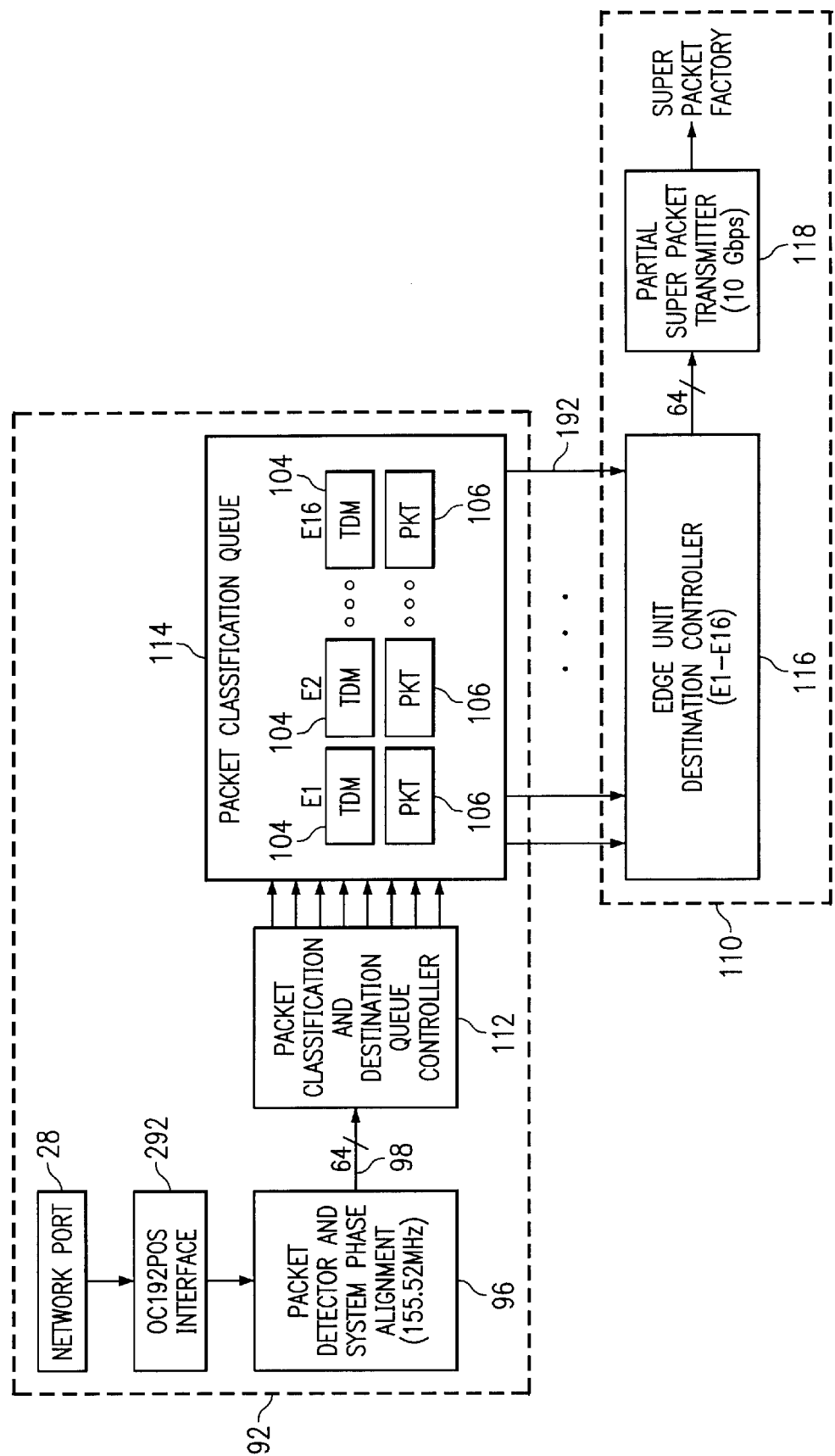
FIG. 13 shows one embodiment of an ingress super packet processor of an ingress edge unit according to the present invention.

FIG. 13 shows one embodiment of an ingress super packet processor 110 that is receiving data from the network port 28, processing the data, and forwarding the incoming data to an ingress super packet factory 120. Incoming data is received through ingress network port 28 to an ingress interface port 92 that provides an interface to allow incoming data to be processed through the ingress super packet processor 110. For example, the data could represent OC192 packet-over-sonet data that is converted from an optical signal an electrical signal in order to allow for timing recovery at the ingress port interface 92 (or other data packet format, such as OC48, packet-over-wavelength, IP, etc . . . ). The data is then forwarded to a packet detector 96 to determine the beginning and ending of the incoming packets. The packet detector 96 can also phase align the incoming data and converts the incoming data from a serial format to a parallel format (e.g., 64 bit parallel).

The packet classification process is used to classify the data contained in the optical (or converted to electrical) data packets. Based on the packet classification, the packet classification controller 112 can route the incoming packets into appropriate destination queues within the packet classification queue 114 that comprises a variety of queues. The packet classification queue 114 is a memory device containing individual queues (or buffers) for storing various portions of the incoming data packets. In one embodiment, packet classification is performed by the packet classification controller 112 which can examine the header information for each incoming data packet to determine (i) to which egress edge unit 160 each incoming data packet is destined (ii) to which egress port 128 at the destination egress edge unit it is destined and (iii) other data routing characteristics (e.g., quality of service requirements and whether the incoming data packet contains TDM data (i.e., any non-packet data such as voice data, video data or other constant bandwidth data)-or packet data). As shown in the FIG. 13 embodiment, the packet classification controller 112 will route the TDM data to TDM queues 104 while routing packet data to PKT queues 106 within the packet classification queue 114. In an alternative embodiment, the ingress port 92 will perform the packet classification as is more fully described at FIGS. 22–26.

As shown in FIG. 13, there is one set of TDM queues 104 (sixteen in the specific example) and one set of PKT queues 106 (again, sixteen for the FIG. 13 example). It should be understood that there can be additional sets of PKT queues 106 (for example, a different set of PKT queues for each different quality of service requirement for the packet data) and TDM queues 104. The example of one set of each type of queue is for illustration purposes only. The number of TDM queues 104 and PKT queues 106 within each set of TDM and PKT queues is determined by the number of egress edge interface destinations available. In the example of FIG. 13, there are sixteen potential egress edge units 160 that are potential destination points for any incoming data packet. Therefore, there need to be sixteen individual TDM queues 104 and sixteen individual PKT queues 106 in each set of queues, where each TDM queue 104 and each PKT queue 106 is assigned to one of the sixteen egress edge units 160. Thus, the TDM queue 104 assigned to the first egress edge unit 16.0 collects the TDM data from incoming packets intended for the first egress edge unit 160, while the PKT queue 106 assigned to the first egress edge unit 160 collects the PKT data from incoming packets intended for the first egress edge unit. Likewise, the remaining TDM queues 104 and PKT queues 106 collect their respective data type from incoming data that is intended for the egress edge unit to which that particular queue is assigned. Thus, all of the TDM data intended for any particular egress edge unit 160 gets collected in one particular TDM queue 104 and all of the packet data intended for any particular egress edge unit 160 gets collected in a single PKT queue 106 (and no packet data intended for any other egress edge unit 160 gets collected in that particular PKT queue 106).

Thus, each packet classification queue 114 begins the process of building super packets by building a "partial" super packet containing all of the data arriving at one specific network port 28 that is destined for a particular egress edge unit 160. Furthermore, each packet classification queue can hold partial super packets addressed to each egress edge unit 160 in the optical router 50. The partial super packets will remain in the packet classification queue 114 for an appropriate amount of time based on management of the packet classification queue 114 and the super packet ingress queue 124. This queue management is a function of the incoming data bandwidth requirements and the depth and occupancy of the packet classification and super packet ingress queues. The partial super packets will be extracted from the packet classification queue 114 in a manner that best avoids overflow of the packet classification queue 114 and the super packet ingress queue 124. In an alternative embodiment, the partial super packets can be output from the packet classification queue 114 when the partial super packets reach a predetermined size (or alternatively at predetermined time interval or some other metric), and the precise delay needed to control of delivery can be accomplished at the super packet ingress queue 124. However, if a particular TDM queue 104 or PKT queue 106 receives a large increase in data residing in the queue, the pattern can be updated and applied to allocate that particular queue more bandwidth over the router 50.

Partial super packets are forwarded to the ingress super packet factory 120. In the example shown in FIG. 13, each of the sixteen partial super packets can be sent out on a different output line 192 to an edge unit destination controller 116, then to a partial super packet transmitter 118, and finally to ingress super packet factory 120. The edge unit destination controller 116 controls when and how much data gets removed from the packet classification queue 114 based on the current pattern. The edge unit destination controller 116 provides control information (in the form of bandwidth management data) to the partial super packet ingress controller 122 and the ingress super packet transmit controller 126. The super packet transmit controller 126 receives this data and uses the data to create request bandwidth from the core controller 40 (which, in turn, uses this information from each ingress edge unit 60 to create the pattern).

Figure 14:
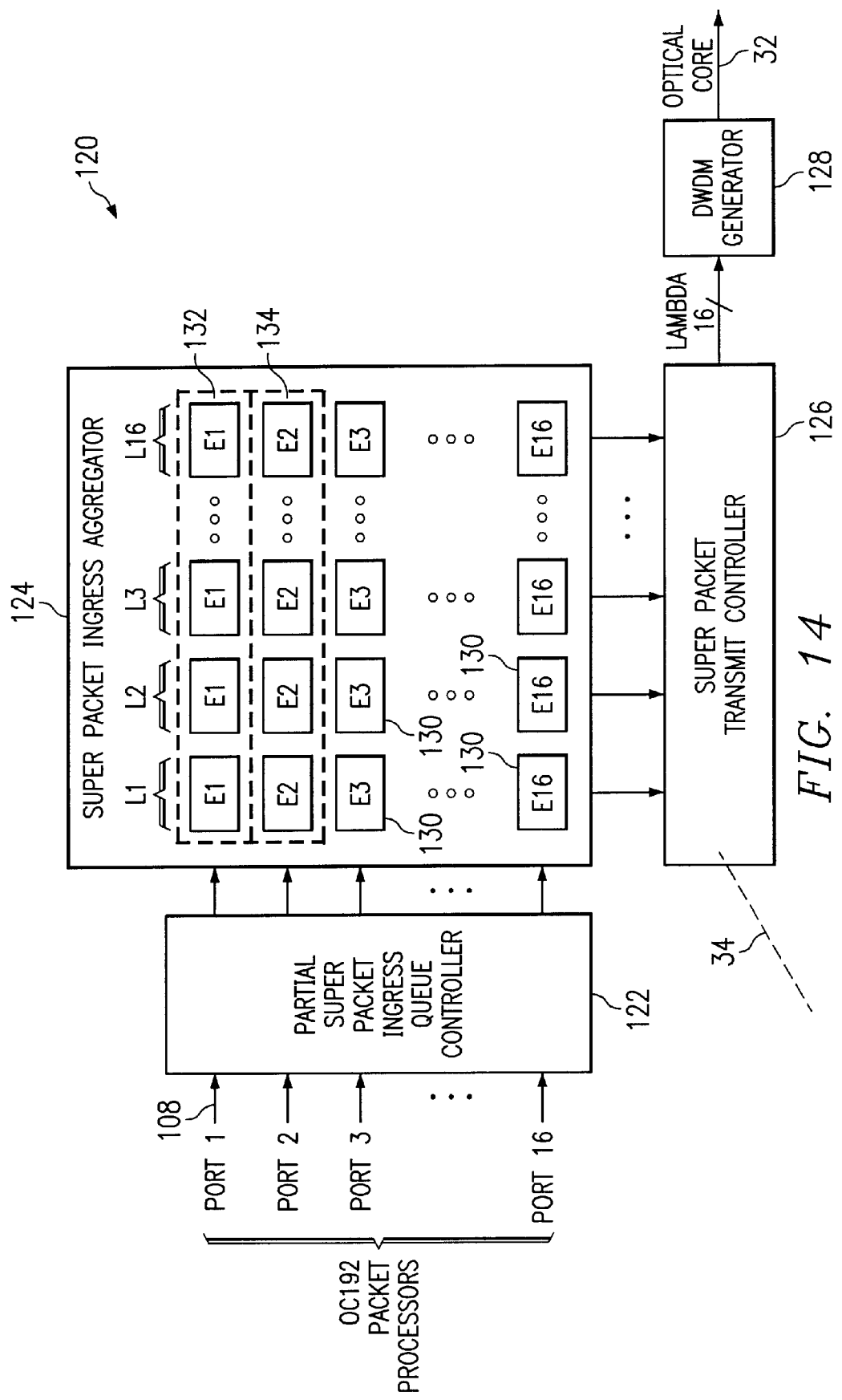
FIG. 14 shows one embodiment of an ingress super packet factory of an ingress edge unit according to the present invention.

FIG. 14 shows an embodiment of an ingress super packet factory 120 that receives the multiplexed partial super packets from each of the ingress super packet processors 110 for that particular ingress edge unit 60. In the example of FIG. 14, each of sixteen ingress super packet processors 110 sends its multiplexed partial super packets to the ingress super packet processor 120 through one of the sixteen ports 108 into a partial super packet ingress queue controller 122. The partial super packet ingress queue controller 122 receives the partial super packets and places each partial super packet in a destination/lambda queue 130 within the super packet ingress queue 124 based on (i) the destination egress edge unit 160 for that partial super packet and (ii) the lambda upon which the partial super packet will appear. Thus, for the example shown, partial super packets are destined for one of sixteen egress edge units 160 (illustrated by the sixteen rows of identical destination partial super packets, where each row is labeled E1, E2, . . . E16) and are to be placed upon one of sixteen lambdas (illustrated by the sixteen columns of different destination partial super packets, where each column is labeled L1, L2, . . . L16). Each destination/lambda queue 130 can contain partial super packets from any or all of the ingress super packet processors 110 within that particular ingress edge unit 60.

The ingress super packet factory 120 builds the super packets for any particular egress edge unit 160 by combining all of the partial super packets in any row of destination/lambda queues 132 within the super packet ingress queue 124. Thus, when a super packet destined for egress edge unit #1 should be forwarded to the optical switch core 130 from this particular ingress edge unit 60 (according to the pattern determined by the core controller 40 based on input received from the super packet transmit controller 126 relating to both the ingress super packet factory 120 bandwidth management data (looking at the super packet ingress queue 124 bandwidth) and the ingress super packet processor 110 bandwidth management data (looking at the packet classification queue 114 bandwidth management data.

In order to build and transmit a super packet, the super packet transmit controller 126 will collect all of the E1 partial super packet data in row number one (shown collectively as item 132) into a single super packet that can contain data intended for egress edge unit #1 over any of the sixteen lambdas. The super packet transmit controller 126 serializes the data contained in the first row 132 and sends serialized data out over sixteen lambdas to the DWDM generator 128, which sends all sixteen lambdas to the optical switch core 130 over a single ingress super packet link 32 as a single super packet.

In a similar fashion, when a super packet destined for egress edge unit number two is scheduled to be received from this particular ingress edge unit 60 (again, according to the scheduling pattern of this particular ingress edge unit 60), the super packet transmit controller 126 collects all of the data contained in the destination/lambda queues 130 in row two (collectively, shown as item 134), builds the super packet destined for egress edge unit number two and forwards the super packet to the optical switch core 130. Super packets for each egress edge unit 160 are built similarly in each ingress edge unit super packet factory 120. It should be noted that super packets can contain both TDM and PKT data within a single super packet. In one embodiment, TDM data will receive priority over PKT data when building super packets, however, it should be understood that any prioritization mechanism can be employed when building super packets. Furthermore, it should be understood that while the "pattern", can change over time based on the destination, type and wavelength of the incoming optical data, the entire pattern need not be altered. For example, the core controller 40 can "reserve" a portion of the available bandwidth for a particular type(s) of data (e.g., TDM data) such that the reserved portion is not subject to change as the data flow changes. The remaining portion of the bandwidth that is not reserved can then be patterned in a variable manner based on the incoming data flow.

To reiterate, the ingress super packet factory 120 allocates a number of independent super packet buffers (queues 130) based on the number of egress destinations. The ingress super packet factory 120 collects partial super packets from each of the appropriate ingress super packet factory buffers 130 in order to construct a complete super packet for each egress edge unit 160. Upon completion of a super packet, each of the queues 130 has subdivided the super packet into as many channels as there are wavelengths (lambdas) being utilized in the particular DWDM scheme of the optical router 50 for transmission to the optical switch core 130. The ingress super packet factory 120 monitors the short-term average data flow to each of its rows of queues (each in essence a "sub-factory") from the ingress super packet processors 110 and maintains a collection of information regarding the incoming data packets for each ingress edge unit 60 within the edge unit destination controller 116. This collection of data can include bandwidth demand, latency, and queuing depth among others for collecting the data routing information used to classify the incoming data packets. The optical core controller 30 collects this data from each ingress super packet factory 120 (and therefore for each ingress edge unit 60) and creates the just in time (JIT) scheduling pattern that is provided back to each ingress super packet factory 120. Thus, each super packet is built and sent from each sub-factory of the ingress super packet factory 120 according to the JIT scheduling pattern to maintain a proper bandwidth allocation of super packets on a per edge unit basis. This scheduling optimizes transmit bandwidth with a set amount of delay from each of the ingress super packet factory 120 destination/lambda queues 130 to eliminate congestion in the optical switch fabric 70 and minimize buffer overflow (packet loss) in both the ingress super packet processors 110 and ingress the super packet factories 120.

Figure 15:
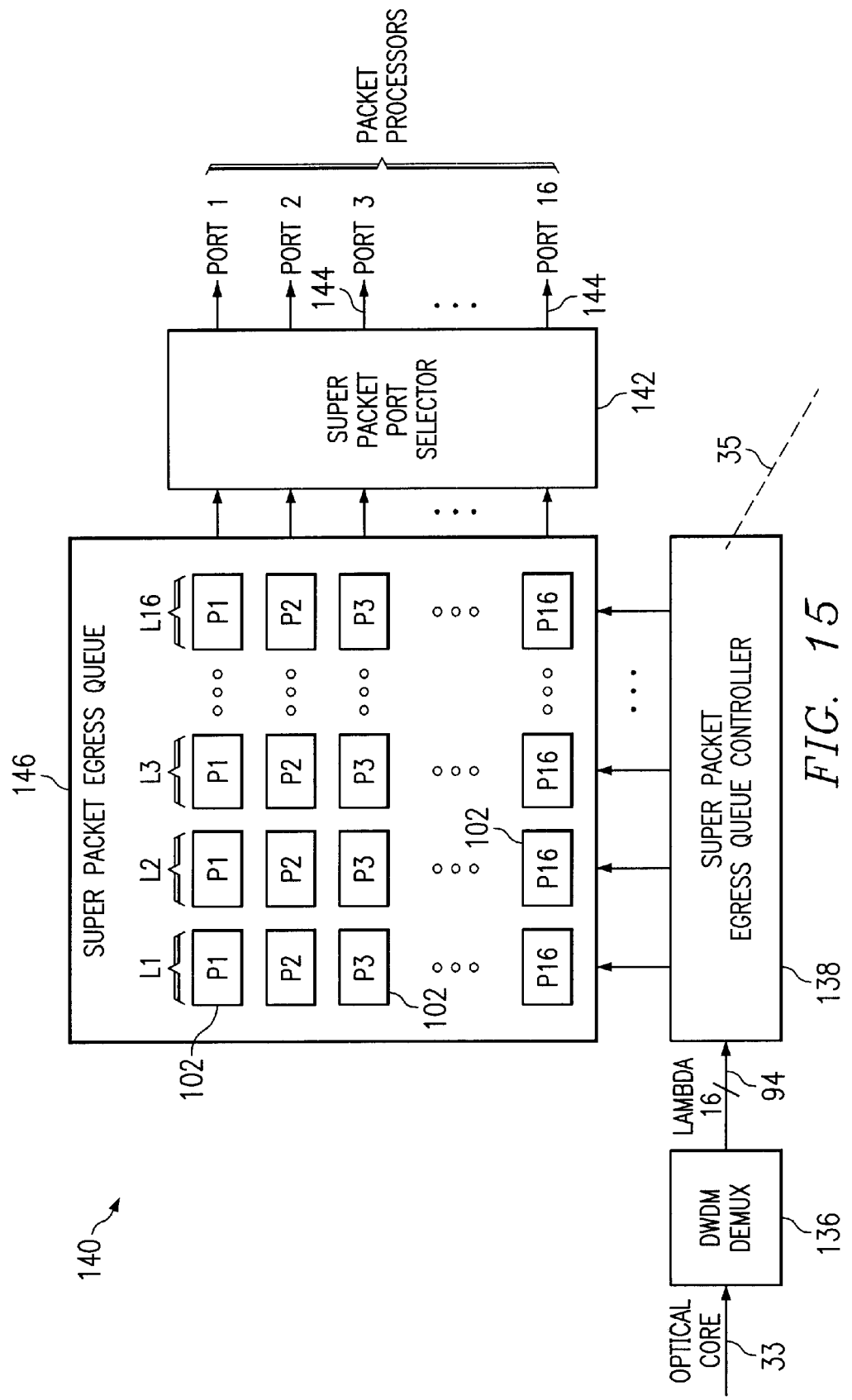
FIG. 15 shows one embodiment of an egress super packet factory of an egress edge unit according to the present invention.
Figure 16:
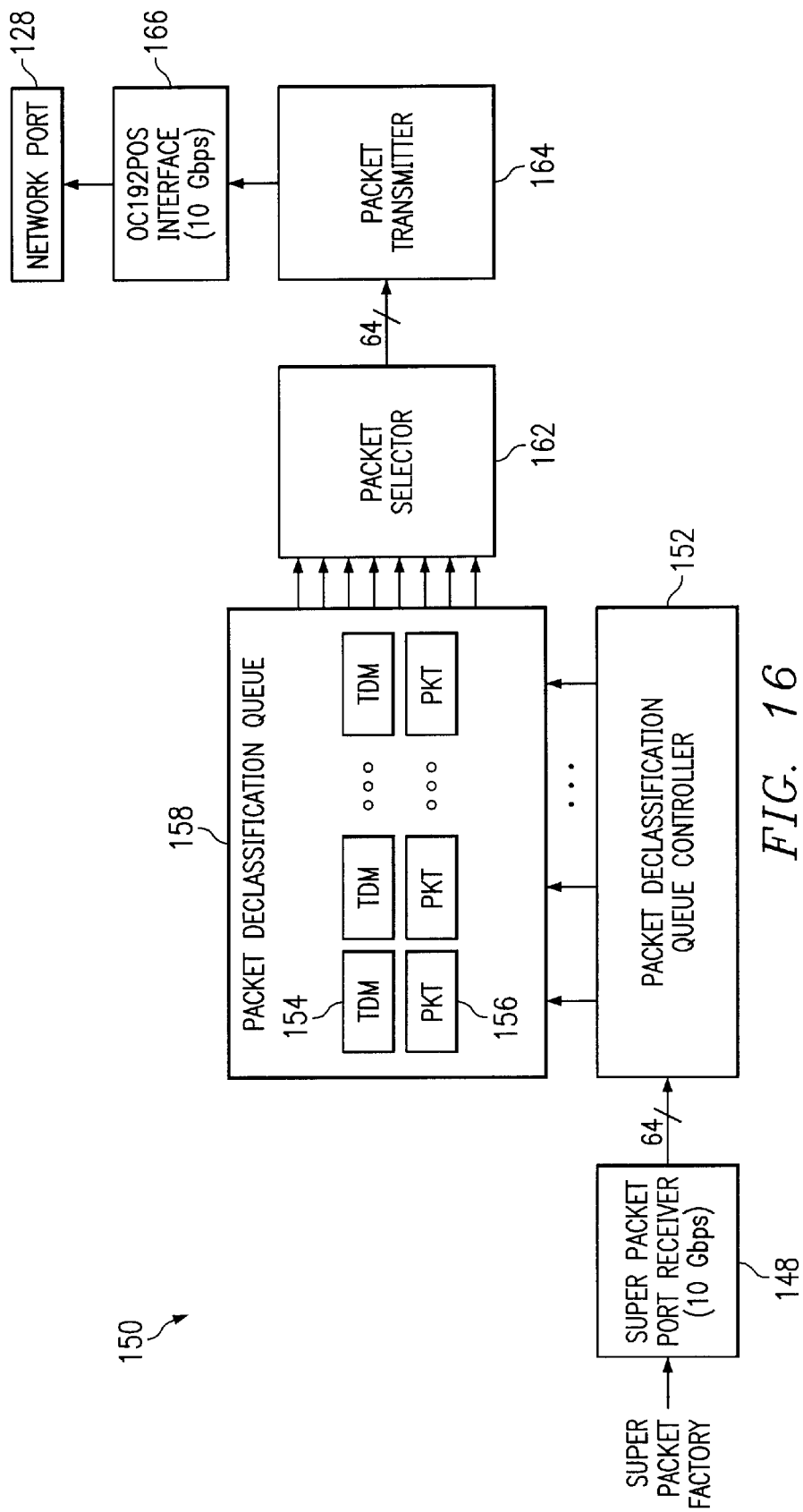
FIG. 16 shows one embodiment of an egress super packet processor of an egress edge unit according to the present invention.

FIGS. 15 and 16 discuss the egress data flow through the egress edge units 160 and for the most part reverses the operations described in FIGS. 13 and 14. FIG. 15 shows an embodiment of an egress super packet factory 140 that receives the super packets the optical switch core 130, de-constructs the super packets into partial super packets based on output destination and places them in queues and forwards partial super packets from these queues to the appropriate egress super packet processor 150. Super packets (with data potentially spanning all of the wavelengths available on the DWDM fibers) are received at the DWDM demultiplexer 136 on a single, multi-wavelength egress super packet link 33 from the optical switch fabric 70. The demultiplexer 136 demultiplexes the super packets and generates a optical stream for each wavelength in the DWDM lambda count (in our example, sixteen optical streams). The optical streams are then forwarded to the super packet egress queue controller 138 that places each wavelength in a port/lambda queue 102 (within super packet egress queue 146) based on the port to which the data is destined and the wavelength upon which the data had traveled (arrived). After this de-aggregation of the super packets into partial super packets based on port destination, the super packet port selector 142 forwards the data collected in each port/lambda buffer 102 to the appropriate port destination and egress QoS queue (e.g., all of the data in the first row of port/lambda buffers 102 that is intended for port number 1 is sent via line 144 to the egress super packet processor 150 associated with port number 1).

FIG. 16 shows one embodiment of an egress super packet processor 150 that is receiving data from an egress super packet factory 140, processes the super packet data and forwards the processed data to an output network port 128. An egress super packet processor 150 is associated with each output port 128 associated with each egress edge unit 160. Thus, in the example of FIG. 16, the egress super packet processor 150 is one of sixteen egress super packet processors 150 that process data to each of the sixteen output ports 128 connected to that particular egress edge unit 160. In operation, the egress super packet processor 150 receives the data intended for its associated egress network port 128 at the super packet port receiver 148 and forwards the data to the packet declassification queue controller 152. The packet declassification queue controller 152 receives the data intended for the particular port, de-classifies the data into its TDM and packet components, and forwards the TDM data to TDM queues 154 and forwards the packet data to PKT queues 156 within packet declassification queue 158. The TDM data can be transmitted from the TDM queues 154 on an expedited schedule for insertion into the output data stream for the network port 28. The packet declassification queue 158 is used in the egress super packet processor 150 in order to avoid overflow (and therefore loss of data) at the output network port 128. However, as can be seen the scheduling is far less complex at the egress super packet processor 150 (as compared to the scheduling at the ingress super packet processor 110) because the potential conflict is only between those data packets leaving that particular egress super packet processor 150.

The packet selector 162 selects TDM and packet data from the packet declassification queue 158 according to priority of the data based on the type of data is present and when data can be accepted at the output network port 128. The packet selector 162 will forward the data to the packet transmitter 164 for transmission to an interface module 166 to be converted into the proper format (TDM, packet or both) for transmission over the network through the network port 128. In both the case of TDM and packet data, the egress super packet processor 150 is synchronizing with the timing and format requirements of the output network port 128.

Figure 17:
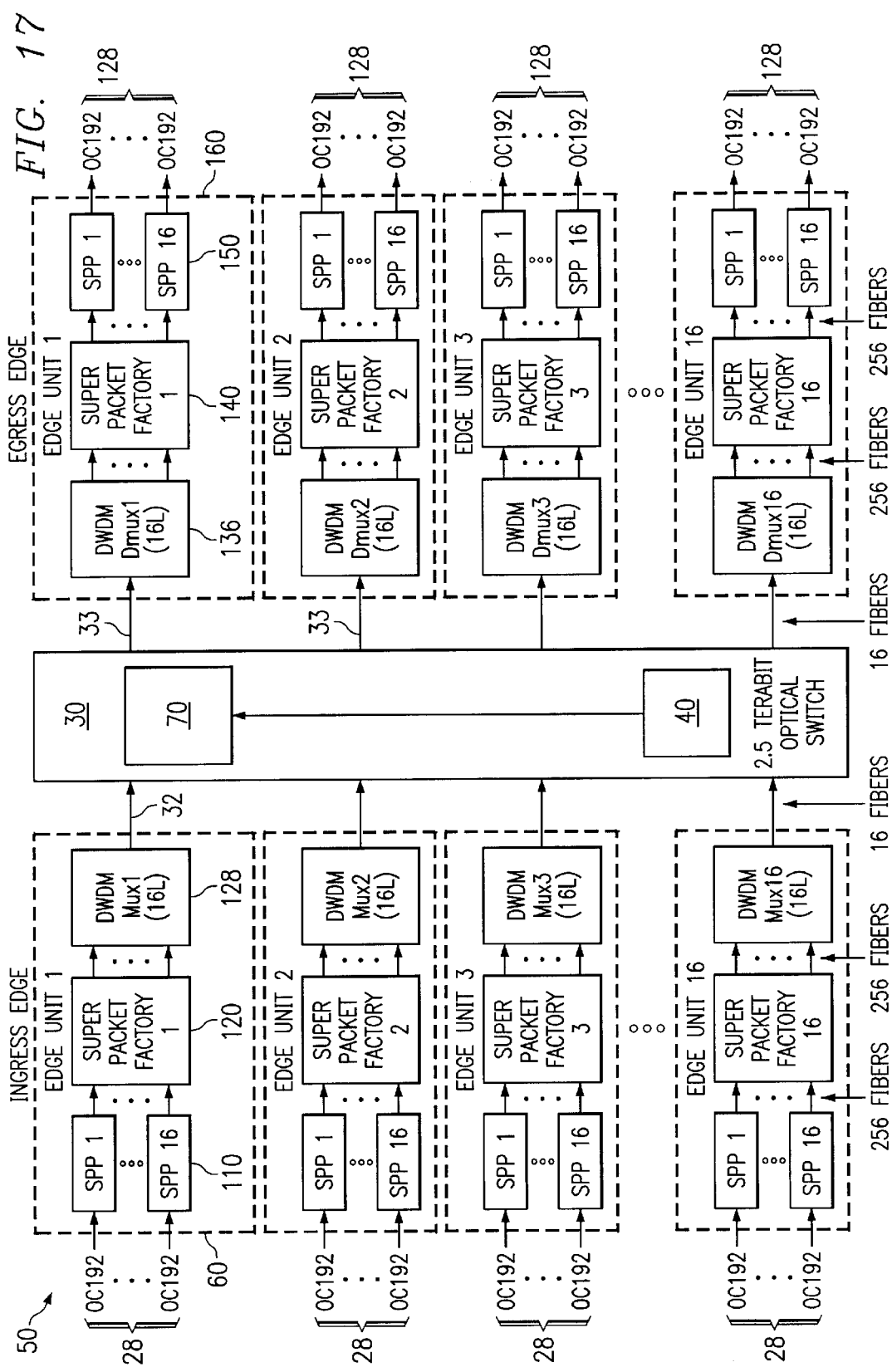
FIG. 17 shows an embodiment of the data path interconnect architecture of an optical router according to the present invention.
Figure 18:
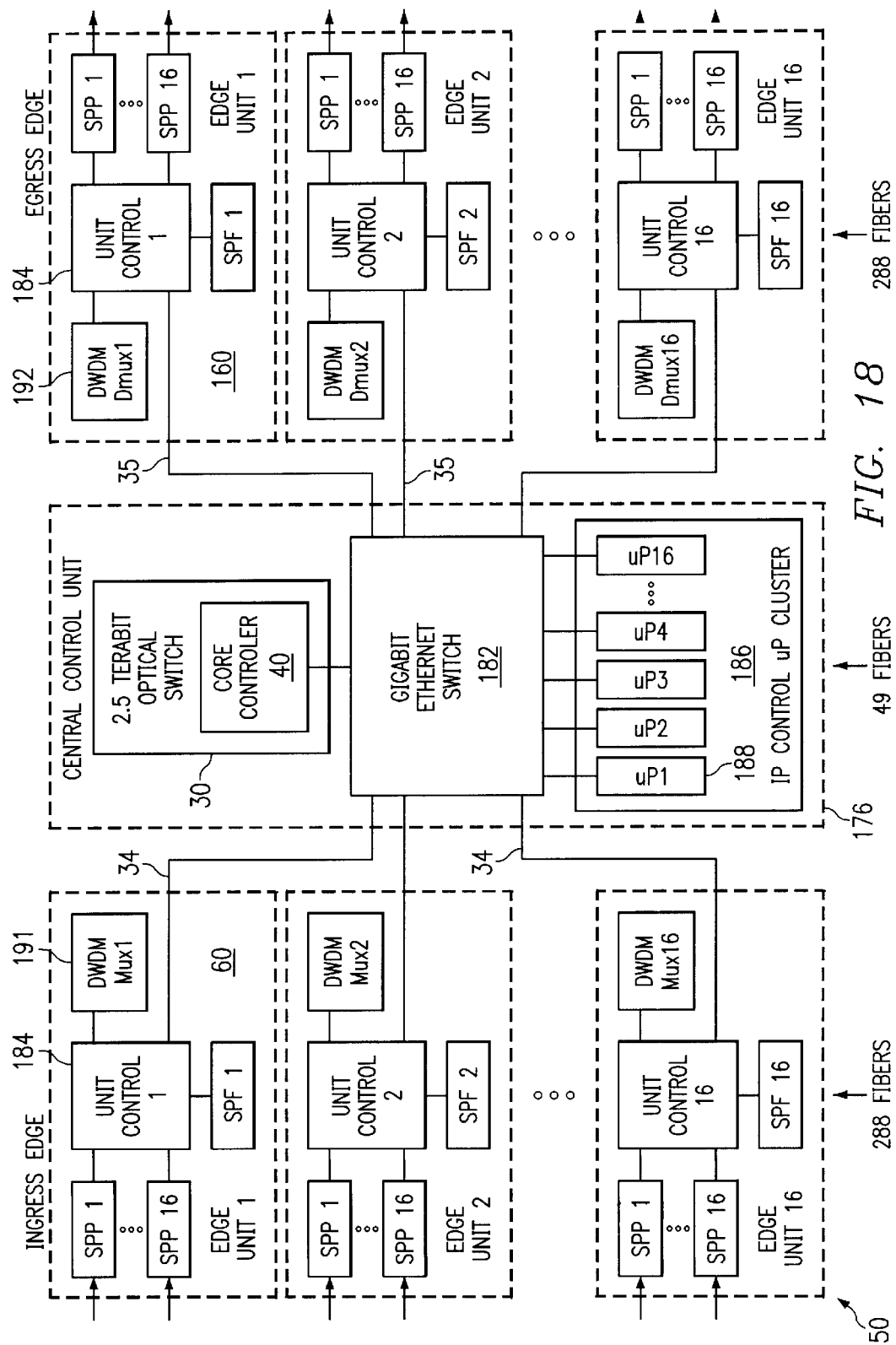
FIG. 18 shows an embodiment of the control path interconnect architecture of an optical router according to the present invention.

FIGS. 17 and 18 illustrate the path used to route the actual data through the optical network system 100 and the path used to route the control data for the optical network system 100. FIG. 17 shows an embodiment of the intra-system data path fiber interconnect 170 for a 2.5 terabit optical router 50 including OC192 packet-over-sonet interfaces to legacy networks. FIG. 17 is essentially a combination of FIG. 4 and FIG. 12 for this particular architecture (other architectures of the present invention have similar data paths). Data is received at the optical router 50 from any number of OC192 ports 28 connected to a plurality of ingress edge units 60 (shown in FIG. 17 as sixteen OC192 ports for each of sixteen ingress edge units 60). The data flows into each ingress edge unit 60 through to an ingress super packet processor 110 associated with the OC192 port 28. All of the ingress super packet processors 110 for each ingress edge unit 60 deliver data to an ingress super packet factory 120 for that edge unit 60. The super packet data from the ingress super packet factory 120 flows along sixteen lines to a multiplexer 128 and out the ingress super packet link 32 to the optical switch core 30 (comprising a core controller 40 and an optical switch fabric 70). The super packet data flows out of the optical switch core 30 along egress super packet links 33 to egress edge units 160. Within each egress edge unit 160, the super packet data flows through a demultiplexer 136 and into an egress super packet factory 140 that de-constructs the super packets. From there the data flows through a plurality of egress super packet processors 150 and out of the optical router through network ports 128.

FIG. 18 shows the control path 180 used in the optical network 100 to control the flow of data through the data path 170 of FIG. 17 and to control the synchronization of the router 50. The control path 180 features two levels of hierarchy where the top level is used for centralized, system wide control functions and the lower level is used for distributed, localized control functions. As shown in FIG. 18, the control path architecture 180 top-level control functions are located in a central control unit 176 and in the edge units. The central control unit comprises optical switch core 30, an Ethernet switch 182 (e.g., in the gigabit range), and an IP control cluster 186, while the edge units can each contain a unit controller 184. Each unit controller 184 can also act as a bridge to the lower level for any distributed functions within each edge unit. Each unit controller 184 can be connected to a multiplexer 191 or a demultiplexer 193, for an ingress edge unit 60 or an egress edge unit 160 respectively, for multiplexing/demultiplexing the control and/or synchronization signals. The IP control cluster 186 can contain all of the optical router 50 system applications, their management functionality and the microprocessors to implement the applications and functionality. Each microprocessor 188 in the IP control cluster 186, each unit controller 184 in the edge units and the core controller 40 all connect to the Ethernet switch 182 via data control links. This facilitates high bandwidth, high availability message exchanges between these elements to manage initialization, configuration, operation, fault management, and system upgrades and expansions.

The unit controllers 184 within each edge unit manage the local subsystems for both ingress and egress functions. The unit controller 184 manages the lower level of the control hierarchy, which is facilitated by an integral 100BaseT Ethernet switch for direct, point-to-point message exchange between all of these subordinate elements (e.g., the network interfaces 92, the super packet processors 110, the super packet factory 120, and the DWDM multiplexer for each ingress edge unit 60). The unit controller 184 can also be responsible for management of all edge unit 60 equipment issues related to, for example, initialization, configuration, operation, fault tolerance (e.g., detection, isolation, and recovery), and local feature enhancements (ICOFE) at the subsystem or unit level. Each of the local edge unit elements can contain a processor that manages these same internal ICOFE functions, strictly within that element.

The control hierarchy 180 for the present invention can be partitioned into two levels that are self managed and maintained and can be represented by: 1) the lowest level replaceable elements at each edge, including the edge units themselves, and 2) the overall system 100 consisting of the edge units and the central control unit 176. The central control unit 176 (by way of the IP control cluster 186) has ultimate authority over the system control from a feature and network capability point-of-view. This control hierarchy 180 can be used to support continual, subsystem product improvement without resulting in a detrimental ripple effect into other areas of the system that are not directly effected.

Figure 19:
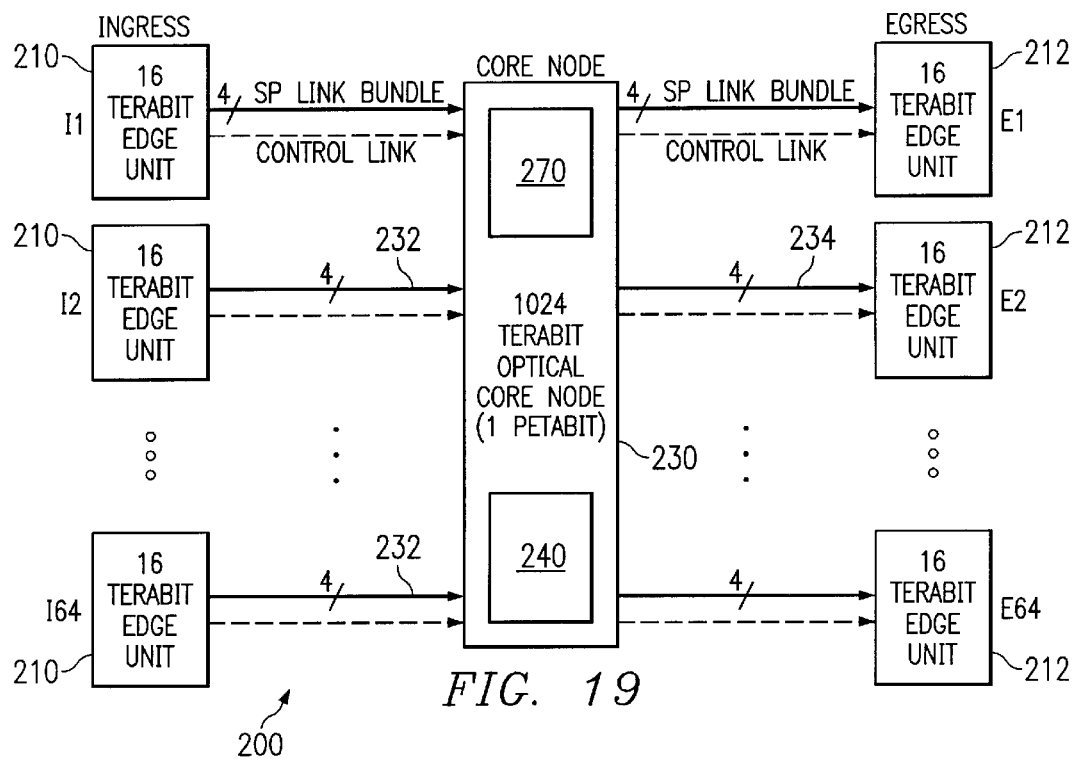
FIG. 19 shows one embodiment of a petabit version of the optical router of the present invention.

FIG. 19 illustrates the scalability of the present invention by showing an embodiment of a petabit optical routing system 200 in which the optical switch core 230 can be isolated from the edge units by distances along the order of thousands of miles. A petabit optical routing system 200 requires sixteen terabit capacity edge packet processors to process a terabit of data, thus FIG. 19 shows sixty-four 16 terabit ingress edge units 210*a* and sixty-four 16 terabit egress edge units 212 connected via a multiplexed optical fiber 232 to the optical switch core 230. Like the previously described version, the petabit optical switch core 230 comprises an optical core controller 240 and an optical switch fabric 270 that work in concert to provide the non-blocking switching described in the present invention.

The petabit optical switch core 230 can comprise a single machine, distributed architecture, or the optical switch core 230 could be co-located with any number of the edge units. In fact, it should be understood that any of the embodiments of the present invention described herein can comprise either a distributed or co-located architecture. The distributed architecture of the router of the present invention has the same functionality as the co-located case with a different physical implementation. The super packet links 32 (data paths) and the control packet links 34 (synchronization and control paths) must accommodate much greater distance between the central control unit and the edge units 60, 160. The top level communications links between the gigabit ethernet switch 182 and the edge unit core controllers 40 can be embedded into the control packet links 34. In one embodiment, an OC192 function can be incorporated within the DWDM multiplexers (ingress edge units 60) and DWDM demultiplexers (egress edge units 160) in order to provide this control capability. In this manner, the control and synchronization can be accomplished similarly to the co-located embodiment.

Figure 20:
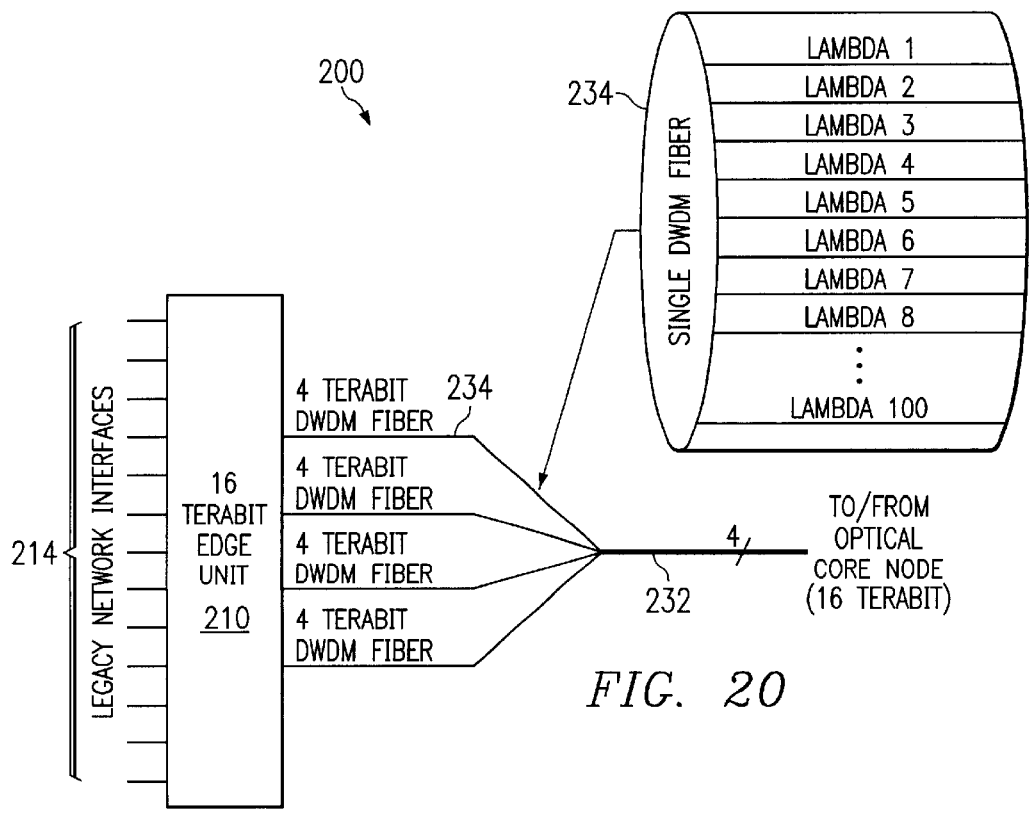
FIG. 20 shows an embodiment of an edge unit can be used in conjunction with the petabit optical router of FIG. 19.

These larger (e.g., petabit) ingress and egress units, that can comprise multiple super packet factories and corresponding DWDM multiplexers, can utilize multiple fiber optic cables to provide the necessary bandwidth, as shown in FIG. 20. In this larger edge unit case, multiple super packets can be transmitted simultaneously (addressing the same egress edge unit) while adhering to the same pattern or just-in-time schedule as if there were only one fiber cable (i.e., the individual super packet factory and DWDM functions are synchronized across multiple fibers to follow the pattern for that ingress edge unit). In other words the super packet scheduler is ingress edge unit specific, not super packet factory or DWDM fiber specific.

FIG. 20 shows in greater detail one embodiment of the ingress edge unit 210 and the multiplexed ingress optical fiber 232. The edge unit 210 can connect to legacy network interfaces 214 to bring data into the petabit optical routing system 200 for processing at the ingress edge unit 210 (as previously described). The ingress edge unit 210 will aggregate incoming data into super packets and forward the data over four DWDM fibers 234 to be bundled onto the single ingress optical cable 232 (comprising the fibers 234) leading to the petabit switch core 230. Each of the DWDM fibers 234 can comprises any number of lambdas, though the specific DWDM fibers 234 of FIG. 20 are shown having 100 lambdas with each lambda carrying 40 Gbps to provide a capacity of four terabits per DWDM fiber 234.

Figure 21:
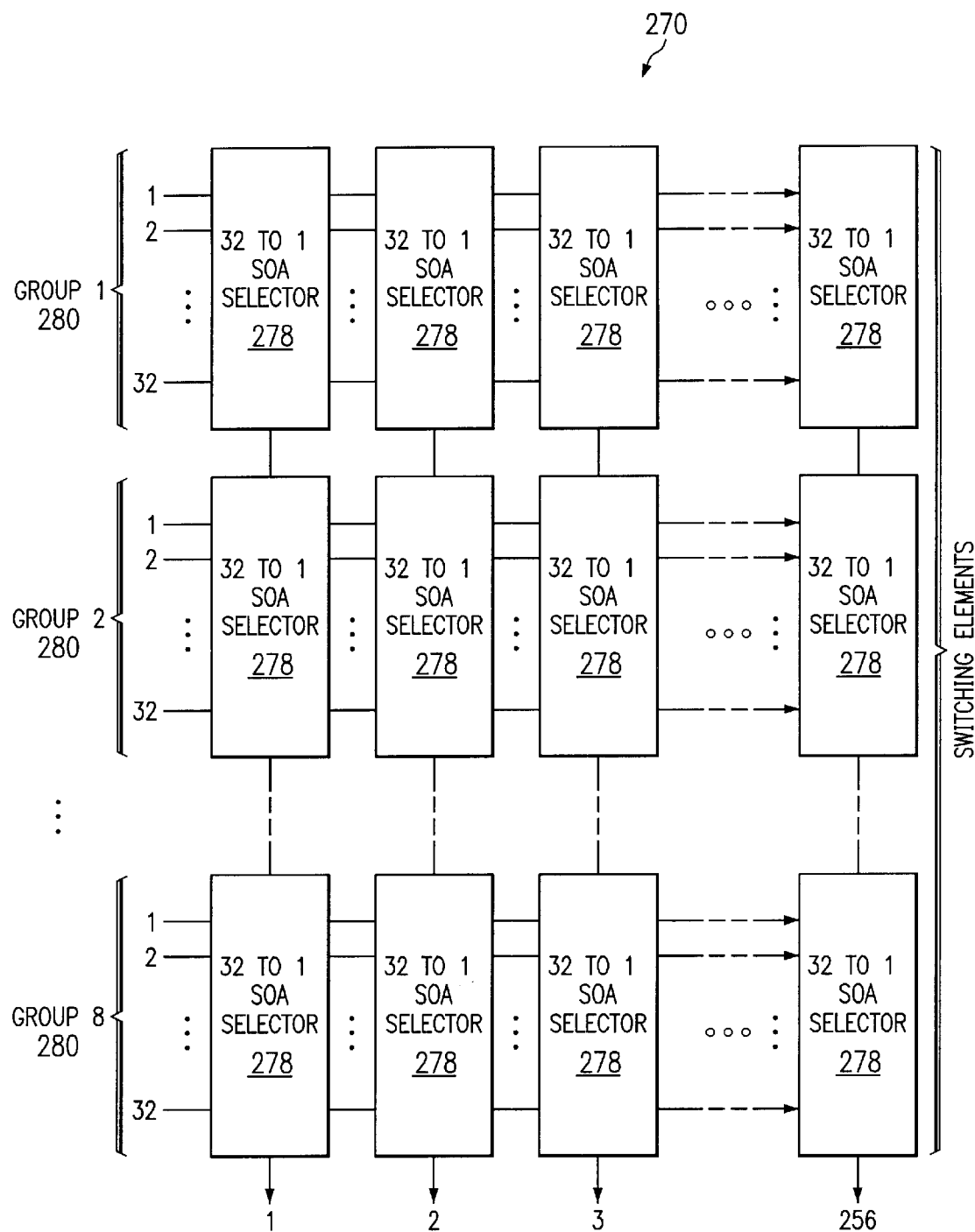
FIG. 21 shows an embodiment of an optical switch fabric that can be used in conjunction with the petabit optical router of FIG. 19.

FIG. 21 shows an embodiment of the petabit optical switch fabric 270 of FIG. 20 comprising an optical cross bar switch utilizing 2048 DWDM SOA switching elements 278. The petabit optical switch fabric 270 can comprise eight groups 280 (or rows 280) of selectors 278, where each row can accept 32 input lines and 256 columns of selectors 278. The selectors 78 are shown as 32 to 1 selectors operable to receive 32 data inputs and switch them to one of 256 data outputs (to be sent forward to one of the sixteen egress edge packet processors 212 for further processing). Thus, each group (or row) of selectors 278 receives data from eight of the sixty-four ingress edge packet processors 210. The general operation and architecture of the petabit routing system 200 is as described earlier, it is simply scaled to a petabit capacity. Other architectures, both larger and smaller, can be accomplished using the general architecture and operation described herein.

Figure 22:
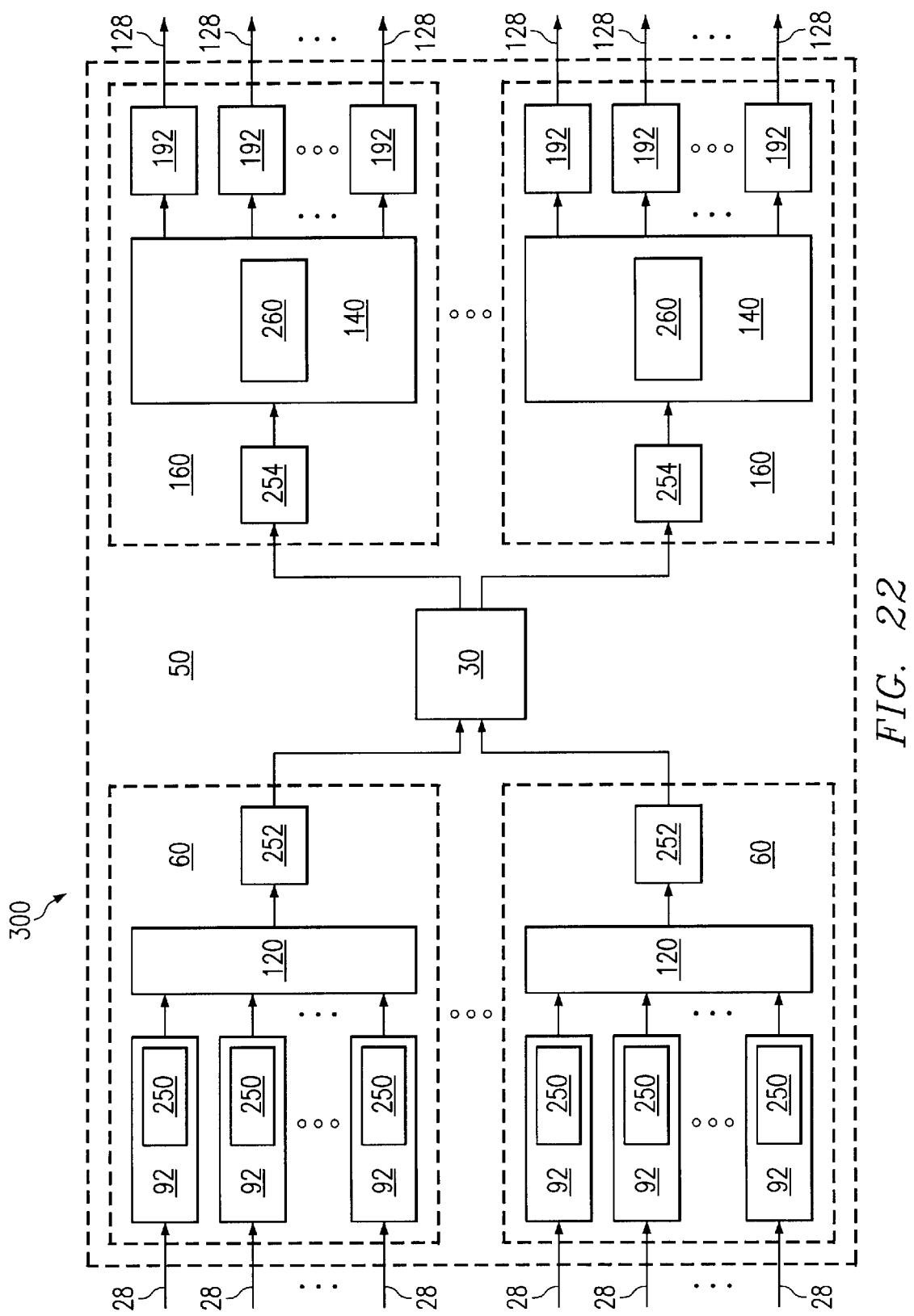
FIG. 22 shows a router that performs packet classification at the ingress edge unit and transports the packet classification data to the destination egress edge unit.

FIG. 22 shows a router 50 that performs packet classification at the ingress edge unit 60 and transports the packet classification data to the destination egress edge unit 160 so that packet classification need not be repeated at the egress edge unit 160. The network 300 includes a set of ingress legacy ports 28 coupled to the router 50 that routes data from the ingress legacy ports 28, through ingress edge unit 60, out an ingress edge unit core output port 252 to the switch core 30, into an egress edge unit core input port 254, through the egress edge unit 160 to the egress legacy ports 128. In one embodiment, the ingress edge unit core output port 252 is an output DWDM port 252 and the egress edge unit core input port 254 is an input DWDM port 254. Each ingress edge unit 60 can include a packet classification module 250 and an ingress super packet factory 120 and each egress edge unit 160 can include a classification index processing module 260 and an egress super packet factory 140. In one embodiment, the packet classification module 250 is contained within the port card 92 and the packet classification index processing module 260 is contained within the egress super packet factory 140. The packet classification module

250 functionality and the packet classification index processing module 260 functionality can be contained in any number of other units (e.g., super packet processors). The ingress edge unit 60 can also include an egress port scheduler 270 (shown in FIG. 23). The functions at the ingress edge include packet classification and packet index building (performed in the FIG. 22 embodiment at the packet classification module 250) and super packet aggregation based on the packet classification (performed at the ingress super packet factory 120). The functions at the egress edge include super packet disassembly (performed by the egress super packet factory 140) and classification index review for packet routing (performed by the classification index processing module 260).

The ingress legacy ports 28 can carry any kind of telecommunications data, including packet over SONET or 10 Gigabit Ethernet data to ingress edge unit 60. In operation, as data packets are received at an ingress edge unit 60 of router 50, the packet classification module 250 can first make a determination of whether or not the packet qualifies for wire speed classification. The wire speed classification is go/no-go determination of whether the data packet can be sent at a particular speed and, if not, the data packet is dropped to a slow path. For those data packets that qualify for wire speed classification, a number of parameters about the data packet can be determined, including for example the packet destination, quality of service (QoS) parameters, data type and super packet queue. At a minimum, packet classification requires determining the destination egress edge unit for the incoming packet. For purposes of explaining the present invention, the packet classification will include determination of three items: (1) destination egress edge unit; (2) destination port at the destination egress edge unit and (3) QoS parameters. It should be understood that any number of other parameters defining and/or relating to data packet routing for incoming data packets could be included in the packet classification.

Thus, the packet classification module 250 will determine for each data packet both a destination egress edge unit (out of many egress edge units) and a destination port within the destination egress edge unit (out of many potential ports in the destination egress edge unit). Furthermore, the packet classification module 250 can determine QoS parameters for each data packet, including (i) type of service bits, (ii) source IP address, (iii) Layer 4 & 5 classification, (iv) service level agreements, (v) operator configuration and (vi) the QoS software in use. It should be understood that these quality of service parameters are exemplary only and any quality of service parameters could be part of the data packet classification (e.g., TDM traffic, etc.). This policy-based routing of data packets allows enforcement of service levels through software programming. The packet classification module 250 can create a QoS parameter vector which is a compression of the QoS parameters into code points that require less space so that the transported data from the ingress edge unit 60 to the destination egress edge unit 160 includes only the address information and the QoS parameters vector in order to save bandwidth. Again, it should be understood that providing the QoS parameters in a QoS parameter vector is simply one implementation of the present invention and compressing the information is not necessary, though can often be advantageous in reducing the bandwidth required to transmit the classification information from ingress edge unit 60 to egress edge unit 160.

Figure 23:
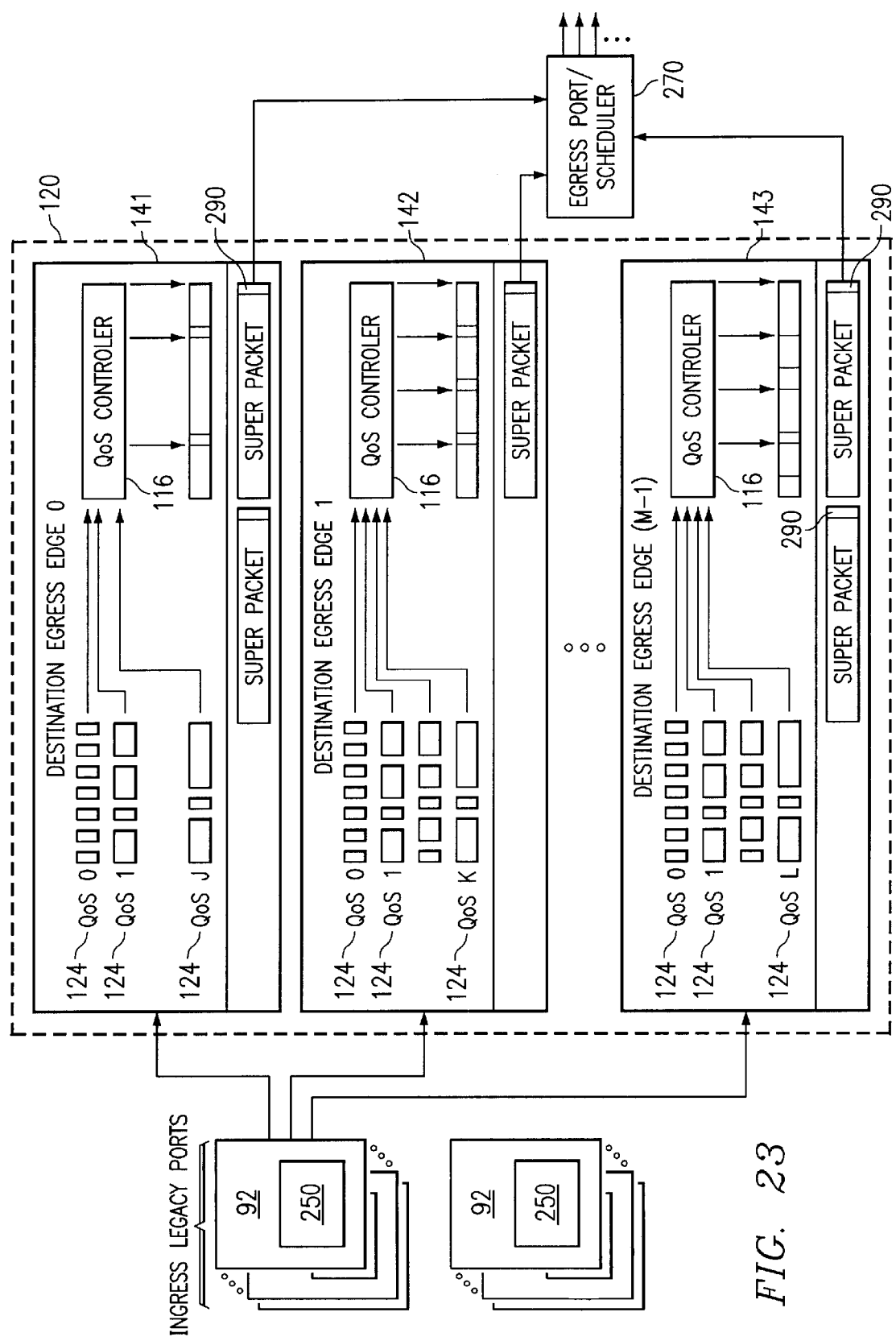
FIG. 23 shows an embodiment of a packet classification module of the router of FIG. 22.

In operation, with reference to FIG. 23, an incoming data packet arrives at the packet classification module 250 within port card 92 at one of the ingress edge units 60 from one of the ingress legacy ports 28. Each data packet will be destined for one of the egress legacy ports 128. The packet classification module 250 reads the header information of the incoming data packet to examine the destination IP address and other forwarding information (e.g., quality of service information). This IP address and forwarding information will be used to determine the destination egress edge unit 160, the destination output port 128 on that destination egress edge unit 160 and the QoS queue within that destination output port 128. In one embodiment, the packet classification module 250 can access a destination look-up table, contained on a database accessible by the packet classification module 250, to correlate the data packet destination IP address to a destination egress edge interface unit 160 and a destination port 128 at that destination egress edge interface unit. The packet classification module 250 can also examine the QoS parameters of the data packet and will prepare a QoS parameter vector corresponding to the data packet's QoS parameters. The packet classification module 250 then creates a classification information packet containing the following information for the data packet: (i) the destination egress edge unit, (ii) the destination port within its destination egress edge unit and (iii) the QoS parameters vector. The packet classification module 250 can forward the data packet (e.g., to ingress super packet factory 120) to be aggregated into a super packet. The packet classification module can also forward the classification information to a QoS controller 116 (shown in FIG. 23) to be aggregated into a classification index 290. The classification index 290 for each super packet can be contained in the overhead of the super packet and includes the classification information for each data packet aggregated into the super packet.

As shown in FIG. 23, the QoS controller module 116 can build a classification index 290 for each super packet that includes the classification information for each data packet within the super packet in such a manner that the classification information for each data packet can be extracted from the classification index. The classification index can be built so that each data packet has a classification entry in the classification index. The classification index can be placed in the overhead of each super packet. The super packets, each with a classification index 290, can then be sent to an optical switch core 30 (not shown) to be routed to the appropriate destination egress edge unit 160. Thus, both the egress destination port processing and packet classification processing can occur at the packet classification module 250, and can be performed simultaneously. This essentially pushes the destination port determination function upstream from the egress edge to the ingress edge.

As shown in the embodiment of FIG. 23, the packet classification module 250 will forward the data to an ingress super packet factory 120 that will aggregate data intended for the same destination egress edge unit 160 into super packets. As shown in FIG. 23, each ingress super packet factory 120 can comprise a number of sub-factories (e.g., one sub-factory for each egress edge unit 160), where each sub-factory builds super packets destined for one of M destination egress edge units 160 (which can be individually designated E1, E2 . . . EM−1). Each egress edge unit 160 also has L destination output ports 128 (which can be individually designated P1, P2 . . . PL−1). Additionally, each egress edge unit 160 has a different number of QoS parameters with a QoS parameter queue 124 for each QoS parameter. Thus, as shown in FIG. 23, ingress super packet factory 120 has different sub-factories 141, 142 and 143, where sub-factory 141 correlates to egress edge unit number 1 (E1) and has J number of QoS parameters and J QoS parameter queues, while sub-factory 142 corresponds to egress edge unit E2 and has K QoS parameters and sub-factory 143 corresponds to egress edge unit EM−1 and has L QoS parameters. Ingress super packet factory 120 uses QoS controller 116 to build super packets for each of the M−1 egress edge units 160 by collecting all of the various data (having different QoS parameters) intended for the same destination egress edge unit 160. The QoS controller 116 builds the super packets from each of the various QoS parameter queues 124 in a particular sub-factory. After the super packets have been built, the egress port scheduler 270 can forward the super packets from each of the ingress super packet factories 120, segment the super packets to place the data from the super packets onto all of the wavelengths over which it will be transported (e.g., in an ordered array) and transport the super packet across the multiple lambdas to an optical switch core (not shown).

Figure 24:
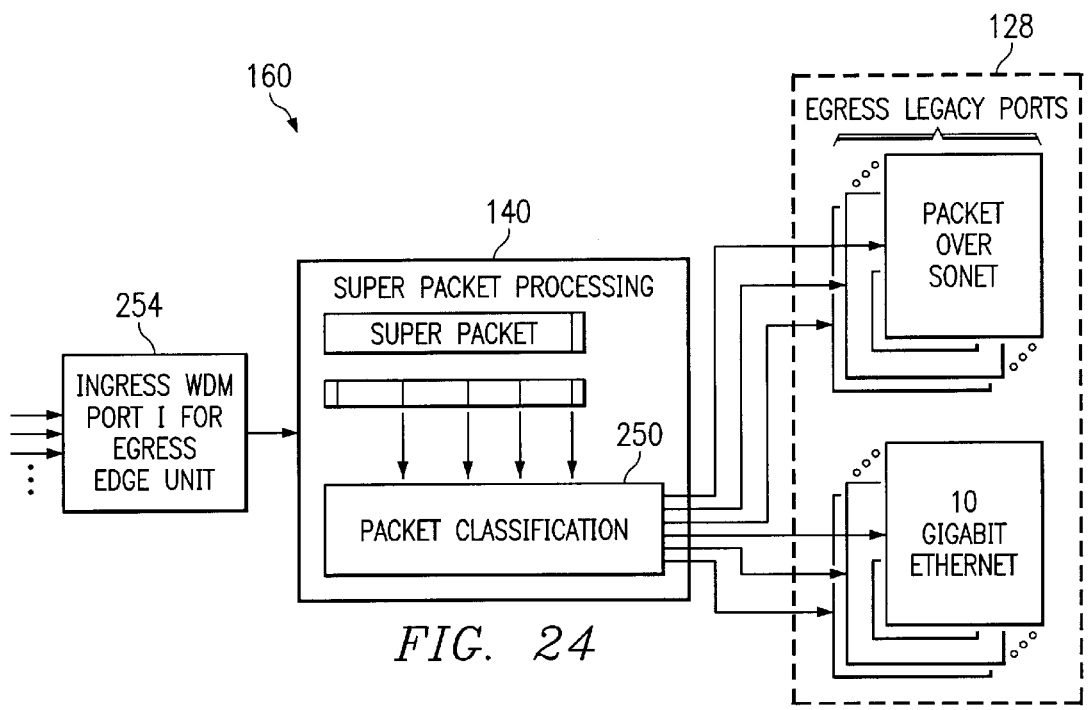
FIG. 24 shows an edge processor that re-performs packet classification at an egress edge unit.
Figure 25:
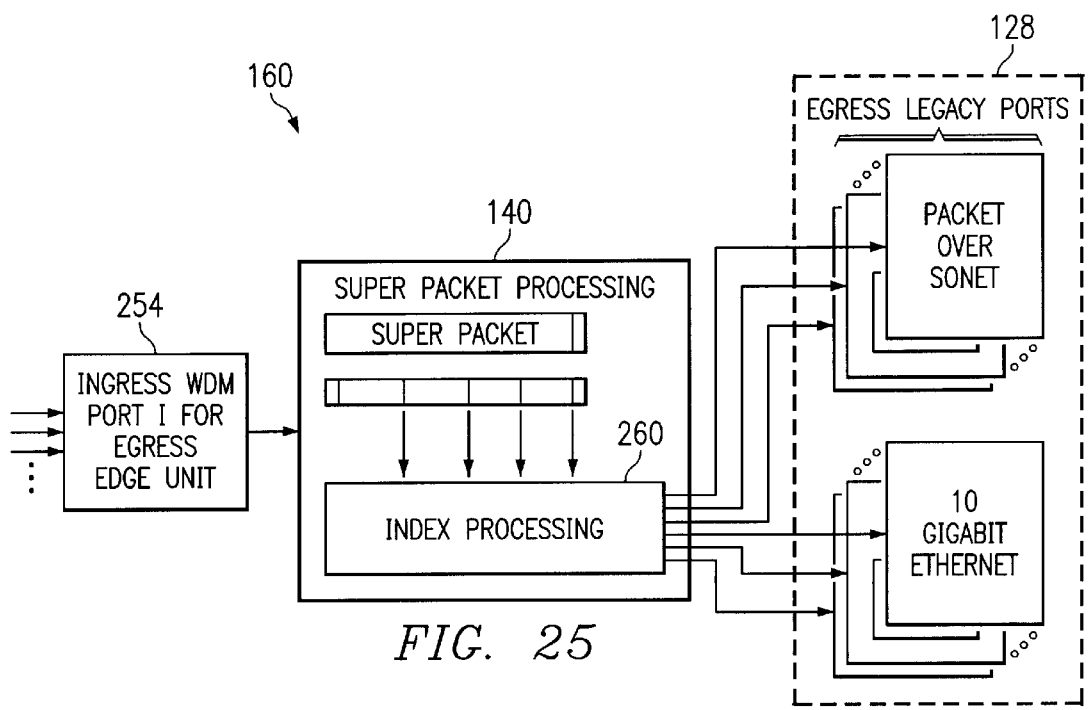
FIG. 25 shows an embodiment a classification index processing module of the router of FIG. 22.

FIG. 24 shows a data packet processing method at a destination egress edge unit 160 that requires re-performing packet classification to determine the appropriate destination port for each data packet. In contrast, FIG. 25 shows an embodiment of the packet processing according to the present invention. In each of FIG. 24 and 25, the super packets arrive at the input DWDM port 254 of a destination egress edge unit 160 (where all of the data packets within the super packet are intended for this particular destination egress edge unit 160) and are forwarded to the a classification processing module of some sort. FIG. 24 presumes that a classification index with classification information has not been included with the super packet (or at least that the processing module of FIG. 24 has no capability to read and/or use such a classification index if it does exist). Thus, in FIG. 24 the super packets are first de-aggregated from super packets into individual data packets, then each data packet is subjected to a classification process at the classification module 250 (essentially repeating the classification process at the ingress edge) to determine the appropriate destination egress port 128 within the destination egress edge for each individual data packet. This can be accomplished by accessing the header information for each data packet, examining the destination IP address and forwarding information database and correlating this information to a destination port. Furthermore, the QoS parameters must be examined from the header information to determine the remaining routing principles for each data packet. Once this classification of a data packet is accomplished the classification module 250 can forward the data packet to the appropriate destination port 128 according to the appropriate QoS guidelines.

In contrast, the packet processing of FIG. 25 does not require packet classification at the egress edge unit 160. The super packet arrives at the input DWDM port 254 and is forwarded to the classification index processing module 260 to perform classification index processing (rather than any packet classification processing as was done in FIG. 24). The packet classification index contains a classification entry for every data packet contained within the super packet to enhance egress edge processing. The classification index lays out the classification information already calculated in the ingress edge processing (e.g., destination egress edge unit, destination port, QoS parameters, flow information used by RTP, MPLS, etc . . . ) in a manner so as to facilitate extracting this classification information for each data packet at the destination egress edge unit 160.

The classification index processing module 260 examines the classification index for each super packet to determine the classification information (e.g., the egress port 128 and QoS parameter vector) for each data packet. From this information, each data packet is forwarded to the appropriate destination egress port 128 according to the appropriate classification information, as shown in FIG. 25. Thus, the present invention allows for data packet processing at the egress edge unit 160 without repeating the packet classification step that was performed at the ingress edge.

FIG. 26 shows an embodiment of a classification index (or "table of contents") that can be used in accordance with the present invention. FIG. 26 shows a QoS vector classification index 290 that includes a heading with the classification index type (i.e., QoS vector classification index type), version and number of packets in the classification index 290. The classification index 290 also includes the following information for each data packet contained within the super packet: (i) the length of the packet, (ii) the destination port 128 to which the data packet is addressed, (iii) the queue address within which the data packet is queued, and (iv) the QoS parameter vector that is a code point representing the actual QoS parameters for the data packet. The classification index 290 of FIG. 26 uses implicit addressing to determine the beginning of each packet contained within the classification index 290 (i.e., the classification information for each data packet belongs sequentially to each data packet in the sequence the data packet was aggregated into the super packet).

As previously described, slot routing of super packets is accomplished by initializing an optical core scheduling pattern and applying the pattern to the incoming optical data. This initial schedule can either be based on expected traffic to the router 50 or can be set according to a predetermined method (such as round robin which places each incoming super packet into the next slot in time). The router 50 then monitors the incoming data at each of the ingress edge units 69 (as described earlier) and periodically modifies the scheduling pattern based on the incoming data to allocate more capacity to incoming links having more traffic.

In addition to slot routing, the router 50 of the present invention can also use deflection slot routing to route super packets an ingress edge unit to a destination egress edge units through an intermediate edge unit(s) to increase performance of the router 50. FIG. 27 shows an embodiment of the router 50 that utilizes slot routing. FIG. 27 shows multiple edge units 360 connected to one another through the optical switch core 30. Edge units 360 comprise both an ingress edge unit 60 and an egress edge unit 160 so that the functionality of the ingress edge unit 60 and egress edge unit 160 are combined within edge unit 360. Each edge unit 360 has a bi-directional path (input and output) through optical core 30. With reference to FIG. 4, the output path from the ingress function within the edge unit 360 is an ingress super packet link 32, while the input to the egress function within the edge unit 360 is via an egress super packet link 33. Each edge unit 360 also has connectivity between the ingress edge unit 60 and the ingress edge unit 160 within edge unit 360 to allow for exchanging a super packet from an egress edge unit 160 to an egress edge unit 60 for re-transmission to another edge unit 360.

The following example is used to illustrate both slot routing and deflection slot routing. With reference to FIG. 27, in ordinary slot routing, a super packet from edge unit number 4 that is intended for edge unit number 2 would be routed from edge unit number 4 via ingress super packet link 32 to optical switch core 30. At the optical switch core, the super packet would be switched onto the egress super packet link 33 connected to edge unit number 2 and forwarded to edge unit number 2 for further processing.

In contrast to slot routing, deflection slot routing involves routing a super packet that is intended for a destination edge unit 360 from the source edge unit 360 through another intermediate edge unit 360, and from the intermediate edge unit 360 to the destination edge unit 360. While the present invention can utilize either slot routing or deflection slot routing, slot routing may not always be the most efficient method. For example, the router may not be load balanced if a particular super packet link needs to transport an amount of data in excess of the super packet link's capacity. Also, a particular link may not be carrying data or may be required to carry some nominal amount of data according to a particular scheduling pattern (the link is "underutilized"). In yet another example, a particular link may simply fail so that no traffic may be carried over that link. One solution to these and other problems is to use deflection routing. With deflection routing, if a link between two edge units 360 fails, a super packet to be sent between the edge units can be sent through a different edge unit 40.

With reference to FIG. 27 for the previous example, presume that for some reason, the most efficient manner to get the super packet from edge unit No. 4 to edge unit No. 2 is to first route (i.e., deflect) the super packet to edge unit No. 0 and then from edge unit No. 0 to edge unit No. 2. In one embodiment, the edge unit No 4 would process the super packet from its ingress edge unit 60 (e.g., from its ingress super packet factory 120) over ingress super packet link 32 to the optical switch core 30 just as in the ordinary slot routing. However, in contrast to ordinary slot routing, the optical switch core 30 will now route the super packet to edge unit No. 0 over egress super packet link 33 to egress edge unit 160 (e.g., to super packet factory 140) at edge unit No. 0. The edge unit No. 0 will then route the super packet internally from its egress edge unit 160 to its ingress edge unit 60 (e.g., from its egress super packet factory 140 to its ingress super packet factory 120) over a connectivity link 121. This allows the super packet to be transmitted from an input or receiving module in the edge unit 360 to an output capable or sending module in the edge unit 360. Egress edge unit 160 (e.g., at ingress super packet factory 120) of edge unit No. 0 can now route the super packet to edge unit No. 2 in the ordinary manner described previously. It should be understood that while a particular embodiment of deflection routing has been described, that other mechanisms of routing to an intermediate edge unit 360 can easily be incorporated to accomplish this deflection routing.

Figure 28A:
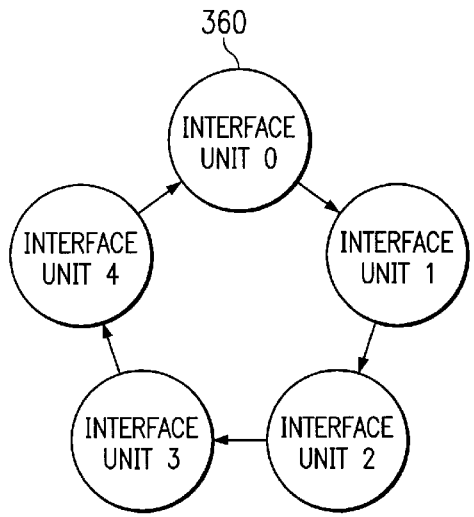
FIGS. 28a–28d show examples of scheduling patterns that can be used in conjunction with deflection routing according to the present invention.
Figure 28B:
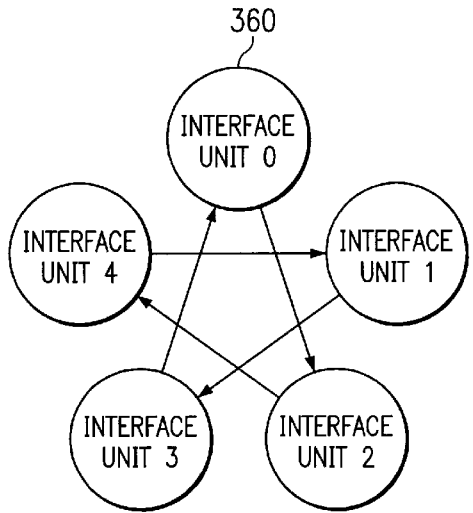
Figure 28C:
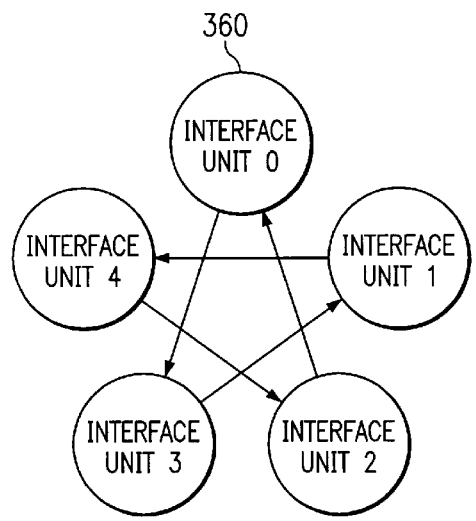
Figure 28D:
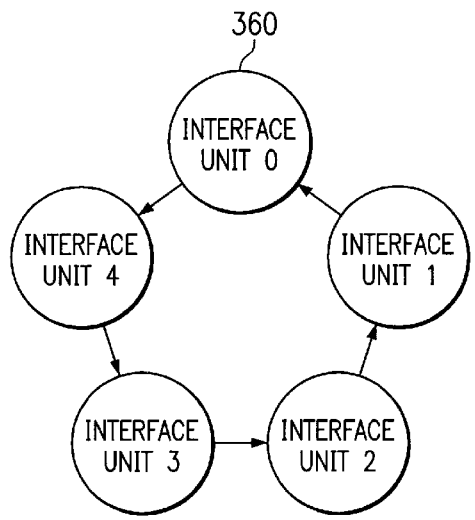

As previously described, slot routing of super packets is accomplished by initializing an optical core scheduling pattern and applying the pattern to the incoming optical data. This initial schedule can either be based on expected traffic to the router 50 or can be set according to a predetermined method (such as round robin which places each incoming super packet into the next slot in time). The router 50 then monitors the incoming data at each of the ingress edge units 60 (as described earlier) and periodically modifies the scheduling pattern based on the incoming data to allocate more capacity to incoming links having more traffic. FIGS. 28a–28d show an example of a single scheduling pattern cycle for a five edge unit 360 embodiment of the present invention. The scheduling pattern utilizes a schedule algorithm that is simple round robin and each edge unit 360 exchanges data with every other edge unit in the system. As shown in FIG. 28a, each edge unit 360 sends data to the edge unit immediately clockwise during slot 0. As shown in FIG. 28b, during slot 1 each edge unit 360 sends data to the edge unit 360 that is two edge units 360 away in the clockwise direction. FIG. 28c uses the same pattern of FIG. 28b in the opposite direction. FIG. 28d uses the pattern of FIG. 28a in the opposite direction. This pattern persists until the cycle ends, at which time each edge unit 360 has transferred one super packet to each of the other four edge units 360 (and, consequently, received one super packet from each of the other four edge units 360.) Super packet fill ratio is an important parameter relating to efficiency of bandwidth use for the present invention. Since super packets are of fixed length, and one super packet is transferred from an ingress edge unit 60 to an egress edge unit 160, traffic that does not arrive at the aggregate rate of "one super packet per slot" utilizes bandwidth inefficiently. Allocating the minimum number of slots to a virtual link between two edge units increases the super packet fill ratio and the efficiency with which bandwidth is utilized. A simple form of slot routing for a five edge unit embodiment involves each edge unit 360 having data for each of the other edge units 360 and expects data from each of the other edge units 360. One simple round robin schedule is shown in Table 1, where the left column identifies each source edge unit 360 (labeled "node") and the remaining columns indicate which edge unit 360 will receive a super packet from the source node during each slot time.

TABLE 1

Slot routing example 1; round robin schedule

| Node | Slot 0 | Slot 1 | Slot 2 | Slot 3 |
|---|---|---|---|---|
| 0 | 1 | 2 | 3 | 4 |
| 1 | 2 | 3 | 4 | 0 |
| 2 | 3 | 4 | 0 | 1 |
| 3 | 4 | 0 | 1 | 2 |
| 4 | 0 | 1 | 2 | 3 |

For example, during slot 0, edge unit number 0 sends a super packet to edge unit number 1, while in slot 1 edge unit number 0 sends a super packet to edge unit number 2, and so forth. The result is a virtual, fully connected mesh between all five edge units 360 (numbered 0–4). Thus, each link in the virtual full mesh, using the round robin schedule in Table 1, is allocated one quarter of the maximum possible switch capacity, as shown in Table 2.

TABLE 2

Distribution of link capacity for round robin schedule

| Node | 0 | 1 | 2 | 3 | 4 |
|---|---|---|---|---|---|
| 0 | — | 0.250 | 0.250 | 0.250 | 0.250 |
| 1 | 0.250 | — | 0.250 | 0.250 | 0.250 |
| 2 | 0.250 | 0.250 | — | 0.250 | 0.250 |
| 3 | 0.250 | 0.250 | 0.250 | — | 0.250 |
| 4 | 0.250 | 0.250 | 0.250 | 0.250 | — |

Thus, for evenly balanced traffic, the simple round robin schedule can optimize bandwidth utilization. However, evenly balanced traffic is rare. When traffic is not evenly balanced, adjustments to the scheduling pattern can be altered to provide additional bandwidth to the more heavily utilized virtual links.

An example of a more complex scheduling pattern for a five edge unit 360 configuration is shown in Table 3, where a weighted round robin schedule is illustrated. In the example of Table 3, the scheduling pattern is six slots long, rather than four as in Table 1, and all of the edge units 360 are allocated at least one slot to send super packets to each of the other four edge units 360. In addition, edge unit number 0 is allocated extra slots to edge unit number 2 and edge unit number 3, while edge unit number 1 is allocated two extra slots to edge unit number 4. The other edge units 360 have no need for additional bandwidth, but since the router 50 must connect each edge unit 360 somewhere during each slot, unused capacity exists in several of the virtual links (see the shaded entries in Table 3).

TABLE 3

Slot routing example 2; weighted round robin schedule

| Node | Slot 0 | Slot 1 | Slot 2 | Slot 3 | Slot 4 | Slot 5 |
|------|--------|--------|--------|--------|--------|--------|
| 0 | 1 | 2 | 3 | 4 | 2 | 3 |
| 1 | 2 | 3 | 4 | 0 | 4 | 4 |
| 2 | 3 | 4 | 0 | 1 | 0 | 0 |
| 3 | 4 | 0 | 1 | 2 | 1 | 1 |
| 4 | 0 | 1 | 2 | 3 | 3 | 2 |

As in the case of the simple round robin schedule of Table 1, the weighted round robin schedule results in a virtual, fully connected mesh between all edge units 360. Each link in the virtual full mesh, using the specific scheduling pattern of Table 3, gets allocated a variable portion of the maximum possible switch capacity, as shown in Table 4. Table 4 shows four shaded entries that comprise bandwidth in excess of requirements for the virtual link.

TABLE 4

Distribution of link capacity for example weighted round robin schedule

| Node | 0 | 1 | 2 | 3 | 4 |
|------|-------|-------|-------|-------|-------|
| 0 | — | 0.167 | 0.333 | 0.333 | 0.167 |
| 1 | 0.167 | — | 0.167 | 0.167 | 0.500 |
| 2 | 0.500 | 0.167 | — | 0.167 | 0.167 |
| 3 | 0.167 | 0.500 | 0.167 | — | 0.167 |
| 4 | 0.167 | 0.167 | 0.333 | 0.333 | — |

Table 4 shows that the minimum unit of core bandwidth that can be allocated to a virtual link is reduced to 0.167 from 0.25 (as compared to Table 2) to manage super packet fill ratio.

For slot deflection routing, consider again the five edge unit 360 embodiment, with an active weighted round robin schedule as in Table 3 and provides the bandwidth allocation of Table 4. Slot deflection routing provides a means for responding to changes in traffic without computing a new scheduling pattern to provide rapid response to transient traffic demands. For example, suppose that the initial traffic distribution includes the following demand for data from edge unit number 2 to edge unit number 0, edge unit number 2 to edge unit number 3, and edge unit number 0 to edge unit number 3:

| 2 → 0: | 0.167 | (fill ratio 0.333) |
| 2 → 3: | 0.167 | (fill ratio 1.000) |
| 0 → 3: | 0.167 | (fill ratio 0.500) |

Now consider a doubling in traffic from edge unit number 2 to edge unit number 3. Since the virtual link from edge unit number 2 to edge unit number 3 has only 0.167 capacity, for the pure slot routing case there would be no option except to drop packets until a new scheduling pattern could be computed by the core. Using slot deflection routing, the new traffic can be handled without dropping packets and without requiring a new scheduling pattern to be calculated.

Table 4 shows that the virtual link from edge unit number 2 to edge unit number 0 has a capacity of 0.500, but only half of the capacity is being utilized. The link from edge unit number 0 to edge unit number 3 is also underutilized. By routing the new traffic from edge unit number 2 through edge unit number 0 to edge unit number 3, the following bandwidth demand is realized:

| −2 → 0: | 0.333 | (fill ratio 0.666) |
| −2 → 3: | 0.167 | (fill ratio 1.000) |
| −0 → 3: | 0.333 | (fill ratio 1.000) |

Note that the fill ratio of each link has increased, while no change in the scheduling pattern is required to respond to an increase in traffic and avoid dropping any packets.

Slot deflection routing also provides a means to rapidly respond to certain failures in the core. Once again, assume the initial traffic distribution as follows:

| 2 → 0: | 0.167 | (fill ratio 0.333) |
| 2 → 3: | 0.167 | (fill ratio 1.000) |
| 0 → 3: | 0.167 | (fill ratio 0.500) |

Now consider a failure in the link from edge unit number 2 to edge unit number 3. Again, for the slot routing case there would be no option except to drop packets until a new scheduling pattern can be implemented, but slot deflection routing can answer this failure.

Once again, from Table 4, the virtual link from edge unit number 2 to edge unit number 0 has a capacity of 0.500, but only half of the capacity is being utilized. The link from edge unit number 0 to edge unit number 3 is also underutilized. By routing the new traffic from edge unit number 2 through edge unit number 0 to edge unit number 3, the following bandwidth demand is realized:

| 2 → 0: | 0.500 | (fill ratio 0.666) |
| 2 → 3: | 0.000 | (fill ratio 0.000) |
| 0 → 3: | 0.500 | (fill ratio 1.000) |

Once again, the fill ratio of each link has increased, while no change in scheduling pattern is required to respond to a failed link.

Although the present invention has been described in detail, it should be understood that various changes, substitutions and alterations can be made hereto without departing from the spirit and scope of the invention as described by the appended claims.

What is claimed is:

1. A router coupled to a plurality of data lines, comprising:
a plurality of egress edge units, wherein each egress edge unit is coupled to at least one egress port;
a plurality of ingress edge units, wherein each ingress edge unit receives a plurality of optical data packets, each optical data packet is destined for a destination port at one of the plurality of egress edge units, aggregates the plurality of optical data packets into a plurality of super packets wherein each super packet comprises optical data packets intended for a particular destination egress edge unit and is to be routed to that particular destination egress edge unit;

an optical switch fabric that receives the plurality of super packets from the plurality of ingress edge units and routes each super packet through the optical switch fabric to the particular destination egress edge unit for which the super packet is intended, and further wherein the routing through the optical switch fabric is performed in a non-blocking manner; and a core controller that controls the arrival of the plurality of super packets at the optical switch fabric so as to avoid contention among the plurality of super packets between the optical switch fabric and the plurality of egress edge units; and wherein the plurality of egress edge units receive the plurality of super packets, de-aggregate the plurality of super packets into the optical data packets, and transmit each of the plurality of optical data packets to at least one of the at least one egress port.

2. The router of claim 1, wherein each super packet comprises optical data packets that are intended to be routed to a particular destination egress edge unit amongst the plurality of egress edge units.

3. The router of claim 1, wherein the core controller comprises:

a switch controller in communication with the optical switch fabric; and a super packet scheduler in communication with the switch controller and further in communication with each of the plurality ingress edge units via a plurality of control packet links; and wherein the super packet scheduler monitors the plurality of ingress edge units to determine a scheduling pattern for each of the plurality of ingress edge units, wherein the scheduling pattern causes each ingress edge unit to transmit super packets to the optical switch fabric so that no two super packets destined for a single egress edge unit arrive at the optical switch fabric in an identical switching time interval; and wherein the switch controller creates a unique path through the optical switch fabric for each super packet arriving at the optical switch fabric during the identical switching time interval.

4. The router of claim 1, further comprising:

a plurality of ingress super packet links, wherein each super packet link connects one of the plurality of ingress edge units to the optical switch fabric;

a plurality of ingress super packet links, wherein each super packet link connects one of the plurality of edge units to the optical switch fabric; and a plurality of egress super packet links, wherein each egress super packet link connects one of the plurality of egress edge units to the optical switch fabric; and wherein the plurality of super packets aggregated at the plurality of ingress edge units are transmitted to the optical switch fabric over the plurality of ingress super packet links and further wherein the plurality of super packets are transmitted to the plurality of egress edge units from the optical switch fabric over the plurality of egress super packet links.

5. The router of claim 4, further comprising:

a plurality of ingress control packet links, wherein each ingress control packet link connects an ingress edge unit to the core controller; and a plurality of egress control packet links, wherein each egress control packet link connects an egress edge unit to the core controller; and wherein the core controller receives a plurality of pattern data from the plurality of ingress edge units that the core controller uses to establish a pattern that is used to route the plurality of super packets from the plurality of ingress edge units, through the optical switch fabric, to the plurality of egress edge units; and wherein the core controller receives a plurality of control data from the plurality of egress edge units that the core controller uses to control overflow of a plurality of egress edge unit buffers and to synchronize data flow in the router.

6. The router of claim 5, wherein the core controller monitors a plurality of synchronization data at the plurality of ingress edge units via the ingress control data links and at the plurality of egress edge units via the egress control data link to synchronize data flow through the router; and wherein the core controller monitors a plurality of time information at each of the plurality of egress edge units via the egress control data links to verify data intended for each egress edge unit arrives at an appropriate time.

7. The router of claim 1, wherein the optical switch fabric comprises an optical cross-bar switch, comprising:

a plurality of inputs, each input connected to one of the plurality of ingress edge units;

a plurality of outputs, each output connected to one of the plurality of egress edge units; and a plurality of switching elements configured to create a plurality of unique paths through the optical cross bar switch from each input to each output.

8. The router of claim 7, wherein the switching elements are N to 1 switching elements, where N is equal to the number of the plurality of ingress edge units, for switching a super packet received on any of the N inputs to one the plurality of outputs.

9. The router of claim 8, wherein each of the N to 1 switching elements comprises an N to 1 semiconductor optical amplifier operable to switch from N inputs to one output.

10. The router of claim 7, wherein each switching element has sufficiently broad bandwidth to accommodate all wavelengths within an optical fiber upon which the plurality of super packets are transported.

11. The router of claim 7, wherein the core controller, for each super packet arriving at the optical cross bar switch, connects an input of the optical switch fabric that is associated with the ingress edge unit from the super packet arrived to an output of the optical switch fabric that is associated with the egress edge unit for which the super packet is destined.

12. The router of claim 1, wherein each ingress edge unit further comprises:

a plurality of ingress super packet processors, wherein each ingress super packet processor receives a portion of the plurality of optical data packets arriving at the ingress edge unit and creates a plurality of partial super packets wherein each partial super packet is destined for a particular egress edge unit; and an ingress super packet factory in communication between the super packet processor and the optical switch fabric, wherein the ingress super packet factory receives the plurality of partial super packets from each of the plurality of ingress super packet processors and creates a plurality of super packets by combining partial super packets having a common destination egress edge unit.

13. The router of claim 11, wherein the ingress super packet factory is in communication between the super packet processor and the optical switch fabric via one of a plurality of ingress super packet links, and further wherein the ingress super packet factory is in communication between the super packet processor and the core controller via one of a plurality of ingress control packet links.

14. The router of claim 11, wherein the super packet processor places data contained in each of the plurality of partial super packets on one or more wavelengths.

15. The router of claim 11, wherein each egress edge unit further comprises:
   an egress super packet factory, wherein the egress super packet factory receives the plurality of the super packets destined for the egress edge unit and disassembles the plurality of super packets into a plurality of partial super packets intended for a common destination port; and
   a plurality of egress super packet processors, wherein each egress super packet processor is coupled to a single destination port, and wherein each of the plurality of egress super packet processors the plurality of partial super packets intended for the destination port and transmits data contained within the plurality of partial super packets to the destination port.

16. The router of claim 1, wherein each ingress edge unit further comprises:
   an ingress super packet processor, comprising:
      a packet classification queue, comprising a plurality of sub-queues wherein each sub-queue is assigned to contain data of a particular data type that is intended for a particular egress edge interface unit;
      a packet classification controller, wherein the packet classification controller receives the plurality of optical data packets, wherein each of the plurality of optical data packets comprises data of at least one data that is intended for one of the plurality of egress edge units, and routes each data within each optical data packet to the sub-queue that is assigned to contain the data, thereby building a partial super packets in each sub-queue wherein each partial super packet contains data of a particular data type intended for a particular egress edge unit; and
      an edge unit destination controller, wherein the edge unit destination controller transmits each partial super packet from the packet classification queue to an ingress super packet factory; and
   an ingress super packet factory, comprising:
      a super packet ingress queue comprising a plurality of lambda/destination queues wherein each lambda/destination queue is assigned to contain data on a particular wavelength that is intended for a particular egress edge interface unit;
      a partial super packet controller, wherein the partial super packet controller receives each partial super packet, wherein each partial super packet comprises data on at least one wavelength that is intended for one of the plurality of egress edge units, and routes each data within each partial super packet to the lambda/destination queue that is assigned to contain the data, thereby building a super packet in each lambda/destination queue, wherein each super packet contains data on a particular wavelength intended for a particular egress edge unit; and
      a super packet transmit controller that forwards each super packet to the optical switch fabric based on input received from the core controller.

17. The router of claim 16, wherein the packet classification controller routes the data contained within the plurality of optical data packets by examining a header information for each of the plurality of optical data packets to determine for each data (i) the egress edge unit for which the data is intended and (ii) the data type of the data.

18. The router of claim 17, wherein the number of sub-queues is equal to the number of egress edge units multiplied by the number of data types, and further wherein the at least one data type comprises a TDM data type and at least one packet data type.

19. The router of claim 17, wherein the ingress super packet factory is in communication with the core controller via a control packet link to enable the core controller to monitor a plurality of input/output packet flow data at each ingress edge unit to determine super packet generation and control the transmission of super packets to the optical switch fabric.

20. The router of claim 16, wherein each egress edge unit further comprises:
   a plurality of ports;
   an egress super packet factory, comprising:
      a super packet egress queue comprising a plurality of port/lambda queues wherein each port/lambda queue is assigned to contain data on a particular wavelength that is intended for a particular port;
      a super packet egress queue controller, wherein the super packet egress queue controller receives each super packet from the optical switch fabric and routes each data within each super packet to the port/lambda queue that is assigned to contain the data, thereby deconstructing each super packet into a plurality of egress partial super packets where in the plurality of port/lambda queues, wherein each egress partial super packet contains data on a particular wavelength intended for a particular port; and
      a super packet port selector forwards each egress partial super packet to an egress super packet processor;
   an egress super packet processor, comprising:
      a packet declassification queue comprising a plurality of egress sub-queues wherein each egress sub-queue is assigned to contain data on a particular wavelength that is intended for a particular port;
      a packet declassification controller, wherein the packet declassification controller receives the plurality of egress partial super packets, wherein each of the plurality of optical data packets comprises data of at least one data type that is intended for one of the plurality of ports, and routes each data within each optical data packet to the egress sub-queue that is assigned to contain the data, thereby deconstructing the egress partial super packets so that each egress sub-queue contains data of a particular data type intended for a particular port; and
      a packet selector that transmits the data in each egress sub-queue to an intended port.

21. The router of claim 1, wherein each ingress edge unit further:
   collects a set of classification information for each of the plurality of optical data packets;
   creates a classification index for each of the plurality of super packets, wherein each classification index contains the set of classification information for each of the optical data packets that comprise the super packet; and
   places each classification index in an overhead of the super packet associated with the classification index; and
   wherein the particular destination egress edge unit to which a particular super packet is destined receives the particular super packet, extracts from the classification index the classification information associated with each optical data packet within the particular super packet and routes each optical data packet to a port of the particular destination egress edge unit based on the classification information for each optical data packet.

22. The router of claim 21, wherein the classification information for each optical data packet comprises a destination egress edge unit and a destination port within the destination egress edge unit.

23. The router of claim 1, wherein the core controller further initializes the router based on either a predetermined scheduling pattern or a scheduling pattern based on an expected data flow.

24. The router of claim 5, wherein each of the plurality of super packet links and each of the plurality of control packet links are WDM fibers.

25. The router of claim 1, wherein each super packet is routed using slot deflection routing to route the super packet form an ingress edge unit to an egress edge unit.

26. A router for routing optical data, comprising:
   an egress edge unit comprising a plurality of egress ports;
   an ingress edge unit comprising a plurality of ingress ports, wherein the ingress edge unit receives an optical data packet intended for a destination port at the egress edge unit from one of the plurality of ingress ports, and further wherein the ingress edge unit aggregates the optical data packet into a super packet containing a plurality of optical data packets intended for the destination port;
   an optical switch fabric that receives the super packet from the ingress edge unit and routes the super packet through the optical switch fabric to the egress edge unit in a non-blocking manner; and
   a core controller that controls the arrival of the super packet at the optical switch fabric in such a manner that the super packet flows between the optical switch fabric and the egress edge unit without contention; and
   wherein the egress edge unit receives the super packet, extracts the optical data packet from the super packet, and transmit the optical data packet to the destination port in the egress edge unit.

27. The router of claim 26, wherein the ingress edge unit further collects a set of classification information for each of the plurality of optical data packets, creates a classification index for each of the plurality of super packets, wherein each classification index contains the set of classification information for each of the optical data packets that comprise the super packet; and
   wherein the particular destination egress edge unit to which a particular super packet is destined receives the particular super packet, extracts from the classification index the classification information associated with each optical data packet within the particular super packet and routes each optical data packet to a port of the particular destination egress edge unit based on the classification information for each optical data packet.

28. The router of claim 27, wherein the classification information for each optical data packet comprises a destination egress edge unit and a destination port within the destination egress edge unit.

29. The router of claim 27, wherein the classification index is placed within a super packet header in a super packet containing the optical data packets associated with the classification index.

30. The router of claim 26, wherein the ingress edge unit further converts each optical data packet into an electrical data packet prior to aggregating the electrical data packet into a super packet.

31. The router of claim 26, wherein ingress edge unit further places the data within each super packet onto at least one wavelength.

32. The router of claim 26, wherein ingress edge unit further places the data within each super packet onto a plurality of wavelengths.

33. The router of claim 26, wherein the core controller comprises:
   a switch controller in communication with the optical switch fabric; and
   a super packet scheduler in communication with the switch controller and further in communication with the ingress edge unit via a control packet link; and
   wherein the super packet scheduler monitors the ingress edge unit to determine a scheduling pattern for the ingress edge unit, wherein ingress edge unit transmits the super packet to the optical switch fabric according to the scheduling pattern so that the super packet arrives at the optical switch fabric at a switching time interval when no other super packet destined for the egress edge unit arrives at the optical switch fabric; and
   wherein the switch controller creates a unique path through the optical switch fabric for the super packet.

34. The router of claim 26, further comprising:
   an ingress super packet link that connects the ingress edge unit to the optical switch fabric;
   an ingress super packet link that connects the edge unit to the optical switch fabric; and
   an egress super packet link that connects the egress edge unit to the optical switch fabric; and
   wherein the super packet is transmitted to the optical switch fabric over the ingress super packet link, and further wherein the super packet is transmitted to the egress edge unit from the optical switch fabric over the egress super packet link.

35. The router of claim 26, further comprising:
   an ingress control packet link that connects the ingress edge unit to the core controller; and
   an egress control packet link that connects the egress edge unit to the core controller; and
   wherein the core controller receives a plurality of pattern data from the plurality of ingress edge units that the core controller uses to establish a pattern that is used to route the plurality of super packets from the plurality of ingress edge units, through the optical switch fabric, to the plurality of egress edge units; and
   wherein the core controller receives a plurality of control data from the plurality of egress edge units that the core controller uses to control overflow of a plurality of egress edge unit buffers and to synchronize data flow in the router.

36. The router of claim 26, wherein the core controller monitors a plurality of synchronization data at the plurality of ingress edge units via the ingress control data links and at the plurality of egress edge units via the egress control data link to synchronize data flow through the router; and
   wherein the core controller monitors a plurality of time information at each of the plurality of egress edge units via the egress control data links to verify data intended for each egress edge unit arrives at an appropriate time.

37. The router of claim 26, wherein the optical switch fabric comprises an optical cross-bar switch, comprising:
   a plurality of inputs, each input connected to one of the plurality of ingress edge units;

a plurality of outputs, each output connected to one of the plurality of egress edge units; and a plurality of switching elements configured to create a plurality of unique paths through the optical cross bar switch from each input to each output.

38. The router of claim 37, wherein the switching elements are N to 1 switching elements, where N is equal to the number of the plurality of ingress edge units, for switching a super packet received on any of the N inputs to one the plurality of outputs.

39. The router of claim 38, wherein each of the N to 1 switching elements comprises an N to 1 semiconductor optical amplifier operable to switch from N inputs to one output.

40. The router of claim 38, wherein each ingress edge unit further places the data within each super packet onto a plurality of wavelengths, and further wherein each switching element has sufficiently broad bandwidth to accommodate all wavelengths within an optical fiber upon which the plurality of super packets are transported.

41. The router of claim 38, wherein the core controller, for each super packet arriving at the optical cross bar switch, connects an input associated with the ingress edge unit from the super packet arrived to an output for which the super packet is destined.

42. The router of claim 26, wherein each ingress edge unit further receives a portion of the plurality of optical data packets arriving at the ingress edge unit and creates a plurality of partial super packets wherein each partial super packet comprises data having a particular set of routing characteristics; and creates a plurality of super packets by combining partial super packets having a common destination egress edge unit.

43. The router of claim 42, wherein each egress edge unit further receives the plurality of the super packets destined for the egress edge unit and disassembles the plurality of super packets into a plurality of partial super packets intended for a common network port, and transmits data contained within the plurality of partial super packets to the common network port.

44. The router of claim 26, wherein each ingress edge unit further comprises:

a packet classification queue, comprising a plurality of sub-queues wherein each sub-queue is assigned to contain data of a particular data type that is intended for a particular egress edge interface unit;

a packet classification controller, wherein the packet classification controller receives the plurality of optical data packets, wherein each of the plurality of optical data packets comprises data of at least one data that is intended for one of the plurality of egress edge units, and routes each data within each optical data packet to the sub-queue that is assigned to contain the data, thereby building a partial super packets in each sub-queue wherein each partial super packet contains data of a particular data type intended for a particular egress edge unit;

an edge unit destination controller, wherein the edge unit destination controller transmits each partial super packet from the packet classification queue to an ingress super packet factory;

a super packet ingress queue comprising a plurality of lambda/destination queues wherein each lambda/destination queue is assigned to contain data on a particular wavelength that is intended for a particular egress edge interface unit;

a partial super packet controller, wherein the partial super packet controller receives each partial super packet, wherein each partial super packet comprises data on at least one wavelength that is intended for one of the plurality of egress edge units, and routes each data within each partial super packet to the lambda/destination queue that is assigned to contain the data, thereby building a super packet in each lambda/destination queue, wherein each super packet contains data on a particular wavelength intended for a particular egress edge unit; and a super packet transmit controller that forwards each super packet to the optical switch fabric based on input received from the core controller.

45. The router of claim 44, wherein the packet classification controller routes the data contained within the plurality of optical data packets by examining a header information for each of the plurality of optical data packets to determine for each data (i) a destination egress edge unit for which the data is intended and (ii) a destination port contained within the destination egress edge unit for which the data is intended.

46. The router of claim 41, wherein the ingress super packet factory is in communication with the core controller via a control packet link to enable the core controller to monitor a plurality of input/output flow information and control super packet generation and transmission to the optical switch fabric.

47. The router of claim 46, wherein each egress edge unit further comprises:

a plurality of ports;

a super packet egress queue comprising a plurality of port/lambda queues wherein each port/lambda queue is assigned to contain data on a particular wavelength that is intended for a particular port;

a super packet egress queue controller, wherein the super packet egress queue controller receives each super packet from the optical switch fabric and routes each data within each super packet to the port/lambda queue that is assigned to contain the data, thereby deconstructing each super packet into a plurality of egress partial super packets where in the plurality of port/lambda queues, wherein each egress partial super packet contains data intended for a particular destination port;

a packet declassification queue comprising a plurality of egress sub-queues wherein each egress sub-queue is assigned to contain data on a particular wavelength that is intended for a destination port;

a packet declassification controller, wherein the packet declassification controller receives the plurality of egress partial super packets, wherein each of the plurality of optical data packets comprises data of at least one data type that is intended for one of the plurality of ports, and routes each data within each optical data packet to the egress sub-queue that is assigned to contain the data, thereby deconstructing the egress partial super packets so that each egress sub-queue contains data of a particular data type intended for a particular port; and a packet selector that transmits the data in each egress sub-queue to an appropriate destination port.

48. A method of routing a plurality of incoming packets wherein each packet has a payload and a header, comprising:

classifying each incoming packet based on a destination port;

aggregating the classified packets into super packets based on the destination port;

transporting the super packets through an optical switch fabric in a non-blocking manner;

de-aggregating the super packets into de-aggregated packets; and transporting the de-aggregated packets through the output ports.

49. The method of claim 48, further comprising:

determining a set of classification parameters for each incoming packet at an ingress edge unit, wherein the classification parameters comprise a packet destination egress edge unit;

transport the data packet to a destination egress edge unit; and transporting the set of classification parameters for the data packet to the destination egress edge unit.

50. The method of claim 49, further comprising:

creating a classification index containing the classification parameters; and transporting the classification index with the super packet to the destination egress edge unit.

51. The method of claim 50, wherein determining a set of classification parameters for a data packet at an ingress edge unit further comprises determining a destination egress edge unit and a destination port within the destination egress edge unit for the data packet the ingress edge unit.

52. The method of claim 49, further comprising:

accessing a look-up table to correlate destination IP address to destination egress unit and destination port; and placing destination egress unit and destination port information within overhead of the super packet associated with the incoming packet.

53. The method of claim 49, wherein the set of classification parameters include a destination egress edge, a destination port, and a QoS parameter vector, and further wherein the QoS vector comprises at least one code point representing a set of QoS parameters for the data packet.

54. The method of claim 48, further comprising transporting each super packet over a plurality of bandwidths on a super packet link.

55. The method of claim 48, further comprising:

subdividing an available bandwidth on each of a plurality of super packet links; and transporting a set of data contained in each super packet over at least one bandwidth.

56. The method of claim 48, further comprising:

allocating an available bandwidth to a destination egress edge unit based upon an analysis of an amount of data destined for the destination egress edge unit;

transporting each super packet intended for the destination egress edge unit over the available bandwidth.

57. The method of claim 48, further comprising deflection routing at least one super packet through a non-destination egress edge unit prior to routing the at least one super packet to the destination egress edge unit.

58. An optical router, comprising:

a non-blocking optical switch core, comprising:
   a non-blocking optical switch fabric; and
   a core controller;
at least one ingress edge unit;
at least one egress edge unit;
at least one ingress super packet link linking the at least one ingress edge unit to the optical switch fabric;
at least one egress super packet link linking the at least one egress edge unit to the optical switch fabric;
at least one ingress control packet link linking the at least one ingress edge unit to the core controller, wherein each of the at least one ingress control packet link provides a control information regarding the plurality super packets; and
at least one egress control packet link linking the at least one egress edge unit to the core controller, wherein each of the at least one egress control packet link provides an egress control information; and
wherein each ingress edge unit aggregates a plurality of incoming optical data packets into a plurality of super packets, wherein each super packet comprises optical data from the plurality of incoming optical data packets that is intended for one of the at least one egress edge units;
wherein the optical switch fabric receives the plurality of super packets and routes each super packet through the optical switch fabric to the at least one egress super packet link linking the one of the at least one egress edge unit for which the super packet is intended to the switch fabric, wherein the routing through the optical switch fabric is performed so as to avoid contention within the optical switch fabric between the plurality of super packets; and
wherein the core controller uses the ingress control information received from each of the at least one ingress edge units to schedule the plurality of super packets to exit the optical switch fabric in a manner that avoids contention among super packets over the at least one egress super packet link to the at least one egress edge unit.

59. The optical router of claim 58, wherein the ingress control packet link and the egress control packet link comprise the same optical fiber.

60. The optical router of claim 59, wherein the ingress super packet link, the egress super packet link, the ingress control packet link and the egress control packet link all comprise a WDM fiber.

61. The optical router of claim 59, wherein the at least one ingress edge unit comprises a plurality of ingress edge units and the at least one egress edge unit comprises a plurality of egress edge units;

the at least one ingress super packet link comprises a plurality of ingress super packets links, wherein each ingress super packet link links one of the ingress edge units to the optical switch fabric;

the at least one egress super packet link comprises a plurality of egress super packet links, wherein each egress super packet link links one of the egress edge units to the optical switch fabric;

the at least one ingress control packet link comprises a plurality of ingress control packet links, wherein each ingress control packet link links one of the ingress edge units to the core controller; and the at least one egress control packet link comprises a plurality of egress control packet links, wherein each egress control packet link links one of the egress edge units to the core controller.

62. The optical router of claim 59, wherein the ingress super packet link is capable of transmitting multiple wavelengths in a time-multiplexed manner.

63. A method of routing a plurality of packets wherein each packet has a payload and a header, comprising:

receiving a plurality of optical data packets each of a plurality of ingress edge units, each optical data packet destined for a destination port at one of a plurality of egress edge units;

aggregating the plurality of optical data packets into a plurality of super packets wherein each super packet comprises optical data packets intended for a particular destination egress edge unit;

transmitting each super packet to its associated destination egress edge unit through an optical switch, wherein the transmitting is controlled so as to avoid contention within the optical switch fabric and among the plurality of super packets between the optical switch fabric and the plurality of egress edge units;

de-aggregate the plurality of super packets into the constituent optical data packets; and transmit each optical data packet to an egress port.

64. The method of claim 63, further comprising:

monitoring the plurality of optical data packets to determine a scheduling pattern;

transmitting super packets to the optical switch fabric according to the scheduling pattern;

wherein the scheduling pattern prevents any two super packets destined for a single egress edge unit from arriving at the optical switch fabric in an identical switching time interval.

65. The method of claim 64, further comprising creating a unique path through the optical switch fabric for each super packet arriving at the optical switch fabric during the identical switching time interval.

66. The method of claim 65, further comprising monitoring data flow at each of the plurality of egress edge units to control overflow of a plurality of egress edge unit buffers and to synchronize data flow in the router.

67. The method of claim 63, further comprising configuring the optical switch fabric to create a plurality of unique paths through the optical switch fabric from each ingress edge unit to each egress edge unit.

68. The method of claim 67, further comprising: connecting an input of the optical switch fabric that is connected to the ingress edge unit from which the super packet arrived to an output of the optical switch fabric t hat is connected to the egress edge unit for which the super packet is destined.

69. The method of claim 63, further comprising placing data contained in each of the plurality of super packets on one or more wavelengths.

70. The method of claim 63, further comprising:

creating a classification entry for each incoming optical data packet; and creating a classification index for each super packet, wherein each classification index comprises the classification entry for every optical data packet within the super packet;

placing the classification index in an overhead of the super packet prior to transmitting the super packet to the destination egress edge unit;

extracting from the classification index the classification entry associated with each optical data packet within the super packet; and routing each optical data packet to an output port of the destination egress edge unit based on the classification information for each optical data packet.

71. The method of claim 70, wherein the classification information for each optical data packet comprises a destination egress edge unit and a destination port within the destination egress edge unit.

72. The method of claim 63, further comprising periodically determining and applying a new scheduling pattern based on the monitoring of optical data packets.

73. The method of claim 63, further comprising transmitting at least one of the plurality of super packets to its associated destination egress edge unit through an intermediate edge unit.

* * * * *